United States Patent
Onoda et al.

(10) Patent No.: US 6,175,692 B1
(45) Date of Patent: Jan. 16, 2001

(54) FOCUS DETECTING DEVICE, DISTANCE MEASURING DEVICE, AND OPTICAL APPARATUS FOR ADJUSTING FOCUS

(75) Inventors: Hitoshi Onoda; Terutake Kadohara, both of Yokohama; Tomokazu Yoshida, Ebina, all of (JP)

(73) Assignee: Canon Kabushiki Kaisha, Tokyo (JP)

(*) Notice: Under 35 U.S.C. 154(b), the term of this patent shall be extended for 0 days.

(21) Appl. No.: 09/317,944

(22) Filed: May 25, 1999

(30) Foreign Application Priority Data

May 26, 1998 (JP) .................................................. 10-159981
Sep. 14, 1998 (JP) .................................................. 10-276422

(51) Int. Cl.$^7$ .................................................. G03B 13/36
(52) U.S. Cl. .................................................. 396/104; 396/123
(58) Field of Search ................................... 396/104, 121, 396/122, 123, 124

(56) References Cited

U.S. PATENT DOCUMENTS

| | | | |
|---|---|---|---|
| 4,855,777 | 8/1989 | Suda et al. | 354/402 |
| 4,908,645 | 3/1990 | Higashihara et al. | 354/402 |
| 4,969,003 | 11/1990 | Ohnuki et al. | 354/402 |
| 4,972,221 | 11/1990 | Ohnuki et al. | 354/402 |
| 4,974,002 | 11/1990 | Ohnuki et al. | 354/400 |
| 4,974,003 | 11/1990 | Ohnuki et al. | 354/400 |
| 4,980,716 | 12/1990 | Suzuki et al. | 354/403 |
| 5,005,037 | 4/1991 | Akashi et al. | 354/400 |
| 5,060,002 | 10/1991 | Ohnuki et al. | 354/402 |
| 5,061,951 | 10/1991 | Higashihara et al. | 354/400 |
| 5,061,953 | 10/1991 | Higashihara et al. | 354/402 |
| 5,079,581 | 1/1992 | Kadohara et al. | 354/400 |
| 5,081,479 | 1/1992 | Kadohara et al. | 354/402 |
| 5,089,843 | 2/1992 | Higashihara et al. | 354/402 |
| 5,126,777 | 6/1992 | Akashi et al. | 354/402 |
| 5,151,732 | 9/1992 | Akashi et al. | 354/402 |
| 5,216,460 | * 6/1993 | Yoshimura et al. | 396/123 |
| 5,333,028 | 7/1994 | Akashi et al. | 354/402 |
| 5,382,996 | 1/1995 | Kadohara | 354/403 |
| 5,585,882 | * 12/1996 | Akashi | 396/123 |
| 5,721,967 | * 2/1998 | Akashi | 396/123 X |
| 5,771,413 | 6/1998 | Suda et al. | 396/114 |
| 5,839,001 | 11/1998 | Ohtaka et al. | 396/114 |
| 5,864,721 | 1/1999 | Suda et al. | 396/114 |

FOREIGN PATENT DOCUMENTS 2-207229 8/1990 (JP) .
7-134238 5/1995 (JP) .
10-161013 6/1998 (JP) .

* cited by examiner

*Primary Examiner*—W. B. Perkey
(74) *Attorney, Agent, or Firm*—Fitzpatrick, Cella, Harper & Scinto

(57) ABSTRACT

A focus detecting device capable of focus detection in a plurality of focus-detecting areas, includes a setter for setting a first group including at least two focus-detecting areas, and a second group including a plurality of focus-detecting areas, which are not included in the first group, and a focus detector means for executing focus detection in the order from the focus-detecting areas included in the first group. The focus detector ends focus detection without executing focus detection in the focus-detecting areas included in the second group, when the focus-detecting area included in the first group satisfies a predetermined condition.

35 Claims, 31 Drawing Sheets

FOCUS DETECTING DEVICE, DISTANCE MEASURING DEVICE, AND OPTICAL APPARATUS FOR ADJUSTING FOCUS

BACKGROUND OF THE INVENTION

1. Field of the Invention

The present invention relates to an optical apparatus such as an auto-focus camera, monitor camera, or the like, which has an automatic focus adjusting function.

2. Related Background Art

The focus detecting function represented by a camera or the like has advanced from a single, central detecting area to three- or five-point area, and its detecting range has broadened with respect to the photographing area. Such broad detecting range is achieved not only by an advanced detecting optical system but also by advanced microcomputers that control the function.

Multi-point detecting areas can effectively prevent a so-called "central out-of-focus" state, i.e., a state wherein the focus is adjusted not on the object but on the background. Furthermore, when an object in motion is to be photographed, the object can be prevented from falling outside the focus detecting area.

FIG. 14A shows a narrow, linear single range used as a focus detecting area B with respect to a photographing frame A. On the other hand, FIG. 14B shows broadened focus detecting areas, i.e., three focus detecting areas B set for the photographing frame A. In FIG. 14B, three detecting areas are added in a direction perpendicular to the detecting area shown in FIG. 14A.

Since the number of focus detecting areas is increased from one central point to three points, the focus need not always be adjusted on the object at the center of the photographing frame, and the degree of freedom in photographing is increased.

Upon further developing such multi-focus detecting areas, an area AF function in which the detecting area has a given two-dimensional area with respect to the photographing frame A (in fact, a large number of focus detecting areas are formed densely) is realized.

SUMMARY OF THE INVENTION

One aspect of the invention is to provide a focus detecting device comprising setting means for setting a first group including at least two focus detecting areas, and a second group including a plurality of focus detecting areas, which are not included in the first group, and focus detecting means for executing focus detection in the order from the focus detecting areas included in the first group, wherein the focus detecting means ends focus detection without executing focus detection in the plurality of focus detecting areas included in the second group, when the focus detecting area included in the first group satisfies a predetermined condition.

BRIEF DESCRIPTION OF THE DRAWINGS

FIGS. 27A, 27B and 27C show a plurality of groups of focus detecting areas, which are obtained by grouping 45 focus detecting areas in case of AI SERVO-AF in the camera according to the third embodiment;

DESCRIPTION OF THE PREFERRED EMBODIMENTS

The present invention will be described in detail hereinafter on the basis of illustrated embodiments.

A method of limiting and selecting focus detecting areas in moving object photography will be explained below taking as an example an automatic focus adjusting camera capable of focus detection on a two-dimensional area.

Figure 1:
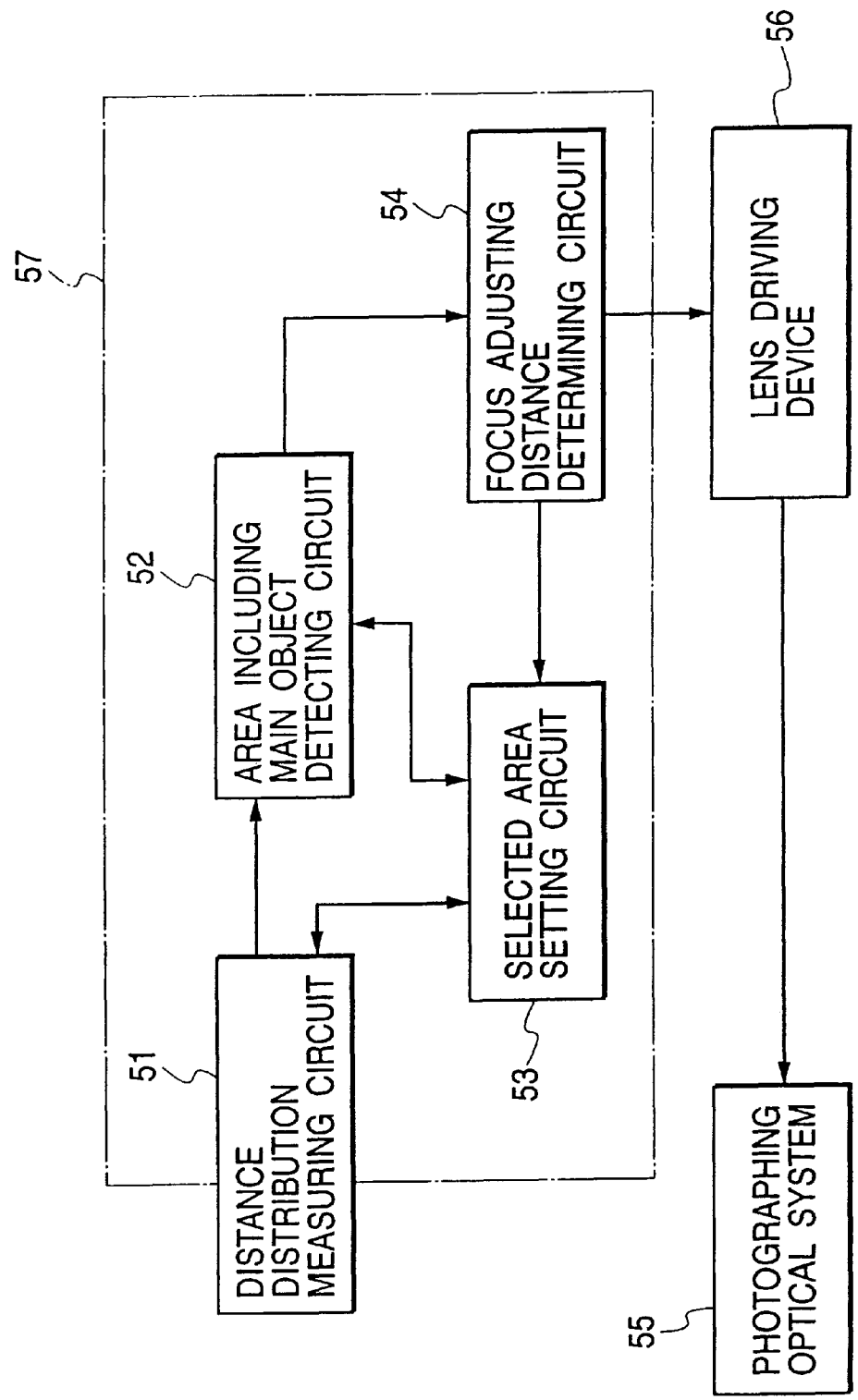
FIG. 1 is a block diagram showing the basic arrangement of a camera according to the first embodiment.

FIG. 1 is a block diagram showing basic building components of a camera according to one embodiment of the present invention. Referring to FIG. 1, a distance distribution measuring circuit 51 measures distance to an arbitrary location in the object field. An area including main object detecting circuit 52 detects an area where a main object is present from the photographing frame. A selected area setting circuit 53 sets the current focus detecting area in accordance with the previous area including main object, which was automatically determined by the area including main object detecting circuit 52. A focus adjusting distance determining circuit 54 determines focus adjusting distance with respect to a photographing optical system 55 in accordance with the information of the determined area including main object. A lens driving device 56 drives a lens to adjust the focus. A controller 57 is implemented by a CPU, RAM, ROM, and the like of a microcomputer in practice. Of these circuits, the distance distribution measuring circuit 51 is depicted to extend across the dotted line indicating the microcomputer, since it is implemented by both the microcomputer and a measuring optical system.

FIGS. 2 to 5 show the detailed arrangement of the camera shown in FIG. 1.

Figure 2:
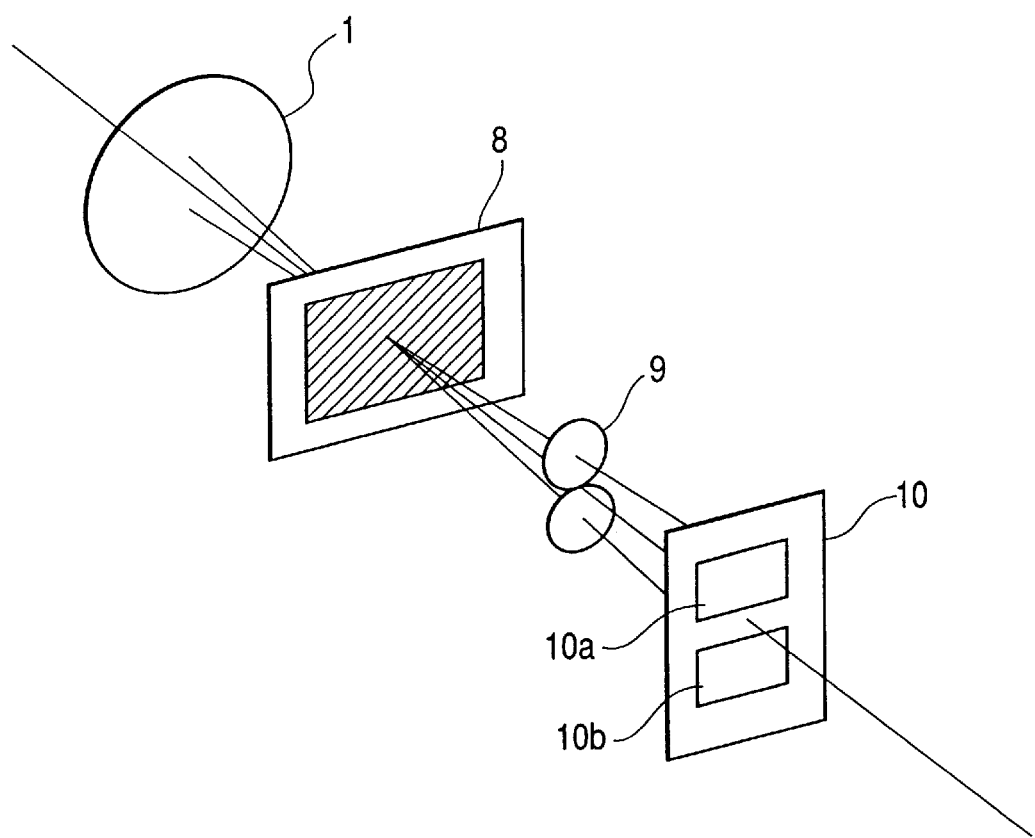
FIG. 2 is a perspective view showing the layout of an optical system of the camera according to the first embodiment.

FIG. 2 shows the layout of optical building components of the camera for detecting a distance to an object field. Referring to FIG. 2, the optical system includes a photographing lens 1, field lens 8, secondary imaging lens 9, and area sensor 10.

Light beams coming from different pupil positions of the photographing lens 1 are guided onto two photographing frames 10a and 10b on the area sensor 10, and are re-imaged at an imaging magnification determined by the field lens 8 and secondary imaging lens 9. This area sensor 10 is located at a position optically equivalent to the photographing film surface with respect to the photographing lens 1, and the photographing frames 10a and 10b have fields equal to a partial or whole photographing frame.

Figure 3:
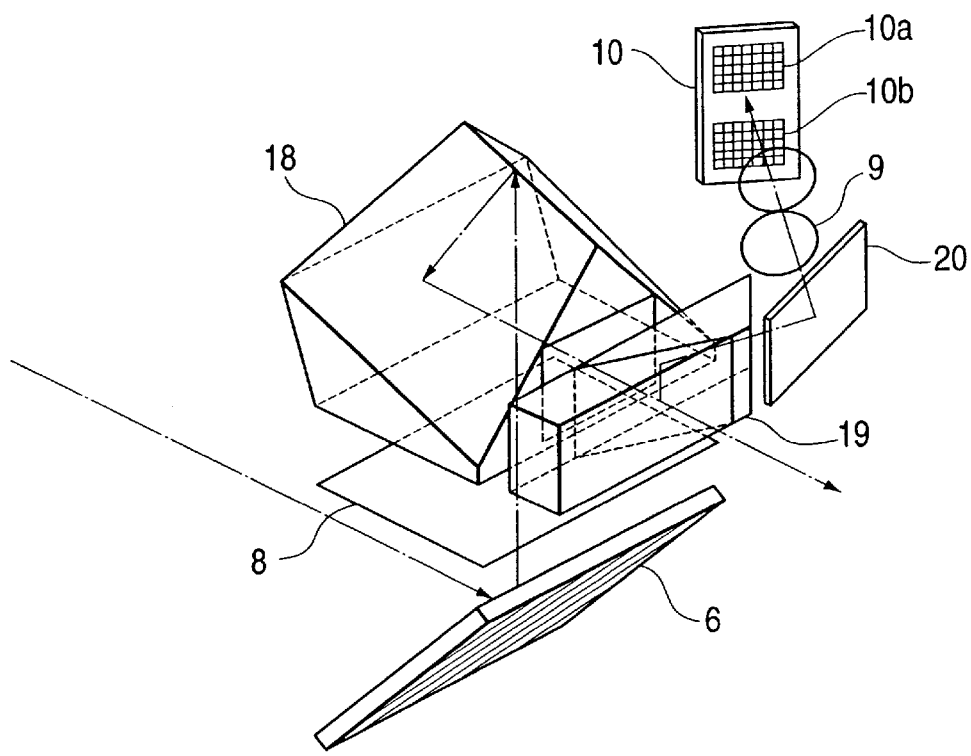
FIG. 3 is a perspective view showing the layout of the optical system of the camera according to the first embodiment.
Figure 4:
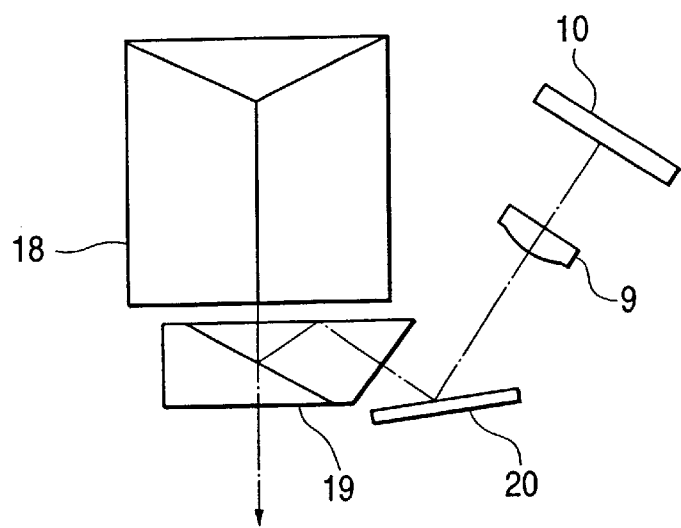
FIG. 4 is a top view of the optical system shown in FIG. 3.

FIG. 3 shows the layout of the detecting optical system shown in FIG. 2, which is applied to the camera. Referring to FIG. 3, the optical system includes a quick return mirror 6, pentagonal prism 18, beam-splitting prism 19, and reflection mirror 20, in addition to the same components as those shown in FIG. 2. FIG. 4 is a view of the layout shown in FIG. 3 when viewed from the top of the camera.

With this arrangement, the photographing images 10a and 10b having a predetermined parallax are obtained.

Note that the camera with the aforementioned arrangement is disclosed in detail in Japanese patent Application Laid-Open No. 7-134238 and the like.

Figure 5:
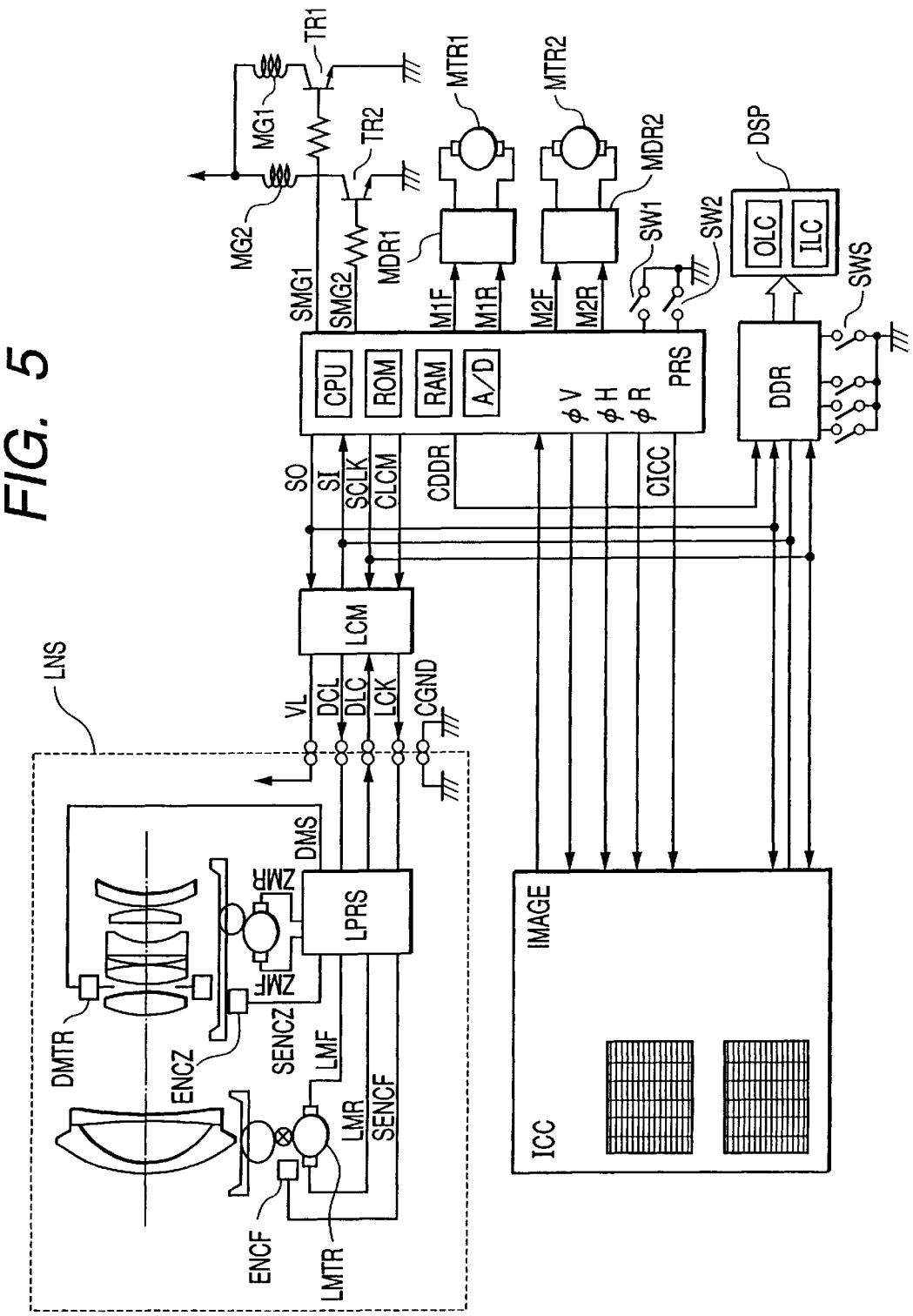
FIG. 5 is a block diagram showing the internal arrangement of the camera according to the first embodiment.

FIG. 5 is a block diagram showing the arrangement of the camera with the elements shown in FIG. 2. The arrangement of the camera will be explained first.

Referring to FIG. 5, a camera controller PRS corresponds to the controller 57 shown in FIG. 1, and is a one-chip microcomputer including a CPU (central processing unit), ROM, RAM, and A/D conversion function. The camera controller (to be referred to as a microcomputer hereinafter) PRS executes a series of operations of the camera including an automatic exposure control function, automatic focus adjusting function, film winding/rewinding, and the like, in accordance with a camera sequence program stored in the ROM. For this purpose, the microcomputer PRS communicates with peripheral circuits in the camera body and a controller in a lens using communication signals SO, SI, and SCLK, and communication selection signals CLCM, CDDR, and CICC so as to control those circuits and lens.

Note that the signal SO is a data signal output from the microcomputer PRS, the signal SI is a data signal input to the microcomputer PRS, and the signal SCLK is a sync clock signal for the signals SO and SI.

A lens communication buffer LCM supplies electric power to a lens power supply terminal VL when the camera is active, and serves as a communication buffer between the camera and lens when the selection signal CLCM from the microcomputer PRS is at high potential level (to be abbreviated as "H" hereinafter; a low potential level will be abbreviated as "L" hereinafter).

When the microcomputer PRS sets the signal CLCM at "H" and outputs predetermined data signal SO in synchronism with the signal SCLK, the lens communication buffer circuit LCM outputs buffer signals LCK and DCL of the signals SCLK and SO to the lens via camera-lens communication contacts. At the same time, the circuit LCM outputs a buffer signal SI of a signal DLC from the lens, and the microcomputer PRS receives the lens data SI synchronously.

A detection and display circuit DDR for various switches SWS is selected when the signal CDDR is at "H", and is controlled by the microcomputer PRS using the signals SO, SI, and SCLK. More specifically, the circuit DDR switches display on a camera display member DSP on the basis of data sent from the microcomputer PRS, and informs the microcomputer PRS of ON/OFF states of various operation members of the camera via communications. An external liquid crystal display device OLC is located on top of the camera, and a liquid crystal display device ILC is included in the viewfinder.

Switches SW1 and SW2 are interlocked with a release button (not shown). The switch SW1 is turned on at the first stroke position of the release button, and the switch SW2 is then turned on at the second stroke position of the release button. The microcomputer PRS executes photometry and automatic focus adjustment in response to ON of the switch SW1, and executes exposure control and then winds up film in response to ON of the switch SW2 as a trigger.

Note that the switch SW2 is connected to an "interrupt input terminal" of the microcomputer PRS, and even while a program is being executed upon ON of the switch SW1, that program is interrupted upon ON of the switch SW2 and the control can immediately enter a predetermined interrupt program.

Motors MTR1 is used for film feeding and MTR2 is used for moving a mirror upward/downward and charging a shutter spring, and their forward/reverse rotations are controlled by driving circuits MDR1 and MDR2. Signals M1F, M1R, M2F, and M2R input from the microcomputer PRS to the driving circuits MDR1 and MDR2 are motor control signals.

Magnets MG1 and MG2 are respectively used for initiating travel of the leading and trailing curtains of the shutter, and are energized by amplification transistors TR1 and TR2 in response to signals SMG1 and SMG2, thus executing shutter control by the microcomputer PRS.

Note that the motor driving circuits MDR1 and MDR2 and shutter control are not directly related to the present invention, and a detailed description thereof will be omitted.

A signal DCL input to a control circuit LPRS in the lens in synchronism with the signal LCK is command data from the camera to a lens LNS, and lens operation corresponding to each command is determined in advance. The control circuit LPRS in the lens interprets that command in accordance with a predetermined procedure, and performs focus adjustment and aperture control and outputs operation states (driving states of the focus adjusting optical system, aperture, and the like) of the respective units in the lens and various parameters (distance information such as full-open f-number, focal length, a coefficient for the defocus amount vs. the moving amount of the focus adjusting optical system, various focus correction amounts, and the like) from an output DLC.

In this embodiment, a zoom lens is exemplified. Upon receiving a focus adjusting command from the camera, a focus adjusting motor LMTR is driven by signals LMF and LMR in accordance with the driving amount and direction received at the same time so as to move the optical system in the optical axis direction, thus adjusting the focus. The moving amount of the optical system is monitored by counting a number of pulses of a pulse signal SENCF output from an encoder circuit ENCF which executes a detection of the pattern of a pulse plate that pivots in synchronism with the optical system, and outputs pulses corresponding to the moving amount. The pulses are counted by a counter in the control circuit LPRS in the lens. Upon completion of predetermined movement, the control circuit LPRS itself sets the signals LMF and LMR at "L" to brake the motor LMTR.

For this reason, once the focus adjusting command has been received from the camera, the microcomputer PRS of the camera need not perform any process for lens driving until completion of lens driving. Upon reception of a request from the camera, the control circuit LPRS can output the contents of the counter to the camera.

Upon receiving an aperture control command from the camera, the control circuit LPRS drives a stepping motor DMTR known as an aperture driving motor in accordance with the number of aperture steps received at the same time. Note that the stepping motor allows open control, and does not require any encoder for monitoring its operation.

An encoder circuit ENCZ is attached to a zoom optical system, and the control circuit LPRS in the lens receives a signal SENCZ output from the encoder circuit ENCZ to detect the zoom position. The control circuit LPRS in the lens stores lens parameters at the respective lens positions, and outputs a parameter corresponding to the current zoom position to the camera upon receiving a request from the microcomputer PRS in the camera.

A photometry area sensor and its driving circuit ICC for focus detection and exposure control comprises a CCD and the like. The circuit ICC is selected when a signal CICC is at "H", and is controlled by the microcomputer PRS using the signals SO, SI, and SCLK.

Signals φV, φH and φR are used for reading out the area sensor output, and used for resetting the area sensor. A sensor control signal is generated by a driving circuit in the circuit ICC on the basis of signals from the microcomputer PRS. The sensor outputs are amplified after they are read out from a sensor unit, and are input as output signals IMAGE to an analog input terminal of the microcomputer PRS. The microcomputer PRS A/D-converts the signals IMAGE, and sequentially stores the converted digital values at predetermined addresses on the RAM. Using the digital signals, measurement of the distance distribution of the object field, and focus adjustment or photometry are done.

In FIG. 5, the camera and lens are independent from each other (i.e., an exchangeable lens camera). However, the present invention is not limited to such specific camera and may be applied to, e.g., a camera integrated with a lens.

A series of operations of the microcomputer PRS will be described below.

Figure 6:
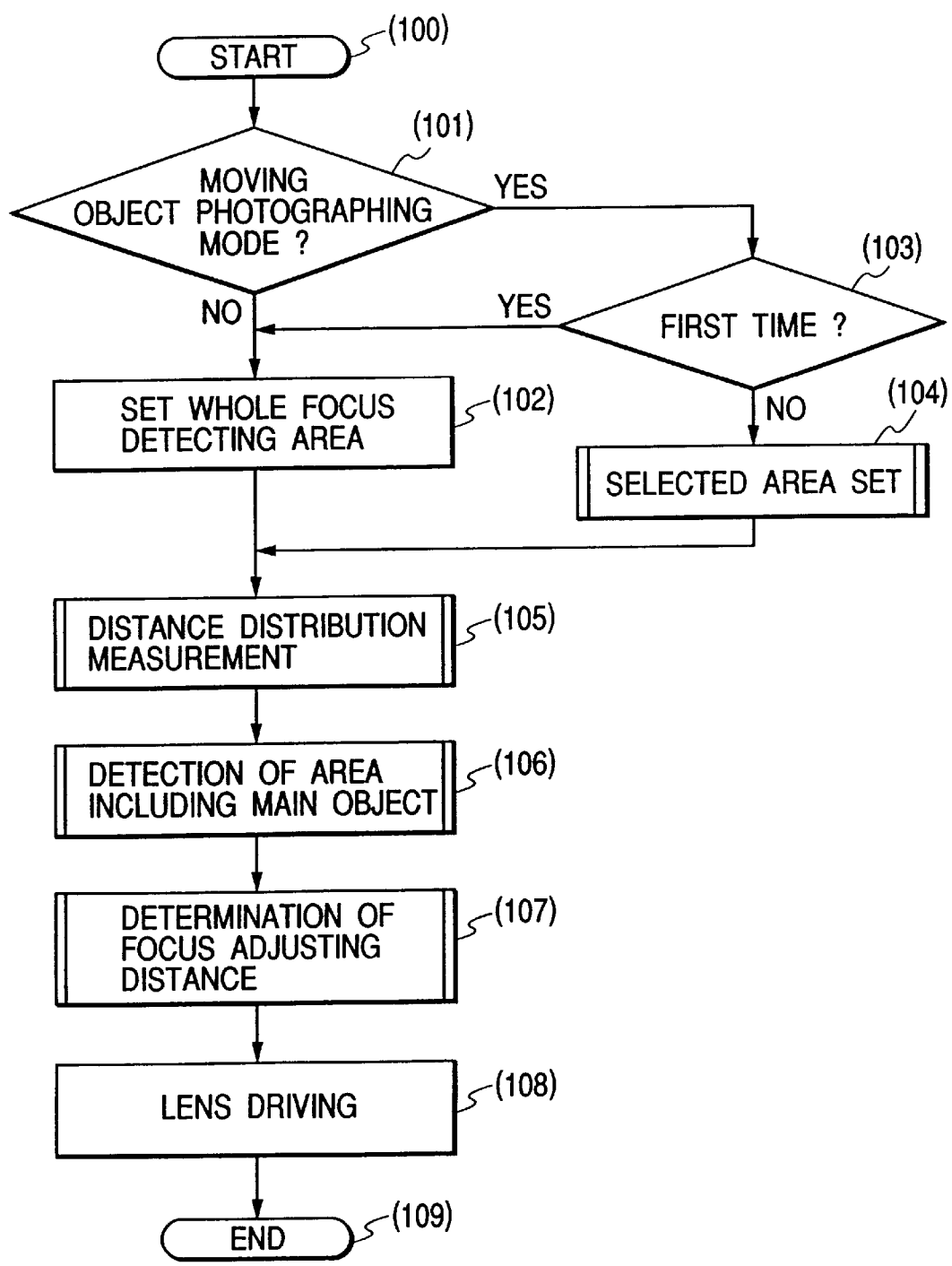
FIG. 6 is a flow chart showing a series of operations of the camera according to the first embodiment.

FIG. 6 is a flow chart showing the flow of the overall processing. The processing will be explained below with reference to FIG. 6.

When the photographer has pressed, e.g., a shutter button (not shown), photographing is started via step (100).

It is checked in step (101) if a moving object photographing mode is set as the current automatic focus adjusting mode. If the moving object photographing mode is not set, the flow directly advances to step (102) to set the whole focus detecting area as the current focus detection calculated area. On the other hand, if the moving object photographing mode is set, the flow advances to step (103) to check if the current focus detection is to be done for the first time in the moving object photographing mode. If focus detection is done for the first time, since the position of a main object is not detected yet, detection on the whole focus detecting area is required. Hence, if it is determined in step (103) that the current focus detection is to be done for the first time, the flow advances to step (102) to set the whole focus detecting area as the current focus detection calculated area as in a non-moving object photographing mode.

If focus detection has already been done, the flow advances from step (103) to step (104) to call a selected area setting subroutine for setting a detection calculated area. The outline of this selected area setting subroutine will be explained below using FIGS. 7A to 7D. Note that the selected area setting subroutine is implemented by a logic corresponding to the selected area setting circuit 53 shown in FIG. 1 in the microcomputer PRS.

Figure 7A:
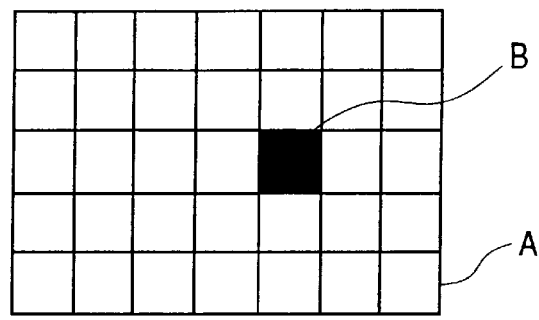
FIGS. 7A, 7B, 7C and 7D are views for explaining focus detection executed areas according to the first embodiment.

Referring to FIG. 7A, A indicates a whole focus detecting area defined by 5 (vertical)×7 (horizontal) segmented areas, i.e., a total of 35 areas. On the other hand, B indicates an area which is determined to be an area including main object by the previous focus detection. That is, the previous focus adjustment was done based on the focus detection result of the area B.

Figure 7B:
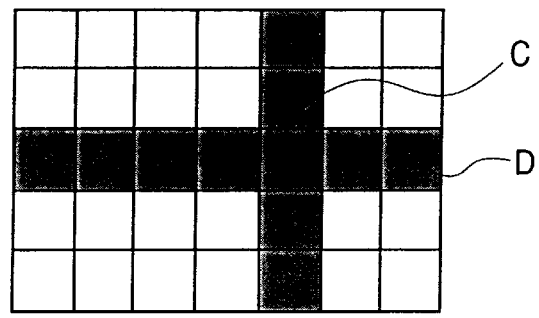

FIG. 7B shows the setup state of the current focus detection calculated areas, and a vertical area C and horizontal area D are set. Cross-pattern areas are selected to have the area B in FIG. 7A as the previous area including main object, and the number of areas is limited to "11", i.e., a value ⅓ or less the total of areas. Since the photographer follows up an identical object upon framing, cross-pattern areas having the previous area including main object suffice as the next area including main object.

Figure 7C:
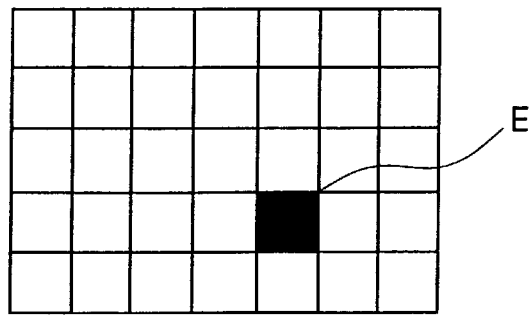
Figure 7D:
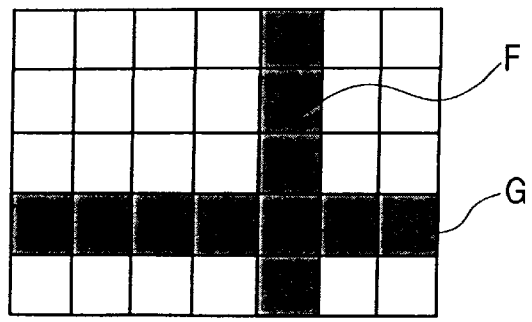

For example, when the current area including main object is an area E shown in FIG. 7C, areas F and G shown in FIG. 7D are similarly set as the next focus detection calculated areas.

The contents of the selected area setting subroutine for setting the detection calculated area in step (104) have been explained.

In step (105), a subroutine for measuring the distance distribution of the object field with respect to the focus detecting areas set in step (104) is called. The distance distribution measurement will be described below with reference to the flow chart in FIG. 8. Note that the distance distribution measurement is implemented by a logic corresponding to the distance distribution measuring circuit 51 shown in FIG. 1 in the microcomputer PRS.

In step (201), sensor images are stored. Storage of the sensor images is done as follows.

Initially, the sensor is reset. More specifically, the microcomputer PRS simultaneously sets control signals φV, φH, and φR at "H" for a predetermined period of time, thus resetting the circuit ICC. The microcomputer PRS then sends an accumulation start command to start accumulation, and then detects the end of accumulation. The microcomputer PRS drives the control signals φV and φH to sequentially read out the sensor outputs IMAGE, A/D-converts the outputs IMAGE, and stores the digital values in the RAM, thus completing storage of the sensor output signal in step (201).

Two sensor output signal data are stored in predetermined areas IMG1 and IMG2 on the RAM.

In step (202) and the subsequent steps, distance distribution information (distance map) formed by "m×n" blocks (m and n are integers equal to or larger than 1) are generated.

In step (202), variables x and y that indicate the coordinate position of each block are initialized. In step (203), a signal required for distance calculation of a block (x, y) is extracted from image data IMG1 on the RAM, and is copied to predetermined address A on the RAM. In step (204), the other signal required for distance calculation of the block (x, y) is extracted from image data IMG2 on the RAM, and is copied to predetermined address B on the RAM.

In step (205), luminance distribution signals stored at addresses A and B undergo a known correlation calculation COR(A, B) to calculate a displacement δ between the two signals. In step (206), the distance value is calculated from the image displacement δ using a known function f(δ), and is stored at predetermined address D(x, y) assured on the RAM to record a distance distribution. In step (207), the value x is incremented by one to select the neighboring block as the block to be processed.

In step (208), x is compared with resolution m in the X direction of the distance map. If it is determined in step (208) that "x<m" is true, the flow returns to step (203) to repeat the calculation and storage of the distance value of the neighboring block in the x-direction. On the other hand, if it is determined that "x<m" does not hold, the flow advances to step (209) to reset x and increment y by one.

In step (210), the value y is estimated, and if it is determined that "y<n" holds true, the flow returns to step (203) to start calculations for the next block column. On the other hand, if it is determined that "y<n" does not hold, distance calculations for all the blocks are finished, thus ending the distance distribution measurement subroutine (operations in step (101) in FIG. 6).

When the cross-pattern detection calculated areas are set, the default values of x and y and resolutions m and n change for every positions. These parameters are stored as functions or numeric value tables that pertain to the location of the previous area including main object, and they are individually looked up.

In step (106) in FIG. 6, an area including main object detection subroutine is called. The contents of the area including main object detection subroutine when the whole area is set as the detection calculated area will be explained below with reference to the flow chart in FIG. 9. Note that the area including main object detection is implemented by a logic corresponding to the area including main object detecting circuit 52 shown in FIG. 1 in the microcomputer PRS.

Figure 9:
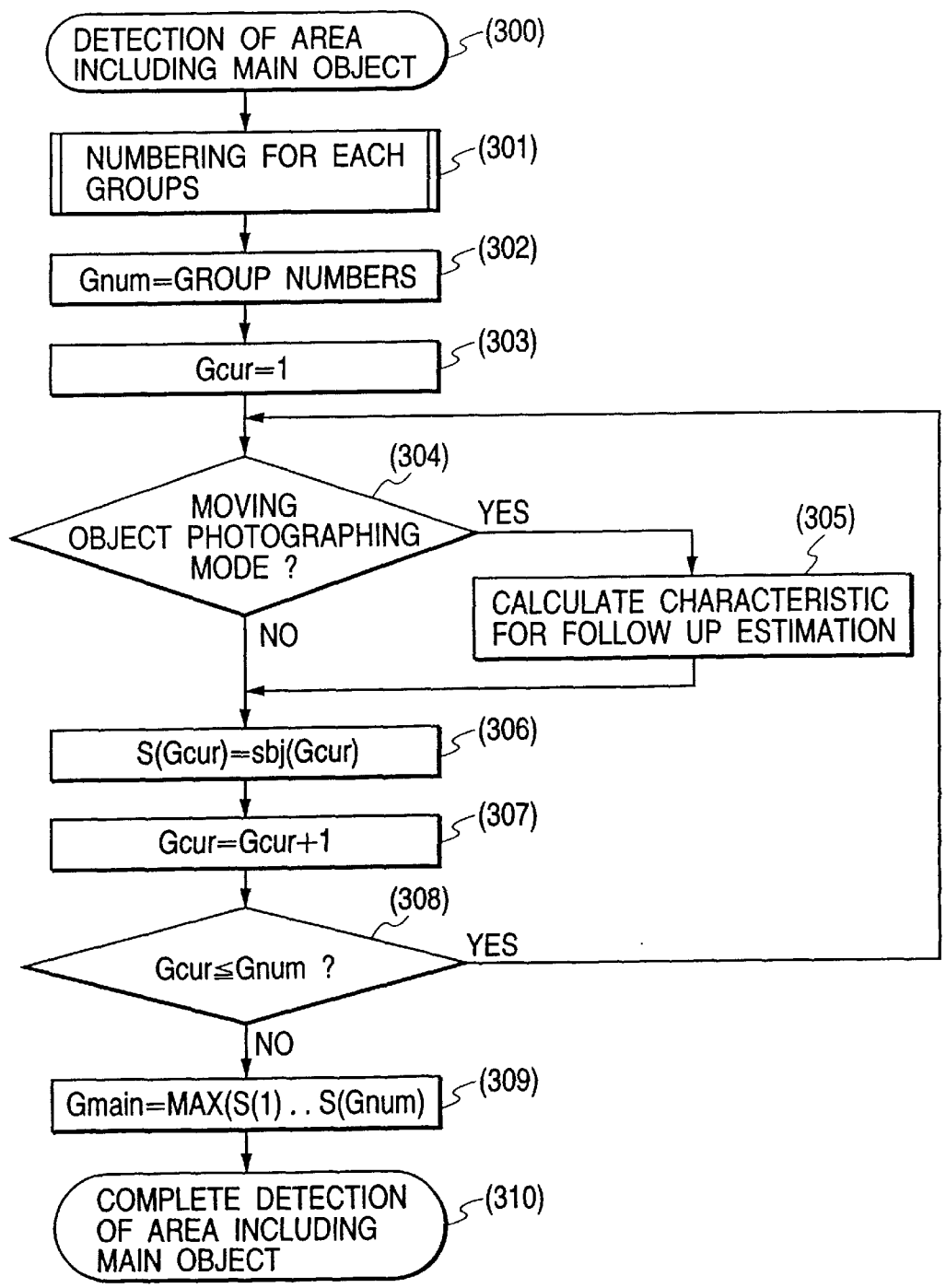
FIG. 9 is a flow chart showing detection of an area including main object according to the first embodiment.
Figure 10:
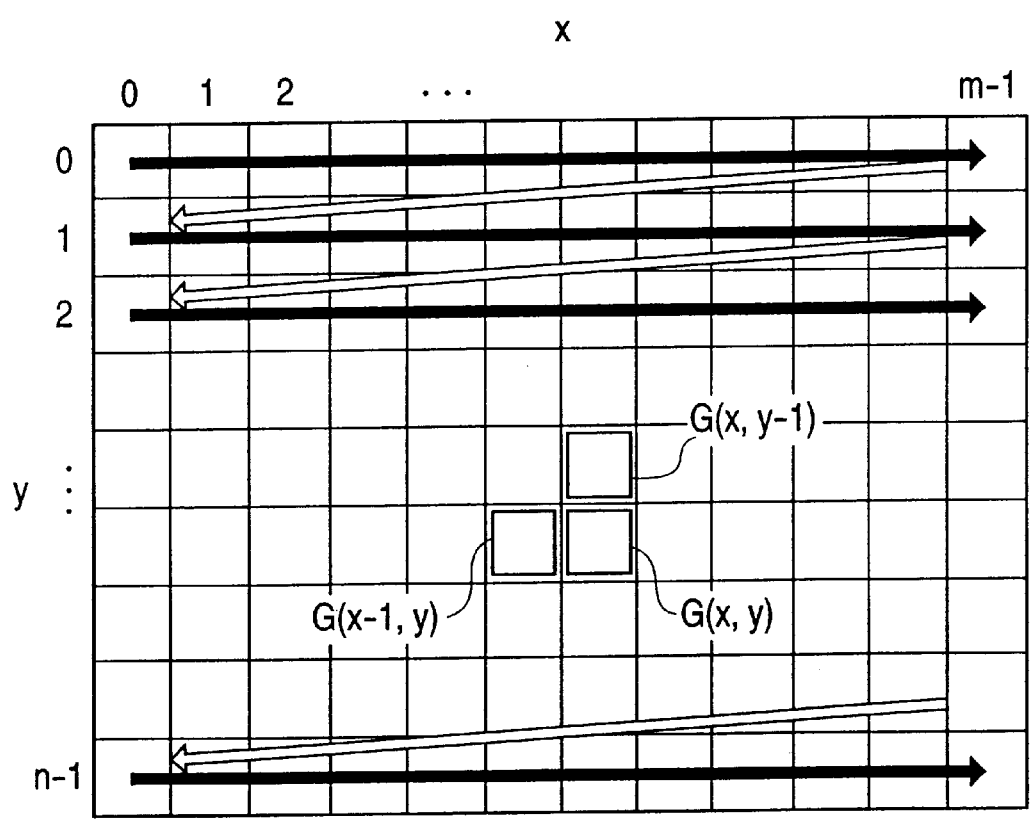
FIG. 10 is an explanatory views of an area segmentation method according to the first embodiment.

In step (301) in FIG. 9, each object (group) that forms the object field is numbered. For example, as shown in FIG. 10, upon executing segmentation by raster-scanning blocks in the order from the upper left one on the frame, as indicated by the arrow in FIG. 10, if it is checked whether or not upper neighboring block G(x, y−1) and left neighboring block G(x−1, y) of block G(x, y) of interest belong to an identical group, such checking can be consequently done between all neighboring blocks. At this time, since blocks on the upper side (y=0) and left side (x=0) respectively have no upper and left neighboring blocks, those blocks are not processed. The checking results are stored in memories G(0, 0) to G(m−1, n−1) on the RAM.

Figures 11A, 11B:
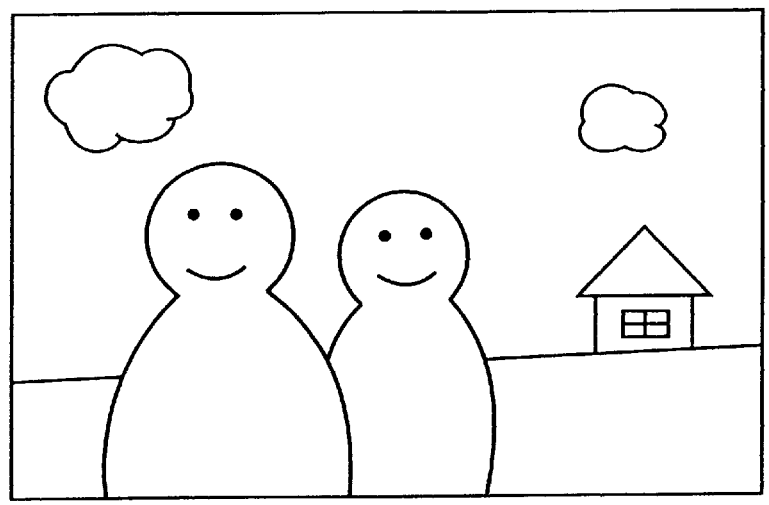
FIGS. 11A and 11B show an example of a labeling result in the first embodiment.

Initially, a block (x, y)=(0, 0) is registered with a group number "g=1", and if a group corresponding to another area is detected, g is incremented by one to set the group number of that block. With this process, a photographing scene shown in, e.g., FIG. 11A, is numbered in units of groups, as shown in FIG. 11B. Such numbering is a known technique called "labeling", and a flow chart of area segmentation will be omitted herein.

Also, the method of checking if neighboring blocks belong to an identical group is described in detail in Japanese Patent Application Laid-Open No. 10-161013 disclosed by the present applicant, and a description thereof will be omitted.

In step (302), the number of objects detected in step (301) is set in a variable Gnum. In step (303) and the subsequent steps, the characteristics of the groups that form the photographing space are estimated, and a group that represents a main object is determined from all the groups on the basis of the characteristics.

In step (303), 1 is set in a variable Gcur indicating the group to be calculated. It is then checked in step (304) if the moving object photographing mode is set as the current automatic focus adjusting mode. If the moving object photographing mode is set, the flow advances to step (305) to calculate characteristics required for follow-up estimation for the moving object such as the amount and rate of change in object image plane velocity. Since the amount and rate of change in object image plane velocity are disclosed in Japanese Patent Application Laid-Open No. 1-16781 or 2-207229, a detailed description thereof will be omitted. The flow then advances to step (306).

On the other hand, if the moving object photographing mode is not set, the flow directly advances to step (306) to calculate a main object level S(Gcur) of the object area with the group number=Gcur. The main object level is used for determining an area which is likely to be a main object by calculating characteristics such as the average distance, the width and height of the area, the position on the frame, and the like, and totally estimating these characteristics. For example, a main object level estimation function S(Gcur) may be given by:

$$S(Gcur) = W_{1868} \times (width) \times (height) + W_2/(\text{distance from frame center}) = W_3/(\text{average distance})$$

where $W_1$, $W_2$, and $W_3$ are weighting constants, the distance from the frame center is the distance between the frame center and the barycentric position of the area, and the average distance is that of all blocks in the area. The main object level is calculated for all the areas, and an object with the highest main object level is determined as a main object.

On the other hand, in case of moving image photographing, an estimation function that also considers the amount and rate of change in object image plane velocity mentioned above is used.

In step (307), Gcur is incremented by one to select the next group to be calculated. In step (308), Gcur is compared with Gnum to check if calculations have been finished for all the groups. As a result, if "Gcur≦Gnum", since calculations have not been finished yet for all the groups, the flow returns to step (304) to repeat the aforementioned processes.

On the other hand, if "Gcur>Gnum", the flow advances to step (309), and the group number with the highest main object level is substituted in a variable Gmain using a function MAX that obtains the group number with the highest one among all the calculated main object levels S(1) to S(Gnum). The area that matches the number represented by Gmain indicates the area including main object. In step (310), the area including main object detection subroutine (operations in step (106) in FIG. 6) ends.

In step (107) in FIG. 6, a focus adjusting distance determining subroutine is called. In this case, a subroutine for determining the focus adjusting distance based on the current area including main object is executed. This subroutine will be explained below with reference to the flow chart shown in FIG. 12. Note that detection of the focus adjusting distance is implemented by a logic corresponding to the focus adjusting distance detecting circuit 54 shown in FIG. 1 in the microcomputer PRS.

In step (401), an area to be adjusted in the photographing field is set in accordance with the group number which is currently set as the area including main object. Area setups are done first in accordance with the result of the area including main object detection subroutine described above. It is checked in step (402) if the moving object photographing mode is set as the current automatic focus adjusting mode. If the moving object photographing mode is not set, the flow advances to step (403), distance information for focus adjustment is calculated from information in the area set in the previous step. Since this embodiment uses an algorithm that gives priority to the nearest object in a single object area, the nearest distance in that area is calculated.

On the other hand, if the moving object photographing mode is set, the flow advances to step (404) to calculate for following up the moving object required for the moving object photographing mode. This calculation yields an adjustment amount obtained by adding a driving amount that corrects a delay in photographing such as a release time lag to the focus adjusting amount with respect to the area including main object. Since such calculation is also disclosed in Japanese Patent Application Laid-Open No. 1-16781 or 2-207229, a detailed description thereof will be omitted.

In step (405), the nearest distance or adjusting distance for following up the moving object is determined as a final focus adjusting distance, thus ending the focus adjusting distance determining subroutine.

In step (108) in FIG. 6, the microcomputer PRS sends a focus adjusting command to the lens LNS with the lens driving device 56 shown in FIG. 1. In response to this command, the control circuit LPRS in the lens controls the motor LMTR to complete the current focus adjustment (operations in step (107) in FIG. 6).

After that, focus adjustment on a still or moving object is done by repeating the aforementioned processes.

In the above example, cross-pattern areas having the previous area including main object as the center are set as the current detection calculated areas, as has been described earlier with reference to FIGS. 7A to 7D. The areas to be set may have some other patterns. These patterns will be explained below with reference to FIGS. 13A to 13F.

Figure 13A:
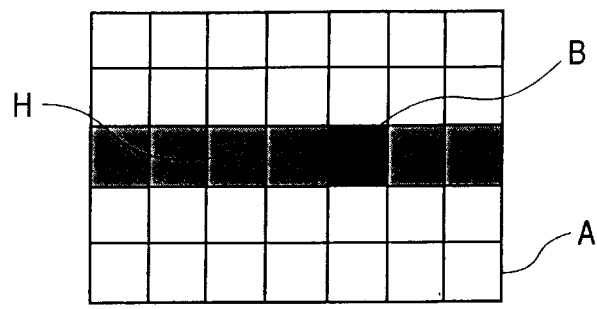
FIGS. 13A, 13B, 13C, 13D, 13E and 13F are views for explaining focus detection executed areas according to the second embodiment.

FIG. 13A shows an example of areas extending in one direction (gray areas H which are limited to only the horizontal direction, since photographing is to be done at the landscape position), which are set by further limiting the number of areas upon holding the normal camera at the landscape position, i.e., which are determined in advance to have an in-focus area in the previous follow-up process (area B painted in black which was determined as the area including main object in the previous focus detection) as the center. In FIG. 13A, A indicates a whole focus detecting area defined by 5 (vertical)×7 (horizontal) segmented areas, i.e., a total of 35 areas, as in FIG. 7A. Such areas suffice for, e.g., photographing by panning the camera.

Figure 13B:
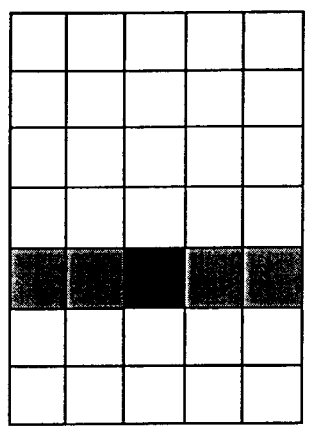

FIG. 13B shows areas set based on the same concept as in FIG. 13A upon photographing at the portrait position.

Figure 13C:
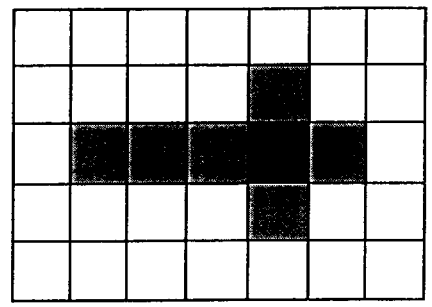
Figure 13D:
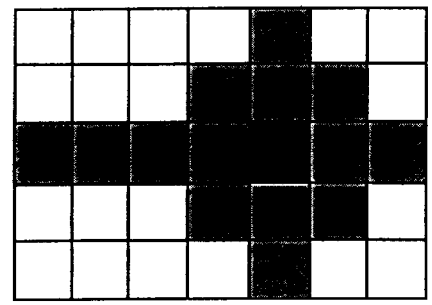

FIG. 13C shows small cross-pattern areas using a relatively smaller number of detection calculated areas. Such areas may suffice if the object can be satisfactorily followed up. Conversely, FIG. 13D shows another set of cross-pattern areas which use a larger number of areas at the central portion. More specifically, all neighboring areas of the area painted in black, which was determined to be the area including main object in the previous focus detection, are added to the areas shown in FIG. 7B. Such pattern is effective for an object which is relatively hard to follow up.

Figure 13E:
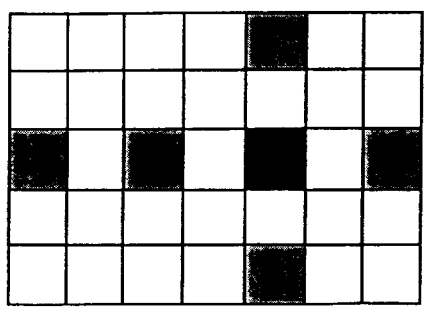
Figure 13F:
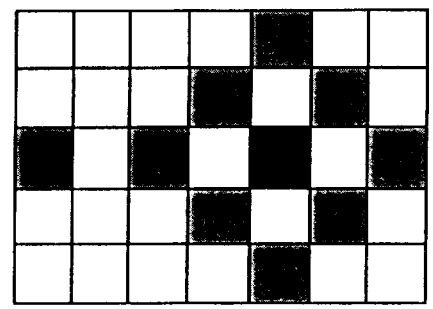

In addition, areas may be set to assure a sufficiently broad range of detection calculated areas while decimating every other areas, as shown in FIGS. 13E and 13F.

According to the embodiment described above, upon following up the moving object while keeping the focus adjusted on the object, cross-shaped focus detection calculated areas are selected from a plurality of object areas to have the in-focus area in the previous follow-up process as the center, and focus detection calculations are made for these areas, thus following up the object. In this way, the calculation volume or the like required for following up the object can be sufficiently reduced, and effectiveness of a broad focus detecting area can be exploited.

Not only a simple cross-pattern area, but also various other area patterns may be effectively set on the basis of the cross-pattern area depending on the photographer, object, photographing conditions, and the like.

Modifications

In the above embodiment, the present invention is applied to a single-lens reflex camera as an optical apparatus. However, the present invention is not limited to such specific optical apparatus. For example, the present invention may be applied to a lens shutter camera having a large number of distance measuring areas, and an optical apparatus which has distance measuring or focus detecting areas, and adjusts the focus based on information obtained from such areas.

Figure 15:
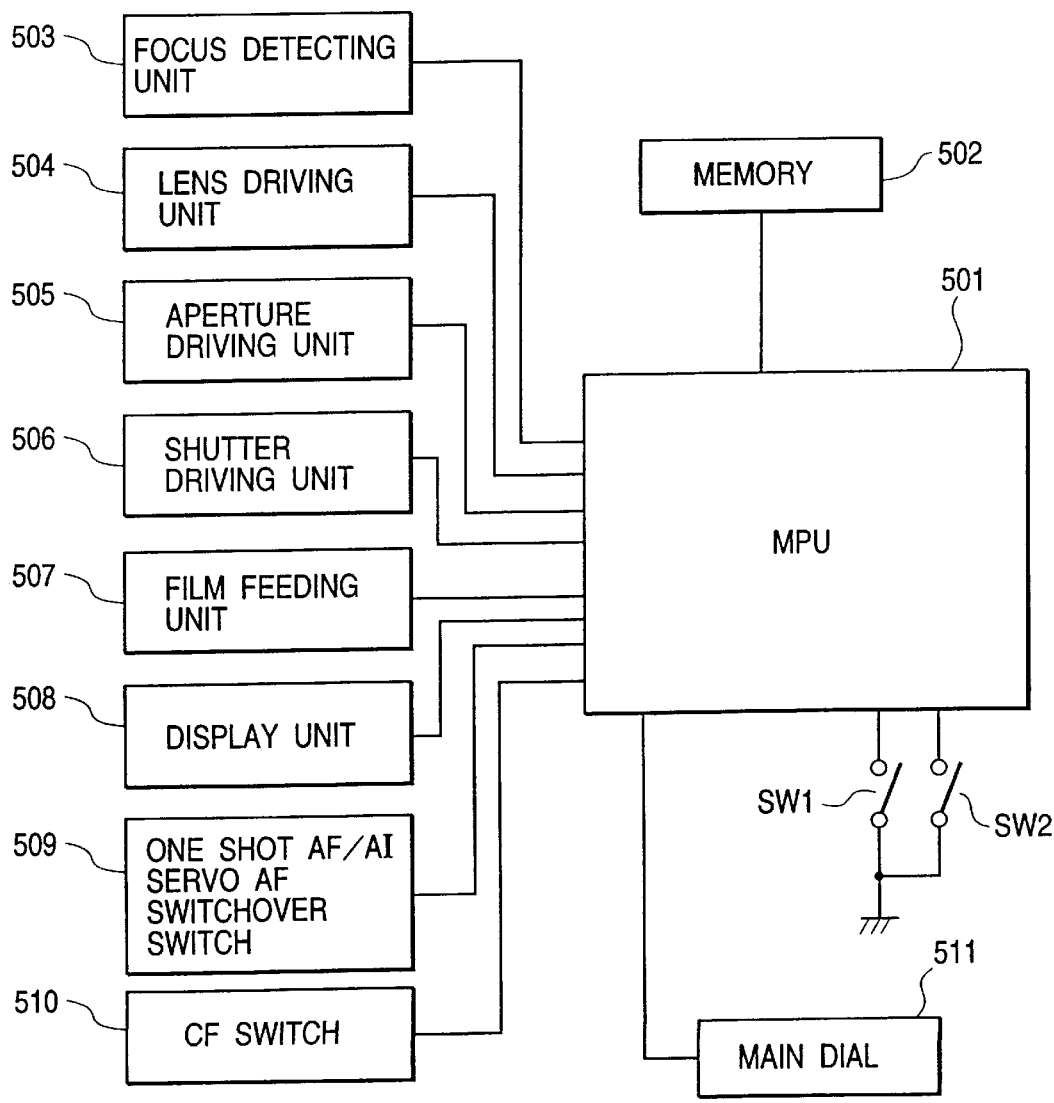
FIG. 15 is a block diagram showing the electrical arrangement of a single-lens reflex camera with an automatic focus detecting function according to the third embodiment.

FIG. 15 is a block diagram showing the electrical arrangement of a single-lens reflex camera having an automatic focus detecting device according to the third embodiment.

Referring to FIG. 15, the camera includes an MPU (microprocessing unit) 501, memory 502, and focus detecting unit 503 for AF (auto-focusing). Note that the MPU 501, memory 502, and focus detecting unit 503 construct a focus detecting device.

The camera also includes a lens driving unit 504 for driving a photographing optical system on the basis of the detection result of the focus detecting unit 503, an aperture driving unit 505, a shutter driving unit 506, and a film feeding unit 507. The camera further includes a display unit 508 for displaying various setup values (aperture value, shutter speed, and the like) of the camera on a liquid crystal display (not shown), and highlighting a specific focus detecting area using a red LED in the frame, which is selected by focus detection control in a ONE SHOT-AF mode.

Also, the camera includes an AF switchover switch 509 for switching an AF mode to one of ONE SHOT-AF and AI SERVO-AF modes, a CF switch 510 for setting a CF (custom function; to be described later), a main dial 511 for setting the shutter speed, aperture value, and the like, a switch SWI which is turned on by first stroke operation (half depression) of a release button, and a switch SW2 which is turned on by second stroke operation (full depression) of the release button.

The main routine of the camera of the third embodiment will be described below with reference to the flow chart shown in FIG. 17.

Normally, the camera shifts to a power saving standby mode when the operator does not perform any operation (to turn on the switch SW1 or set the shutter speed, aperture value, or the like) for a predetermined time after a power supply switch is turned on (#1001→#1002→#1003→#1004), and the MPU 501 halts. If the operator performs some operation (YES in step #1005), the MPU 501 is interrupted to execute various operations or setups corresponding to that operation. Of various operations or setups, AF operation that relates to the present invention will be explained in detail below.

If it is determined in step #1002 that the switch SW1 is ON, the flow jumps to step #1006, and the MPU 501 checks if focus detecting area selection is automatic selection (the MPU 501 automatically selects a focus detecting area) or desired selection (the photographer selects one of 45 focus detecting areas as a desired focus detecting area). As a result, if the focus detecting area is to be automatically selected, the flow advances to step #1007 to execute a "photography on automatic selection of focus detecting area" routine. On the other hand, if the focus detecting area is to be desirably selected, the flow advances to step #1008 to execute a "photography on desired selection of focus detecting area" routine. Since this "photography on desired selection of focus detecting area" is not related to the present invention, a description thereof will be omitted.

The "photography on automatic selection of focus detecting area" executes a series of operations for photographing, and will be explained below with reference to the flow chart shown in FIG. 18.

Photometry is done in step #1102, and a routine for executing "focus detection control" is executed in step #1103. This routine will be described in detail later with reference to the flow charts in FIGS. 19 and 20. Upon completion of the focus detection control routine, i.e., after focus detection has been done, the flow advances to step #1104 to check if the current AF mode is the ONE SHOT-AF or AI SERVO-AF mode.

In the ONE SHOT-AF mode, once lens driving is complete after focus detection, the lens position is held until the switch SW1 is turned off. This mode is suitable for photographing a still object such as a landscape, portrait, or the like. In the AI SERVO-AF mode, focus detection control and lens driving are repeated immediately before the beginning of release operation upon ON of the switch SW2, while the switch SW1 is kept ON. Furthermore, upon detecting movement of an object, lens driving (predicted AF) that takes an AF time lag and release time lag into consideration is made. This mode is suitable for photographing a moving object in motor sports, soccer games, or the like.

If it is determined that the current AF mode is the ONE SHOT-AF mode, the flow advances to step #1105 to check if in-focus is attained. If in-focus is not attained yet, the flow advances to step #1107 to drive the lens. After that, photometry, focus detection control, and lens driving are repeated (#1107→#1102→#1103→#1104→#1105→#1107. . .) until in-focus is attained.

On the other hand, if in-focus is attained, the flow advances to step #1106, and the focus detecting area that underwent focus detection is displayed on a focusing screen. In step #1110, the state of the switch SW2 is checked. Only when the switch SW2 is ON, the flow advances to step #1111 to take a picture. After that, the state of the switch SW1 is checked in step #1112, and if the switch SW1 is ON, the flow advances to step #1113. Since the current AF mode is the ONE SHOT-AF mode, the flow returns from step #1113 to step #1110, and the states of the switches SW2 and SW1 are checked until the switch SW1 is turned off. After that, if the switch SW1 is turned off, the flow advances to step #1114 to end this routine, and the control returns to the main routine shown in FIG. 17.

On the other hand, if the current AF mode is the AI SERVO-AF mode, the flow advances from step #1104 to #1108 to check if in-focus is attained. Only when in-focus is not attained yet, the flow advances to step #1109 to drive the lens.

Subsequently, the state of the switch SW2 is checked in step #1110 as in the ONE SHOT-AF mode. Only when the switch SW2 is ON, the flow advances to step #1111 to take a picture. After that, the state of the switch SW1 is checked in step #1112, and if the switch SW1 is ON, the flow advances to step #1113. Since the current AF mode is the AI SERVO-AF mode, the flow returns from step #1113 to step #1102 to repeat photometry, focus detection control, and lens driving until the switch SW1 is turned off. Then, if the switch SW1 is turned off, the flow advances to step #1114 to end this routine, and the control returns to the main routine shown in FIG. 17.

The "focus detection control" executed in step #1103 in FIG. 18 will be described below with reference to the flow charts in FIGS. 19 and 20.

It is checked in step #1202 if the CF switch (a custom function switch which is used by the operator to change focus detection control in correspondence with an object to be photographed) 510 is ON. If the CF switch is ON, the flow advances to step #1207 to call a "focus detection control in case of CF switch ON" routine, and the control returns to the routine shown in FIG. 18. This routine will be explained in detail later with reference to the flow charts shown in FIGS. 31 and 32. It is then checked in step #1203 if the current AF mode is the ONE SHOT-AF or AI SERVO-AF mode. If the current Af mode is the AI SERVO-AF mode, the flow advances to step #1206 to call a "focus detection control in case of AI SERVO-AF" routine, and the control returns to the routine shown in FIG. 18. This routine will be explained in detail later with reference to the flow charts shown in FIGS. 21 and 22. On the other hand, if the CF switch is OFF and the current AF mode is the ONE SHOT-AF mode, the flow advances to step #1204 to call a "first prior area set" routine. Since this routine is commonly called from the "focus detection control in case of AI SERVO-AF" routine in FIGS. 21 and 22 and "focus detection control in case of CF switch ON" routine in FIGS. 31 and 32, this routine will be described first with reference to the flow chart shown in FIG. 23.

It is checked in step #1402 if the current AF mode is the ONE SHOT-AF or AI SERVO-AF mode. If the current AF mode is the ONE SHOT-AF mode, the flow advances to step #1403; if the current AF mode is the AI SERVO-AF mode, the flow advances to step #1404. In either case, it is checked if the CF switch is ON. As a result, if the current AF mode is the ONE SHOT-AF mode and the CF switch is OFF, the flow advances from step #1403 to step #1405 to set a first prior area in case of ONE SHOT-AF; if the CF switch is ON, the flow advances from step #1403 to step #1406 to set a first prior area in case of ONE SHOT-AF and CF switch ON. On the other hand, if the current AF mode is the AI SERVO-AF mode and the CF switch is OFF, the flow advances from step #1404 to step #1407 to set a first prior area in case of AI SERVO-AF; if the CF switch is ON, the flow advances from step #1404 to step #1408 to set a first prior area in case of AI SERVO-AF and CF switch ON.

Figure 19:
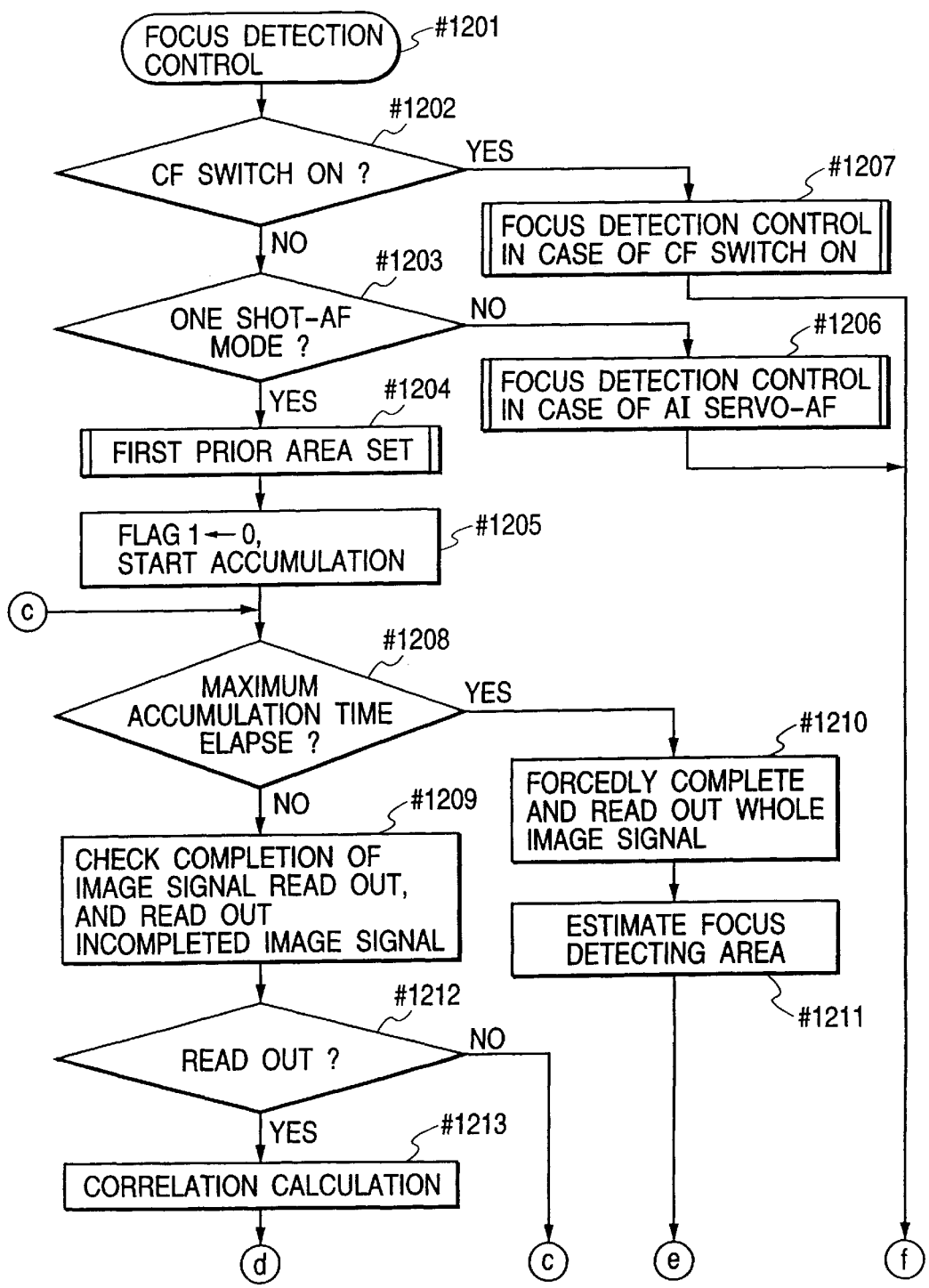
FIG. 19 is a flow chart showing some steps of focus detection control executed in step #1103 in FIG. 18.
Figure 23:
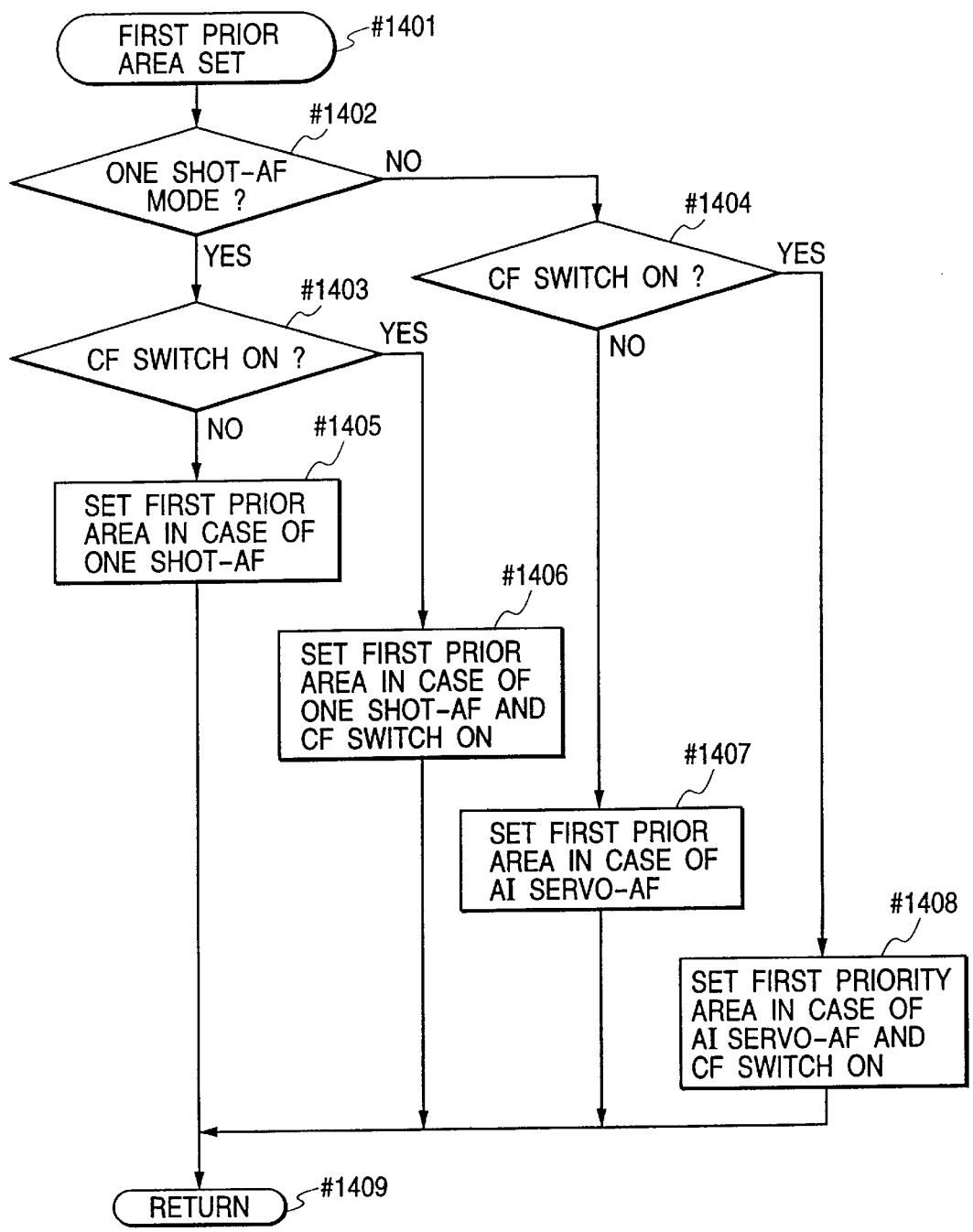
FIG. 23 is a flow chart showing setups of a first prior area executed in step #1204 in FIG. 19 and step #1302 in FIG. 21.
Figure 25A:
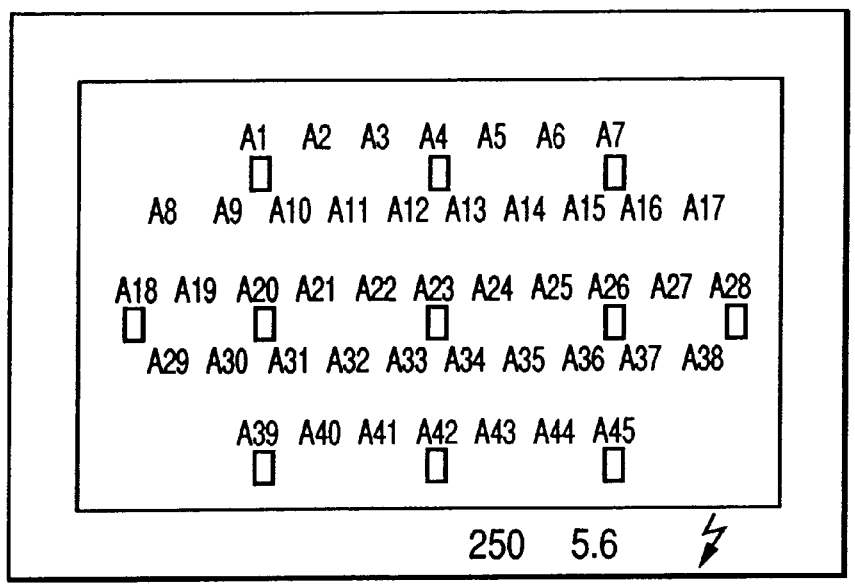
FIGS. 25A and 25B show a plurality of groups of focus detecting areas, which are obtained by grouping 45 focus detecting areas in the camera according to the third embodiment.

If this "first prior area set" routine shown in FIG. 23 is called from step #1204 in FIG. 19, the first prior area in case of ONE SHOT-AF is set in step #1405 shown in FIG. 23. More specifically, in this setup, as shown in FIG. 25A, a total of 11 focus detecting areas A1, A4, A7, A18, A20, A23, A26, A28, A39, A42, and A45 bounded by black frames of the 45 focus detecting areas are set as the first prior area.

Referring back to FIG. 19, after the first prior area is set, the flow advances to step #1205, and "0" is substituted in a variable FLAG1 to start accumulation of a focus detecting sensor. In step #1208, the maximum accumulation time is checked. If the sensor accumulation is not complete after an elapse of a pre-set time (maximum accumulation time), the flow advances to step #1210 to forcibly complete the sensor accumulation and to read out all image signals. In step #1211, the focus detecting areas are estimated, i.e., a final focus detecting area (an area from which the defocus amount used in focus adjustment is obtained) is selected as a focus detecting area most suitably corresponding to the main object position (to be also referred to as an effective focus detecting area hereinafter) from the 45 focus detecting areas. An example of the method of determining the final focus detecting area will be explained later in a description of estimation of the first prior area (to be described later). The flow advances to step #1221, and the selected focus detecting area is set as the final focus detecting area from which the defocus amount used in lens driving is obtained.

On the other hand, if it is determined in step #1208 that the maximum accumulation time has not elapsed yet, the flow advances to step #1209 to check completion of image signal read-out and to read out an incomplete image signal. In this step, it is checked if accumulation of each sensor is complete. If an accumulation-completed sensor is found and an image signal is not read out from that sensor yet, the image signal is read out from the sensor. It is checked in step #1212 if a new image signal has been read out. If no new image signal is read out, the step of checking completion of image signal read-out and reading out an incomplete image signal is repeated (#1212→#1208. . .) until the maximum accumulation time is reached.

If it is determined that a new image signal has been read out, the flow advances to step #1213 to make a correlation calculation of that image signal. Upon completion of the correlation calculation, the flow advances to step #1214 shown in FIG. 20 to check if FLAG1=0. Note that FLAG1 is a flag variable which is set at 1 when correlation calculations are complete for all the focus detecting areas in the first prior area; otherwise, 0. If it is determined that FLAG1= 0, the flow advances to step #1215 to check if correlation calculations are complete for all the focus detecting areas in the first prior area as a result of read-out of a new image signal in step #1209. If it is determined that the correlation calculations are not complete yet, the step of checking completion of image signal read-out and reading out an incomplete image signal, and the step of making a correlation calculation are repeated (#1215→#1208→#1209. . .) until the maximum accumulation time is reached.

On the other hand, if it is determined that the correlation calculations are complete, the flow advances to step #1216 to set FLAG1 at "1", and the first prior area is estimated in step #1217 to determine an effective focus detecting area of the first prior area as a final preselected focus detecting area.

Figure 29:
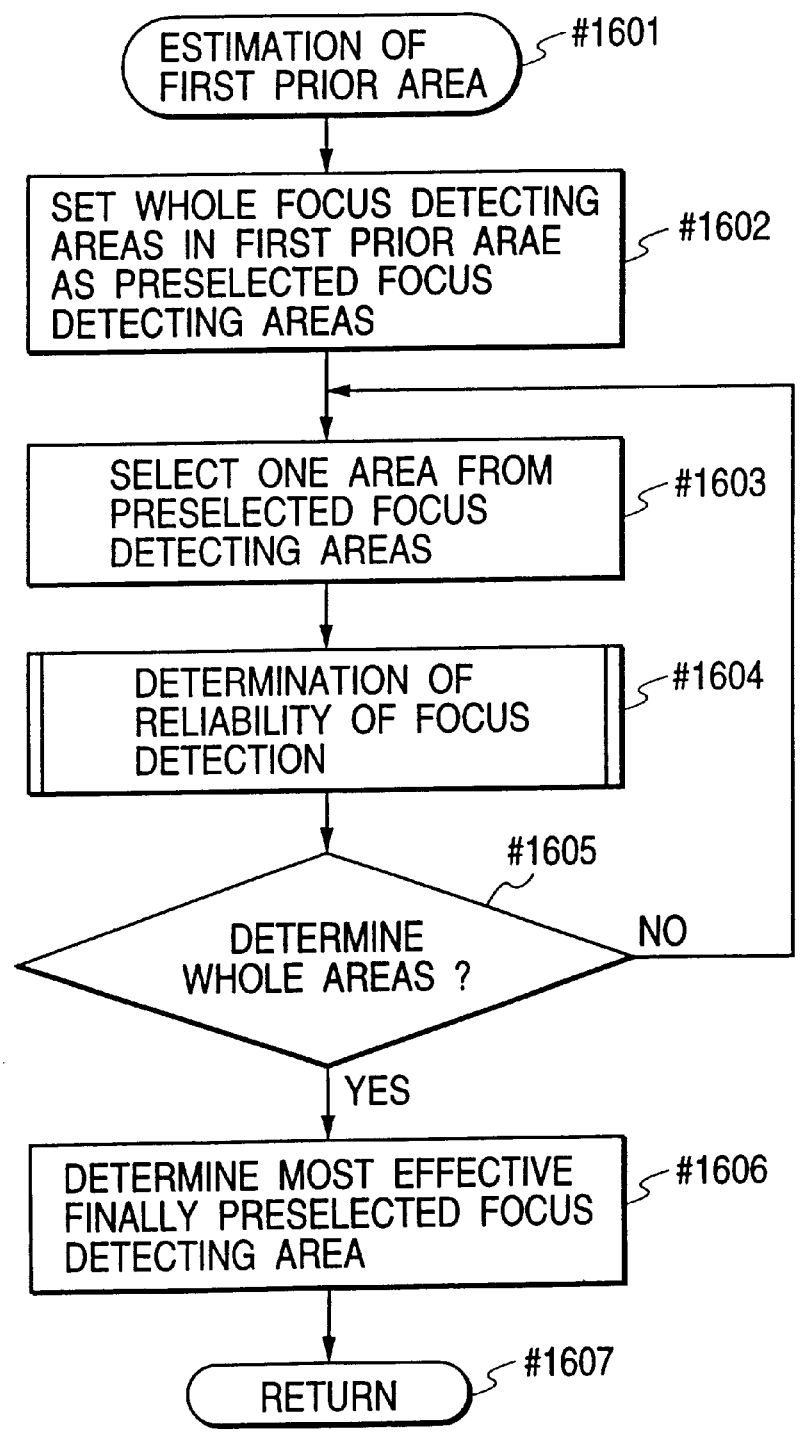
FIG. 29 is a flow chart showing estimation of a first prior area executed in step #1216 in FIG. 20 and step #1314 in FIG. 22.

More specifically, as shown in the flow chart in FIG. 29, all the focus detecting areas of the first prior area are set as preselected focus detecting areas in step #1602. In step #1604, the reliability of focus detection of each focus detecting area in the first prior area is checked. The reliability of focus detection is obtained in consideration of two factors, i.e., contrast and the degree of agreement between two image signals paired upon calculating a relative positional displacement, as shown in steps #1702 to #1707 in FIG. 30. Since this operation is known to those who are skilled in the art, a detailed description thereof will be omitted.

Upon completion of checking of reliability of all the areas, the flow advances to step #1606 to determine a most effective preselected focus detecting area from those whose reliability meets a given reference value. The preselected focus detecting area is totally determined on the basis of weights set in advance in the individual focus detecting areas in the frame, defocus amounts calculated by the correlation calculations, and the like. Various methods of determining the preselected focus detecting area have been proposed, are known to those who are skilled in the art, and do not directly relate to the present invention. Hence, a detailed description thereof will be omitted.

Referring back to FIG. 20, it is checked in step #1218 if the reliability of the preselected focus detecting area is larger than a predetermined reference value. If it is determined that the reliability is larger than the reference value, the flow advances to step #1221, and this area is set as a final focus detecting area from which the defocus amount used in lens driving is obtained.

Figure 25B:
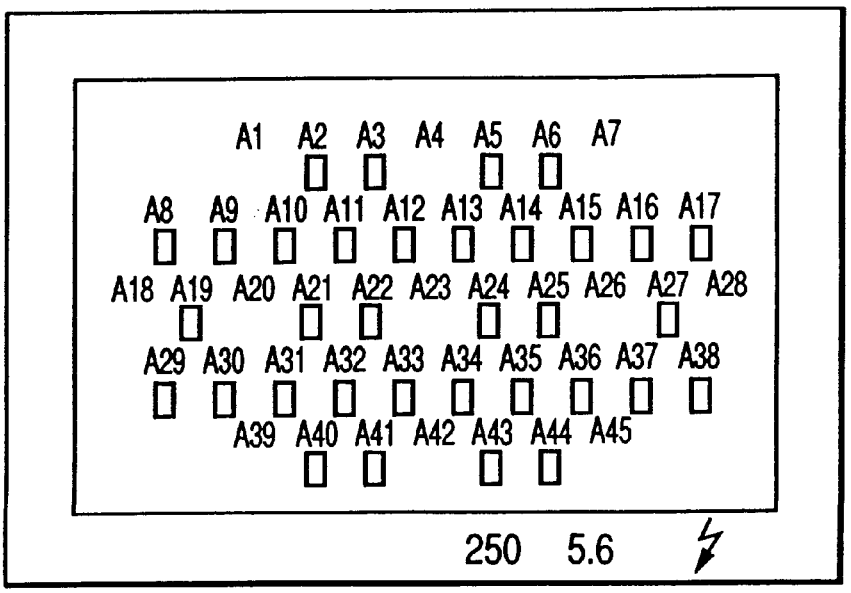

On the other hand, if the reliability is equal to or smaller than the reference value, since focus detecting areas other than the first prior area shown in FIG. 25B may include a more effective focus detecting area, the flow returns to step #1208 in FIG. 19 to check the remaining focus detecting areas.

More specifically, since FLAG1 has already been set at "1" in step #1216, the flow advances from step #1214 to step #1219, thus repeating the step of checking completion of image signal read-out and reading out an incomplete image signal, and the step of making a correlation calculation are repeated until the maximum accumulation time is reached. If it is determined in step #1219 that correlation calculations of all the remaining focus detecting areas are complete, the flow advances to step #1220 to estimate the remaining focus detecting areas. In this case, a focus detecting area with the largest estimation value is selected from those of the areas in the first prior area and other focus detecting areas. Upon completion of selection, the flow advances to step #1221 to set the selected area as the final focus detecting area from which the defocus amount used in lens driving is obtained.

In the ONE SHOT-AF mode, the 45 focus detecting areas in the frame are divided into two groups, as shown in FIGS. 25A and 25B, and one (including 11 areas shown in FIG. 25A) of the two groups is set as a first prior area. Calculations and reliability estimation are done in this group, and if the estimation result meets a predetermined reference value, the calculations are completed in that group. That is, neither calculations nor estimation are done in the other group (shown in FIG. 25B).

In the above arrangement, in the ONE SHOT-AF mode that does not consider any movement of an object, since focus detection is not always made on all focus detecting areas, quick, accurate focus detection can be attained especially for a landscape object or the like.

The "focus detection control in case of AI SERVO-AF" routine executed in step #1206 in FIG. 19 will be described below with reference to the flow charts in FIGS. 21 and 22. The basic flow of the processing is substantially the same as that of the focus detection control shown in FIGS. 19 and 20, and the "focus detection control in case of CF switch ON" routine shown in FIGS. 31 and 32 (to be described later).

In step #1302, the "first prior area set" routine shown in FIG. 23 is called. This routine is commonly called from the "focus detection control" shown in FIG. 19, and the "focus detection control in case of CF switch ON" routine shown in FIGS. 31 and 32 (to be described later), as described above. When this routine is called from step #1302, a first prior area in case of AI SERVO-AF is set in step #1407 in FIG. 23.

More specifically, in this setup, as shown in FIG. 27A, only a central focus detecting area A23 bounded by a black frame of the 45 focus detecting areas is set as the first prior area. However, this state is a default state. As described above, since the AI SERVO-AF mode is a photographing mode that makes lens driving follow up object movement, when the object has moved and the focus detecting area has also moved while focus detection is repeated, that focus detecting area is set as the first prior area.

Referring back to FIG. 21, after the first prior area is set, the flow advances to step #1303 to substitute "0" in variables FLAG1 and FLAG2, thus starting accumulation of the focus detecting sensor.

When the flow advances to step #1304 upon starting accumulation, the maximum accumulation time is checked. If the sensor accumulation is not complete after an elapse of a pre-set time (maximum accumulation time), the flow advances to step #1308 to forcibly complete the sensor accumulation and to read out all image signals. In step #1309, the focus detecting areas are estimated, i.e., a most effective focus detecting area is selected from the focus detecting areas from which image signals have been read out. The flow then advances to step #1324 to set the selected area as the final focus detecting area from which the defocus amount used in lens driving is obtained.

If it is determined in step #1304 that the maximum accumulation time has not elapsed yet, the flow advances to step #1305 to check completion of image signal read-out and to read out an incomplete image signal. In this step, it is checked if accumulation of each sensor is complete. If an accumulation-completed sensor is found and an image signal is not read out from that sensor yet, the image signal is read out from the sensor. It is checked in step #1306 if a new image signal has been read out. If no new image signal is read out, the step of checking completion of image signal read-out and reading out an incomplete image signal is repeated (#1306→#1304→#1305→#1306. . .) until the maximum accumulation time is reached.

If it is determined that a new image signal has been read out, the flow advances to step #1307 to make a correlation calculation of that image signal. Upon completion of the correlation calculation, the flow advances to step #1310 to check if FLAG2=0. Note that FLAG2 is a flag variable which is set at 1 when correlation calculations are complete for all the focus detecting areas in a second prior area (to be described later); otherwise, 0. If it is determined that FLAG2=0, the flow advances to step #1311 in FIG. 22; otherwise, the flow advances to step #1317.

Figure 22:
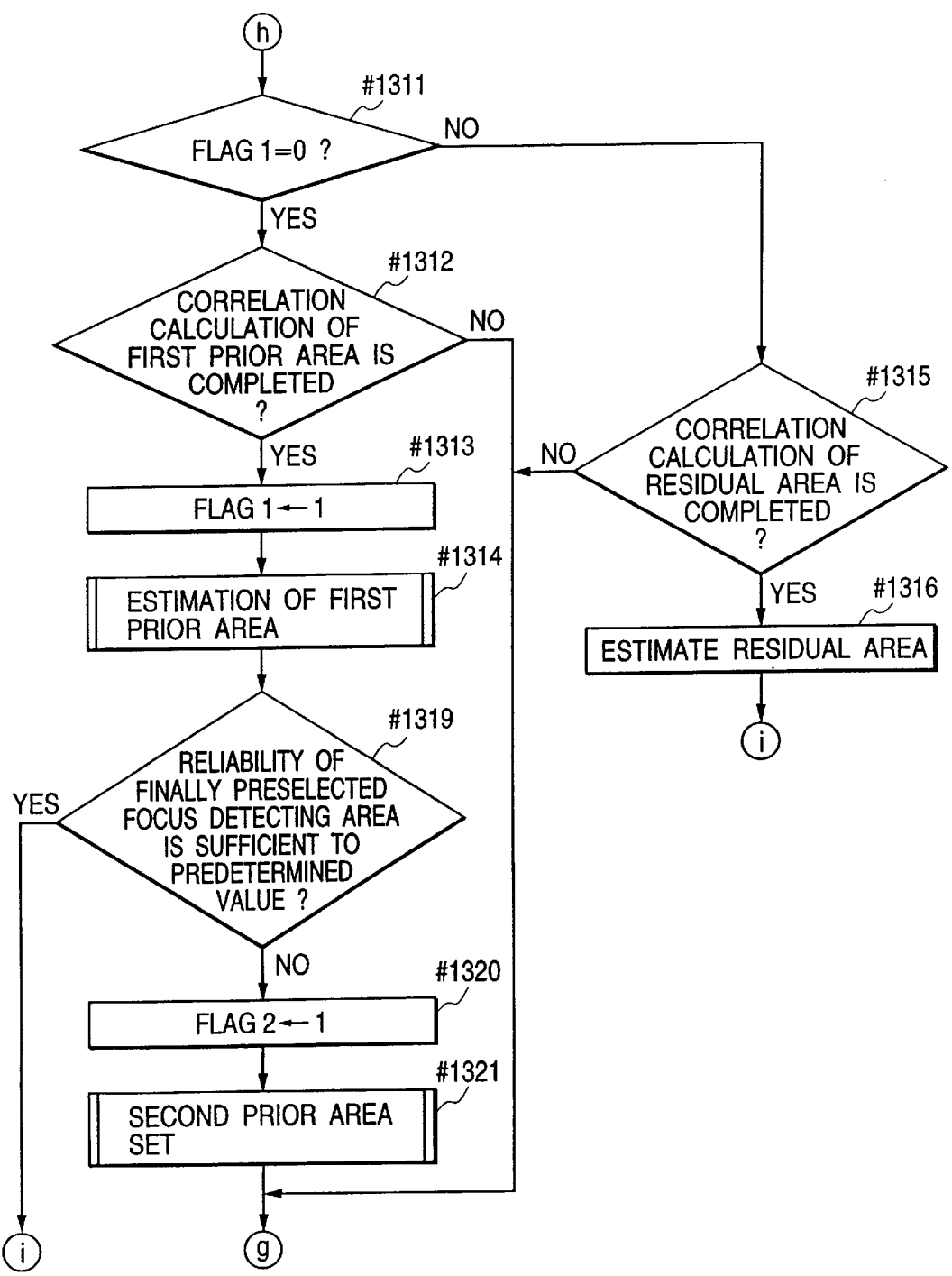
FIG. 22 is a flow chart showing the remaining steps of the control shown in FIG. 21.

When the flow advances to step #1311 in FIG. 22, it is checked in turn if FLAG1=0. As described above, FLAG1 is a flag variable which is set at 1 when correlation calculations are complete for all the focus detecting areas in the first prior area; otherwise, 0. If it is determined that FLAG1=0, the flow advances to step #1312 to check if correlation calculations are complete for all the focus detecting areas in the first prior area as a result of read-out of a new image signal in step #1305. If it is determined that the correlation calculations are not complete yet, the step of checking completion of image signal read-out and reading out an incomplete image signal, and the step of making a correlation calculation are repeated (#1312→#1304→#1305. . .) until the maximum accumulation time is reached.

On the other hand, if it is determined that the correlation calculations are complete, the flow advances to step #1313 to set FLAG1 at "1", and the first prior area is estimated in step #1314 to determine an effective focus detecting area of the first prior area as a final preselected focus detecting area, as described earlier.

It is then checked in step #1319 if the reliability of the determined preselected focus detecting area is larger than a predetermined reference value. If it is determined that the reliability is larger than the reference value, the flow advances to step #1324 in FIG. 21, and this area is set as a final focus detecting area from which the defocus amount used in lens driving is obtained.

On the other hand, if the reliability is equal to or smaller than the reference value, since the second prior area shown in FIG. 27B other than the first prior area may include a more effective focus detecting area, the flow advances to step #1320 to set FLAG2 at "1". In step #1321, a "second prior area set" routine is executed. Since this routine is commonly called from the "focus detection control in case of CF switch ON" routine shown in FIGS. 31 and 32, this routine will be explained below using the flow chart shown in FIG. 24.

It is checked in step #1502 if the current AF mode is the ONE SHOT-AF or AI SERVO-AF mode. If the current AF mode is the ONE SHOT-AF mode, the flow advances to step #1503 to set a second prior area in case of ONE SHOT-AF and CF switch ON. If the current AF mode is the AI SERVO-AF mode, the flow advances to step #1504 to check if the CF switch is ON. If the current AF mode is the AI SERVO-AF mode and the CF switch is OFF, the flow advances to step #1505 to set a second prior area in case of AI SERVO-AF; if the current AF mode is the AI SERVO-AF mode and the CF switch is ON, the flow advances to step #1506 to set a second prior area in case of AI SERVO-AF and CF switch ON.

Figure 24:
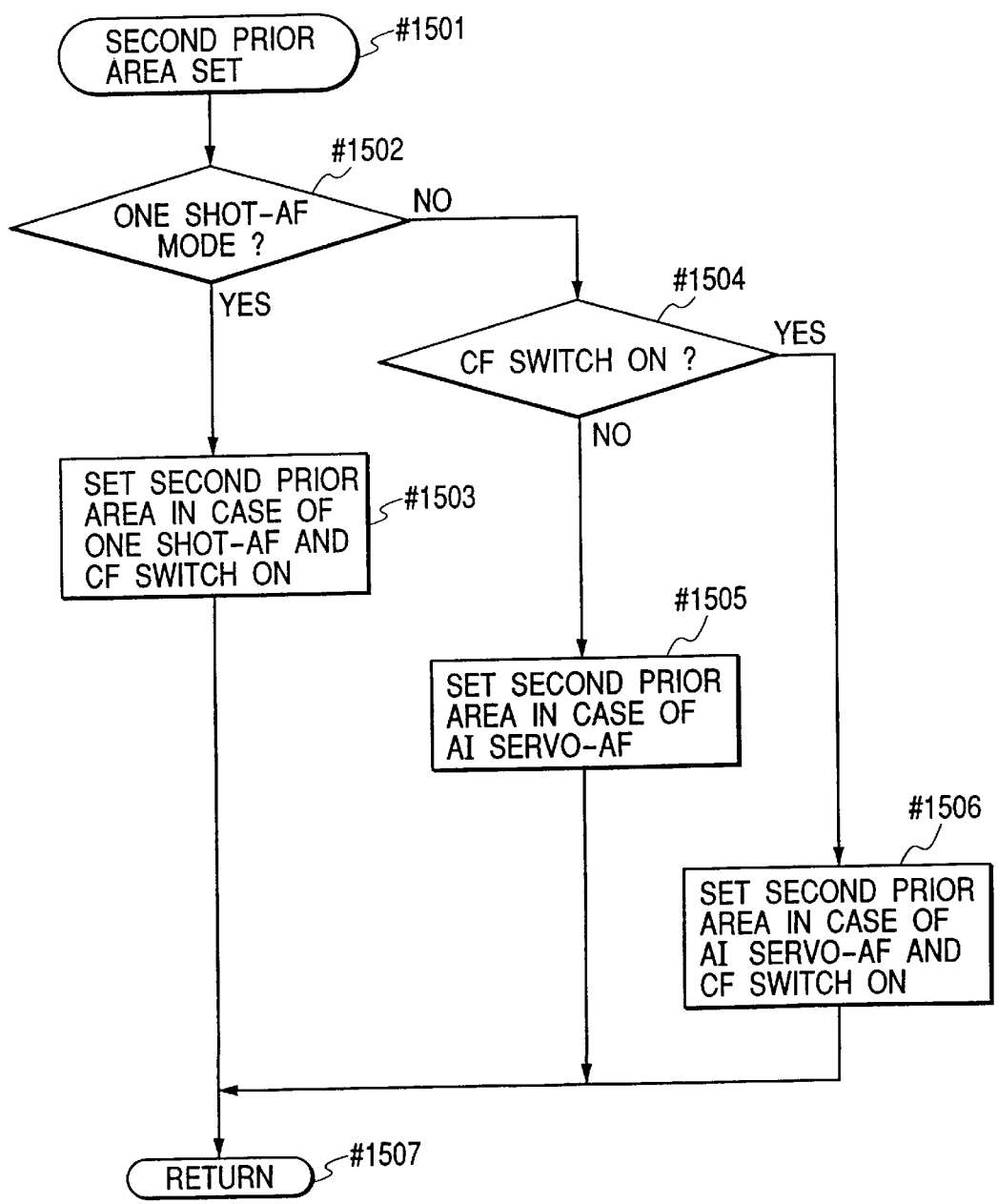
FIG. 24 is a flow chart showing setups of a second prior area executed in step #1321 in FIG. 22.

Referring back to FIG. 22, when the "second prior area set" routine is called from step #1321, the second prior area in case of AI SERVO-AF is set in step #1505 in FIG. 24 above. More specifically, when the focus detecting area A23 shown in FIG. 27A is set as the first prior area, a total of six focus detecting areas A1, A13, A22, A24, A33, and A34 around the focus detecting area A23 are set as the second prior area, as shown in FIG. 27B.

Figure 21:
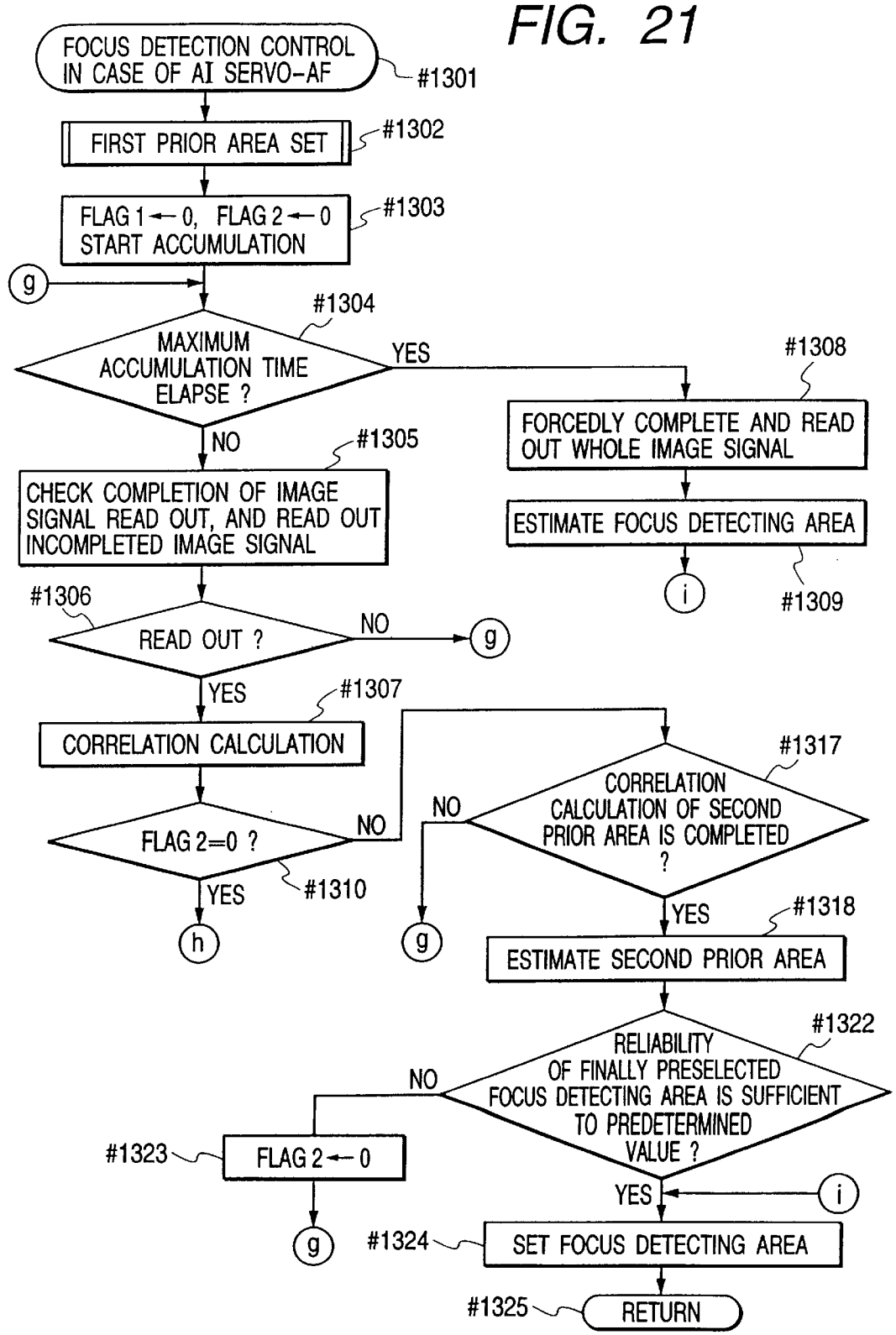
FIG. 21 is a flow chart showing some steps of focus detection control executed in step #1206 in FIG. 19.

As described previously, after FLAG2 is set at "1" in step #1320 and the second prior area is set in step #1321, the flow advances from step #1310 in FIG. 21 to step #1317 so as to repeat the step of checking completion of image signal read-out and reading out an incomplete image signal, and the step of making a correlation calculation (#1321→#1304→#1305→#1306→#1307→#1310→#1317...) until the maximum accumulation time is reached. If it is determined in step #1317 that correlation calculations are complete for all the focus detecting areas in the second prior area, the flow advances to step #1318. In step #1318, the areas included in the second prior area are estimated to select a most effective preselected focus detecting area therefrom. It is then checked in step #1322 if the reliability of the determined preselected focus detecting area exceeds a predetermined reference value. If it is determined that the reliability exceeds the reference value, the flow advances to step #1324 to set the selected area as a final focus detecting area from which the defocus amount used in lens driving is obtained.

On the other hand, if the reliability is equal to or smaller than the reference value, the flow advances to step #1323 to reset FLAG2 to zero (FLAG1=1 at that time). Since focus detecting areas (FIG. 27C) other than the first and second prior areas may include a more effective focus detecting area, the flow returns to step #1304 in FIG. 21 so as to check the remaining focus detecting areas.

More specifically, if FLAG2=0 and FLAG1=1, the flow advances from step #1310 to step #1311 and from step #1311 to step #1315, thus repeating the step of checking completion of image signal read-out and reading out an incomplete image signal, and the step of making a correlation calculation (#1323→#1304→#1305 →#1306→#1307→#1310→#1311→#1315...) until the maximum accumulation time is reached. If it is determined in step #1315 that correlation calculations are complete for the remaining focus detecting areas, the flow advances to step #1316 to estimate the remaining focus detecting areas. In this case, a focus detecting area with the highest estimation result is selected from those in the first and second prior areas and other focus detecting areas. After selection, the flow advances to step #1324 in FIG. 21 to set the selected area as a final focus detecting area from which the defocus amount used in lens driving is obtained.

In the above-mentioned AI SERVO-AF mode, the 45 focus detecting areas in the frame are divided into the first and second prior area groups shown in FIGS. 27A and 27B in accordance with the previously selected final focus detecting area (normally, the final focus detecting area from which the defocus amount used in the previous lens driving was obtained) (in this case, since the AI SERVO-AF mode is selected, these groups dynamically change in correspondence with the previously selected final focus detecting area), the calculations and estimations of these groups are executed in a given priority order, and are ended when the estimation result of each group meets a predetermined reference value.

In the aforementioned arrangement, by exploiting the fact that a focus detecting area selected once tends to be selected again when the photographer follows up a moving object within the frame in the AI SERVO-AF mode that considers object movement, estimations are made by dividing the focus detecting areas into a plurality of groups to have the focus detecting area selected once as the center, and a focus detection result that satisfies the photographer is obtained using an intermediate estimation result by ending calculations before executing focus detection on all the focus detecting areas. Hence, even when fast focus detection is required for a moving object like in motor sports depending on photographing conditions, accurate focus detection can be attained.

The "focus detection control in case of CF switch ON" routine executed in step #1207 shown in FIG. 19 will be described below with reference to the flow chart in FIGS. 31 and 32.

In step #1802, the "first prior area set" routine shown in FIG. 23 is called. This routine is also commonly called from the focus detection control routine shown in FIG. 19. When this routine is called from step #1802, if the CF switch is ON and the current AF mode is the ONE SHOT-AF mode, a first prior area in case of ONE SHOT-AF and CF switch ON is set in step #1406; if the CF switch is ON and the current AF mode is the AI SERVO-AF mode, a first prior area in case of AI SERVO-AF and CF switch ON is set in step #1408, as shown in FIG. 23.

Figure 26A:
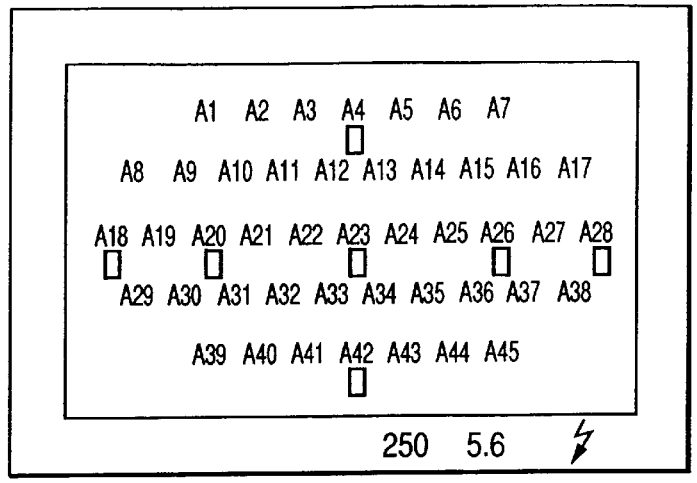
FIGS. 26A, 26B and 26C show a plurality of groups of focus detecting areas, which are obtained by grouping 45 focus detecting areas in case of ONE SHOT-AF and CF switch ON in the camera according to the third embodiment.

More specifically, upon setting the first prior area in case of ONE SHOT-AF and CF switch ON in step #1406, a total of seven focus detecting areas A4, A18, A20, A23, A26, A28, and A42 of the 45 focus detecting areas are set as the first prior area, as shown in FIG. 26A.

On the other hand, upon setting the first prior area in case of AI SERVO-AF and CF switch ON in step #1408, the previously selected final focus detecting area is combined in addition to the above first prior area setups. As described above, the AI SERVO-AF mode makes lens driving follow up movement of the object. For example, when the object has moved while focus detection is repeated, and the main focus detecting area has moved to A6 in FIG. 28A, focus detecting areas A4, A18, A20, A23, A26, A28, and A42 are set as the first prior area in addition to that focus detecting area A6.

Referring back to FIG. 31, after the first prior area is set in correspondence with the current photographing mode, the flow advances to step #1803 to substitute "0" in variables FLAG1 and FLAG2, thus starting accumulation of the focus detecting sensor.

When the flow advances to step #1804 upon starting accumulation, the maximum accumulation time is checked. If the sensor accumulation is not complete after an elapse of a pre-set time (maximum accumulation time), the flow advances to step #1808 to forcibly complete the sensor accumulation and to read out all image signals. In step #1809, the focus detecting areas are estimated, i.e., a most effective focus detecting area is selected from the focus detecting areas from which image signals have been read out. The flow then advances to step #1824 to set the selected area as the final focus detecting area from which the defocus amount used in lens driving is obtained.

If it is determined in step #1804 that the maximum accumulation time has not elapsed yet, the flow advances to step #1805 to check completion of image signal read-out and to read out an incomplete image signal. In this step, it is checked if accumulation of each sensor is complete. If an accumulation-completed sensor is found and an image signal is not read out from that sensor yet, the image signal is read out from the sensor. It is checked in step #1806 if a new image signal has been read out. If no new image signal is read out, the step of checking completion of image signal read-out and reading out an incomplete image signal is repeated (#1806→#1804→#1805→#1806. . .) until the maximum accumulation time is reached.

If it is determined that a new image signal has been read out, the flow advances to step #1807 to make a correlation calculation of that image signal. Upon completion of the correlation calculation, the flow advances to step #1810 to check if FLAG2=0. Note that FLAG2 is a flag variable which is set at 1 when correlation calculations are complete for all the focus detecting areas in a second prior area (to be described later); otherwise, 0. If it is determined that FLAG2=0, the flow advances to step #1811 in FIG. 32; otherwise, the flow advances to step #1817.

Figure 32:
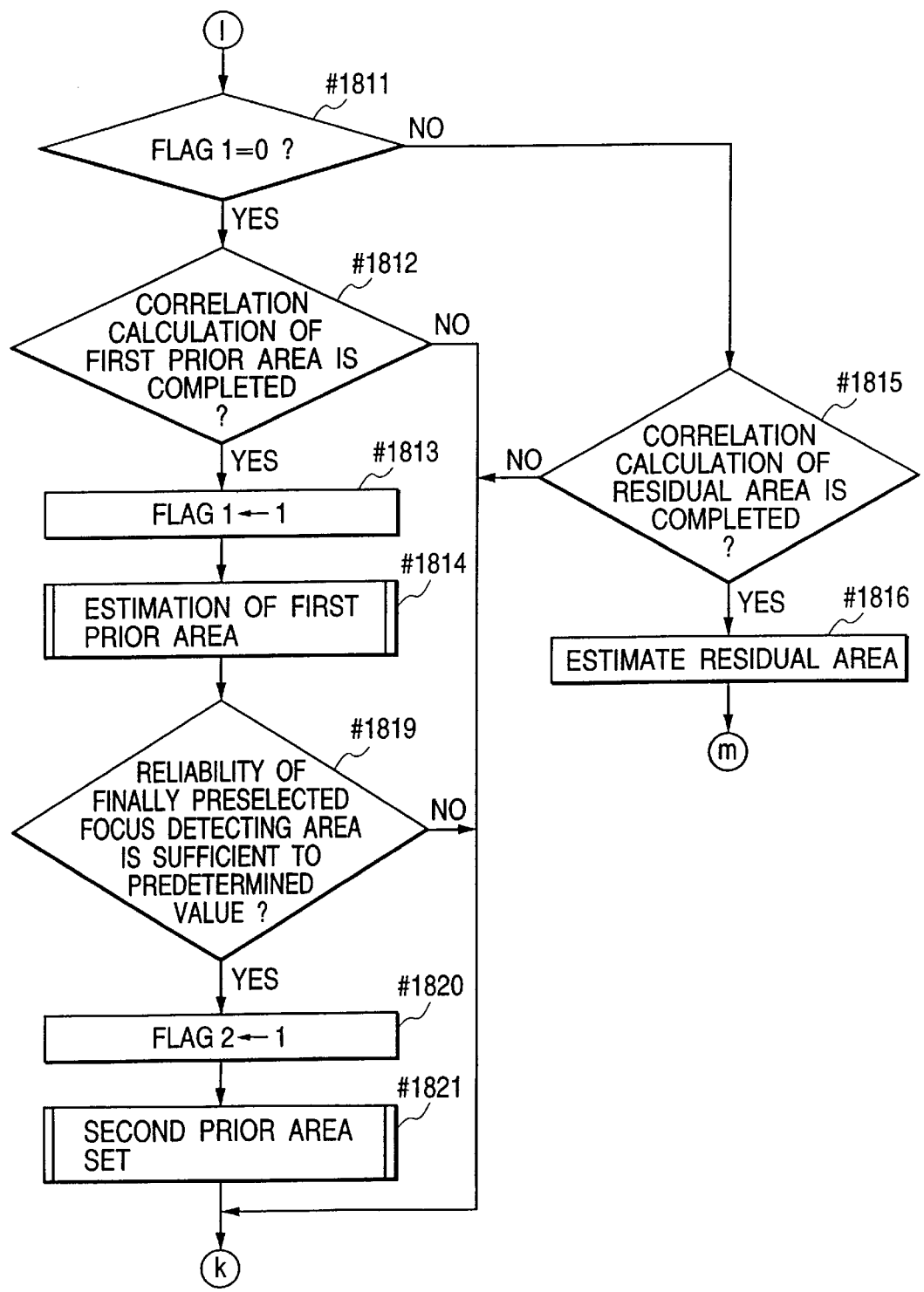
FIG. 32 is a flow chart showing the remaining steps of the control shown in FIG. 31.

When the flow advances to step #1811 in FIG. 32, it is checked in turn if FLAG1=0. As described above, FLAG1 is a flag variable which is set at 1 when correlation calculations are complete for all the focus detecting areas in the first prior area; otherwise, 0. If it is determined that FLAG1=0, the flow advances to step #1812 to check if correlation calculations are complete for all the focus detecting areas in the first prior area as a result of read-but of a new image signal in step #1805. If it is determined that the correlation calculations are not complete yet, the step of checking completion of image signal read-out and reading out an incomplete image signal, and the step of making a correlation calculation are repeated (#1812→#1804→#1805. . .) until the maximum accumulation time is reached.

On the other hand, if it is determined that the correlation calculations are complete, the flow advances to step #1813 to set FLAG1 at "1", and the first prior area is estimated in step #1814. Then, a most effective preselected focus detecting area is determined from those in the first prior area. It is then checked in step #1819 if the reliability of the determined preselected focus detecting area is larger than a predetermined reference value. If it is determined that the reliability is larger than the reference value, the flow advances to step #1820 to set FLAG2 at "1", and the "second prior area set" routine is executed in step #1821. This routine is also commonly called from the "focus detection control in case of AI SERVO-AF" routine shown in FIG. 21, as described above. When this routine is called from step #1821, if the CF switch is ON and the current AF mode is the ONE SHOT-AF mode, a second prior area in case of ONE SHOT-AF and CF switch ON is set in step #1503; if the CF switch is ON and the current AF mode is the AI SERVO-AF mode, a second prior area in case of AI SERVO-AF and CF switch ON is set in step #1506, as shown in FIG. 24.

Figure 26B:
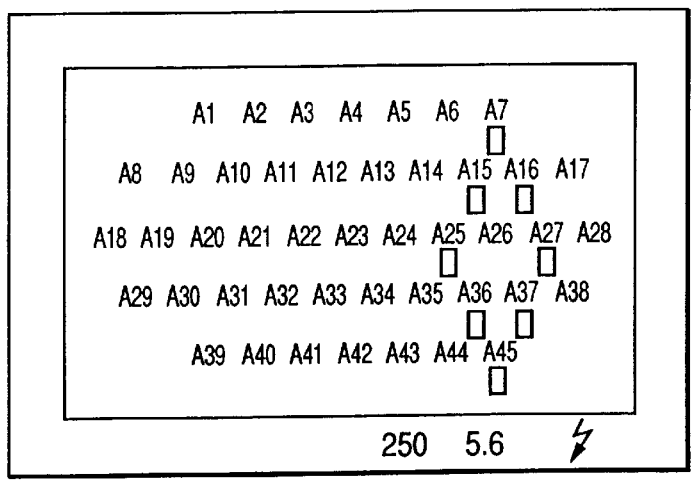

More specifically, upon setting the second prior area in case of ONE SHOT-AF and CF switch ON in step #1503, for example, when it is determined that a focus detecting area A26 of the seven focus detecting areas shown in FIG. 26A is effective, a total of eight focus detecting areas A7, A15, A16, A25, A27, A36, A37, and A45 around the focus detecting area A26 are set as the second prior area, as shown in FIG. 26B.

Figure 28A:
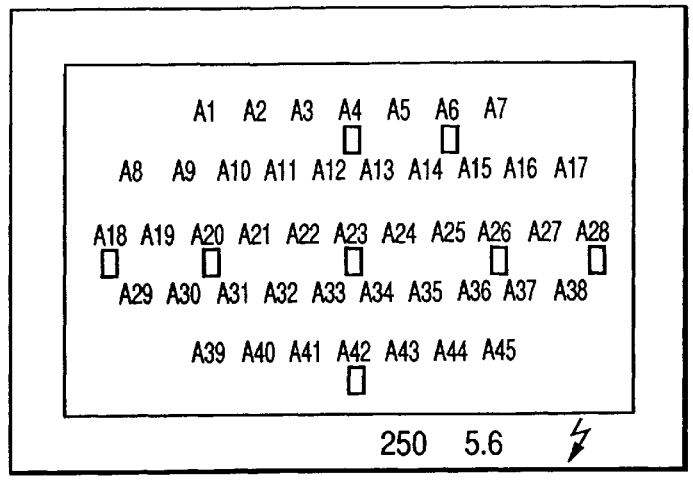
FIGS. 28A, 28B and 28C show a plurality of groups of focus detecting areas, which are obtained by grouping 45 focus detecting areas in case of AI SERVO-AF and CF switch ON in the camera according to the third embodiment.
Figure 28B:
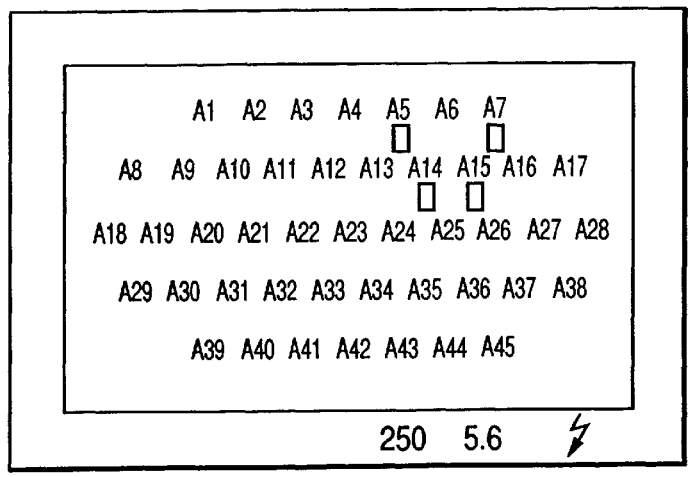

On the other hand, upon setting the second prior area in case of AI SERVO-AF and CF switch ON in step #1506, when it is determined that a focus detecting area A6 of the eight focus detecting areas shown in FIG. 28A is effective, a total of four focus detecting areas A5, A7, A14, and A15 around the focus detecting areas A6 are set as the second prior area, as shown in FIG. 28B.

Referring back to FIG. 32, if it is determined in step #1819 that the reliability of the preselected focus detecting area determined in step #1814 does not exceed the predetermined reference value, the first prior area does not include any effective focus detecting area, but other focus detecting areas may include a more effective focus detecting area. Hence, the flow returns to step #1804 in FIG. 31 to check the remaining focus detecting areas.

More specifically, since FLAG1 is set at "1" in step #1813 in FIG. 32, the flow advances from step #1811 to step #1815 to repeat the step of checking completion of image signal read-out and reading out an incomplete image signal, and the step of making a correlation calculation until the maximum accumulation time is reached. If it is determined in step #1815 that correlation calculations are complete for all the remaining focus detecting areas, the flow advances to step #1816 to estimate the remaining focus detecting areas. In this step, a focus detecting area with the highest estimation result is selected from all the focus detecting areas. After selection, the flow advances to step #1824 in FIG. 31 to set the selected area as a final focus detecting area from which the defocus amount used in lens driving is obtained.

Figure 31:
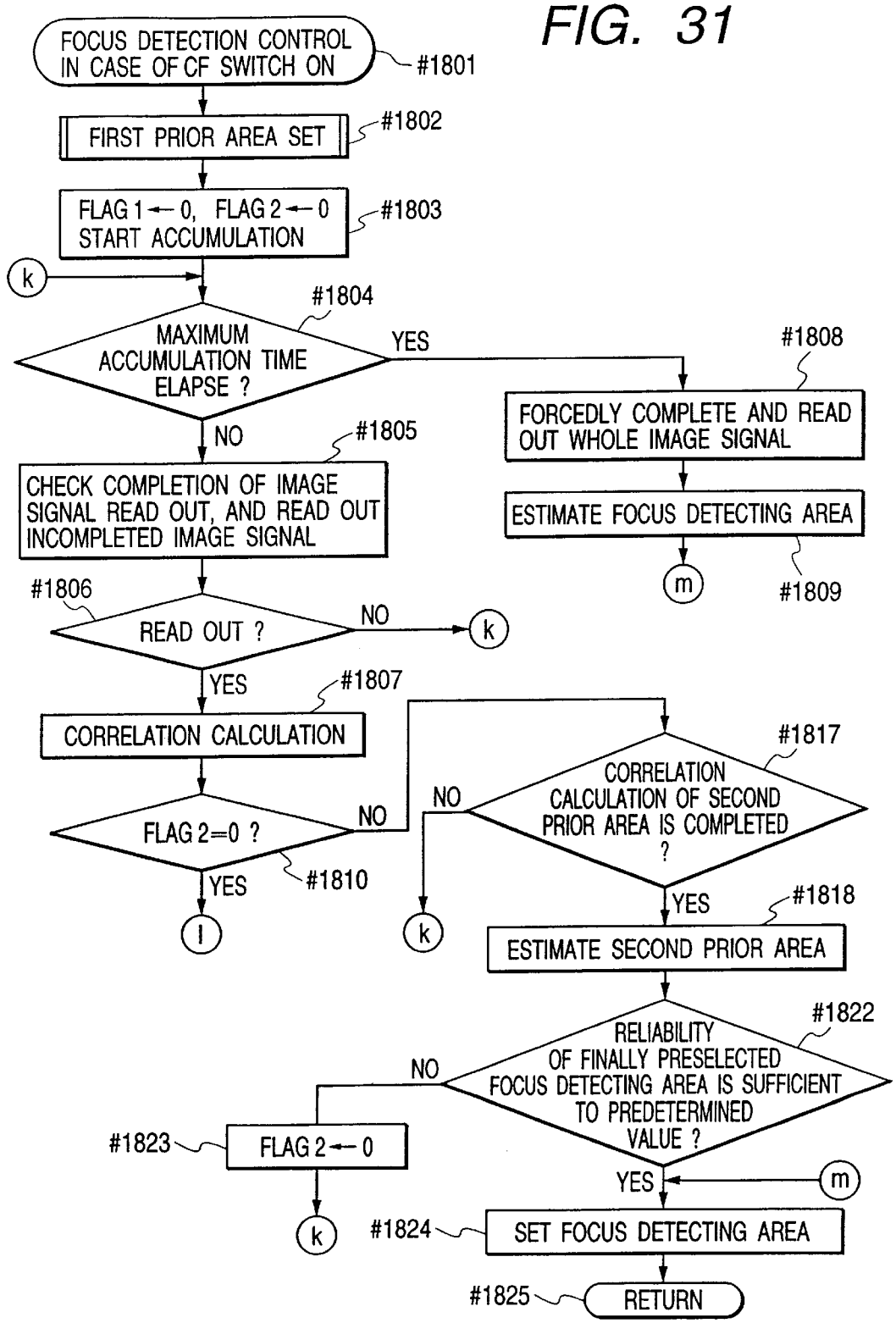
FIG. 31 is a flow chart showing some steps of focus detection control executed in step #1207 in FIG. 19.

On the other hand, after FLAG2 is set at "1" in step #1820 and the second prior area is set in step #1821 in FIG. 32, the flow advances from step #1810 in FIG. 31 to step #1817 to repeat the step of checking completion of image signal read-out and reading out an incomplete image signal, and the step of making a correlation calculation until the maximum accumulation time is reached. If it is determined in step #1817 that correlation calculations are complete for all the focus detecting areas in the second prior area, the flow advances to step #1818 to estimate the areas in the second prior area, thus determining a most effective focus detecting area in the second prior area as a preselected focus detecting area. It is then checked in step #1822 if the reliability of the determined preselected focus detecting area exceeds a predetermined reference value. If it is determined that the reliability exceeds the reference value, the flow advances to step #1824 to set the selected area as a final focus detecting area from which the defocus amount used in lens driving is obtained.

On the other hand, if the reliability does not exceed the reference value, the flow advances to step #1823 to reset FLAG2 to zero (FLAG1=1 at that time). Since focus detecting areas (FIGS. 27C and 28C) other than the first and second prior areas may include a more effective focus detecting area, the flow returns to step #1804 in FIG. 31 so as to check the remaining focus detecting areas.

In case of ONE SHOT-AF and CF switch ON mentioned above, a group of areas shown in FIG. 26A of the 45 focus detecting areas in the frame is set as the first prior area, and calculations and reliability estimation are done in that group. On the basis of the estimation result of the first prior area, another group of a plurality of focus detecting areas including those that belong to the first prior area is formed (see FIG. 26B). Then, calculations and reliability estimation are done in that group. When the estimation result meets a predetermined reference value, the calculations are ended with the group at that time.

In the above arrangement, in the ONE SHOT-AF that does not consider any movement of an object, if it is determined that a specific focus detecting area is effective as a final focus detecting area, its neighboring focus detecting areas are also estimated, thus obtaining a focus detection result that satisfies the photographer using an intermediate estimation result without executing focus detection on all the focus detecting areas. Hence, when delicate focus detection is required for a still object in case of portrait photographing, quick and more accurate focus detection is attained.

In case of AI SERVO-AF and CF switch ON, a group of areas shown in FIG. 28A of the 45 focus detecting areas within the frame is dynamically set as the first prior area (since the AI SERVO-AF mode is selected) in accordance with the previously selected final focus detecting area (normally, the final focus detecting area from which the defocus amount used in the previous lens driving was obtained), and calculations are done in that group as the first priority. However, depending on the estimation result of the first prior group, the second prior area as a group shown in FIG. 28B is dynamically set, and if a predetermined reference value is satisfied in this group, the calculations are ended at that time.

In the above arrangement, in the AI SERVO-AF mode that considers object movement, not only the focus detecting area selected once but also a plurality of groups of focus detecting areas in the frame are estimated at the same time. When it is determined that a specific focus detecting area is effective as a final focus detecting area, a focus detection result that satisfies the photographer is obtained by using an intermediate estimation result and ending the calculations at that time without executing focus detection on all the focus detecting areas. Hence, even upon photographing a moving object like in a soccer game in which the main object of the photographer changes frequently, quick and accurate focus detection can be attained.

Figure 26C:
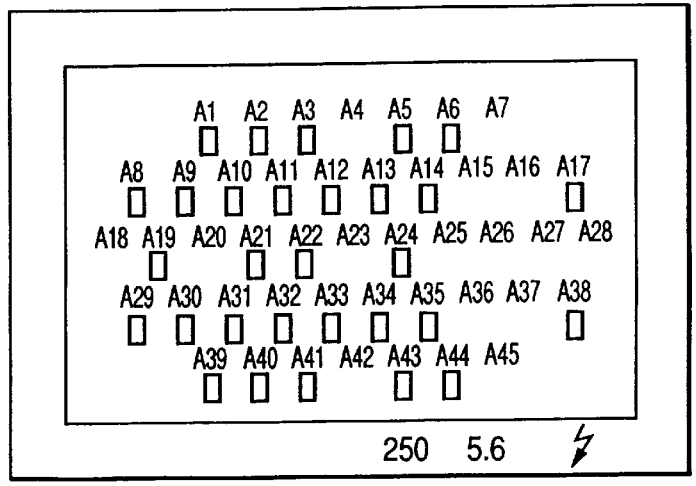

In the above embodiment, in, e.g., FIGS. 26A to 26C, when an effective area is found from the first prior area, the second prior area including that area as the center is set as a new group. When an appropriate area is found in this group, the calculations are ended at that time. However, the present invention is not limited to such specific scheme. For example, a third prior area including an optimal area in that group, and a fourth prior area may be set as new groups, and when an appropriate area is found in these groups, the calculations may be ended.

In the example shown in FIGS. 27A to 27C, if a satisfactory result is obtained from the first prior area, the calculations are ended at that time. Alternatively, when a satisfactory result is obtained from the first prior area, its neighboring areas may be calculated and estimated (the state shown in FIG. 27B), and if they include a satisfactory area, the calculations may be ended at that time, thus realizing a camera which is effective for an object which uses six areas shown in FIG. 27B as optimal focus detection calculated areas.

In this embodiment, a single-lens reflex camera has been exemplified. However, the present invention can also be applied to other optical apparatuses such as a video camera, electronic still camera, and the like.

A focus detecting device has been exemplified. However, the present invention can also be applied to a distance measuring device having a plurality of distance measuring areas used upon measuring distance to the object.

What is claimed is:

1. A focus detecting device capable of focus detection in a plurality of focus detecting areas, comprising:
   a) setting means for setting a first group including at least two focus detecting areas, and a second group including a plurality of focus detecting areas, which are not included in said first group; and
   b) focus detecting means for executing focus detection in the order from the focus detecting areas included in said first group, wherein said focus detecting means ends focus detection without executing focus detection in the plurality of focus detecting areas included in said second group, when the focus detecting area included in said first group satisfies a predetermined condition.

2. A device according to claim 1, wherein said focus detecting means executes focus detection in the plurality of focus detecting areas included in said second group when none of the plurality of focus detecting areas included in said first group satisfy the predetermined condition.

3. A focus detecting device capable of focus detection in a plurality of focus detecting areas, comprising:
   a) focus detection calculation means for making a focus detection calculation; and
   b) discrimination means for discriminating if a calculation result of said focus detection calculation means satisfies a predetermined estimation condition, wherein said focus detection calculation means makes focus detection calculations for N focus detecting areas (N is an integer not less than 2), a focus state is determined without making focus detection calculations for remaining focus detecting areas when calculation results of said N focus detecting areas satisfy said predetermined estimation condition, and a focus state is determined by making focus detection calculations for the remaining focus detecting areas when the calculation results of said N focus detecting areas do not satisfy said predetermined estimation condition.

4. A focus detecting device capable of focus detection in a plurality of focus detecting areas, comprising:
   a) first focus detection calculation means for making focus detection calculations for N focus detecting areas (N is an integer not less than 2) of said plurality of focus detecting areas;
   b) selection means for selecting a specific focus detecting area from said N focus detecting areas on the basis of calculation results of said first focus detection calculation means; and
   c) second focus detection calculation means for making focus detection calculations for a plurality of focus detecting areas which neighbor the focus detecting area selected by said selection means.

5. A device according to claim 4, wherein said plurality of neighboring focus detecting areas do not include said N focus detecting areas.

6. A device according to claim 4, wherein said selection means selects the focus detecting area, which has a calculation result of said first focus detection calculation means that satisfies a predetermined estimation condition.

7. An optical apparatus which selects at least one focus detecting area from a plurality of focus detecting areas, and adjusts a focus on the basis of information obtained from the selected focus detecting area, comprising:
   a) setting means for setting a first group including a previously selected focus detecting area, and a second group including a plurality of focus detecting areas which are not included in said first group; and
   b) focus detecting means for executing focus detection in the order from the focus detecting areas included in said first group, wherein said focus detecting means ends focus detection without executing focus detection in the plurality of focus detecting areas included in said second group, when the focus detecting area included in said first group satisfies a predetermined condition.

8. An apparatus according to claim 7, wherein said focus detecting means executes focus detection in the plurality of focus detecting areas included in said second group when none of the plurality of focus detecting areas included in said first group satisfy the predetermined condition.

9. An optical apparatus which selects at least one focus detecting area from a plurality of focus detecting areas, and adjusts a focus on the basis of information obtained from the selected focus detecting area, comprising:
   a) first focus detection calculation means for making focus detection calculations for N focus detecting areas (N is an integer not less than 2) including a previously selected focus detecting area of said plurality of focus detecting areas;
   b) selection means for selecting a specific focus detecting area from said N focus detecting areas on the basis of calculation results of said first focus detection calculation means; and
   c) second focus detection calculation means for making focus detection calculations for a plurality of focus detecting areas which neighbor the focus detecting area selected by said selection means.

10. An apparatus according to claim 9, wherein said plurality of neighboring focus detecting areas do not include said N focus detecting areas.

11. An apparatus according to claim 9, wherein said selection means selects the focus detecting area, which has a calculation result of said first focus detection calculation means that satisfies a predetermined estimation condition.

12. A distance measuring device capable of distance measurement in a plurality of distance measuring areas, comprising:
   a) setting means for setting a first group including at least two distance measuring areas, and a second group including a plurality of distance measuring areas, which are not included in said first group; and
   b) distance measuring means for executing distance measurement in the order from the distance measuring areas included in said first group, wherein said distance measuring means ends distance measurement without executing distance measurement in the plurality of distance measuring areas included in said second group, when the distance measuring area included in said first group satisfies a predetermined condition.

13. A device according to claim 12, wherein said distance measuring means executes distance measurement in the plurality of distance measuring areas included in said second group when none of the plurality of distance measuring areas included in said first group satisfy the predetermined condition.

14. An optical apparatus which selects at least one distance measuring area from a plurality of distance measuring areas, and adjusts a focus on the basis of information obtained from the selected distance measuring area, comprising:
   a) setting means for setting a first group including a previously selected distance measuring area, and a second group including a plurality of distance measuring areas which are not included in said first group; and
   b) distance measuring means for executing distance measurement in the order from the distance measuring areas included in said first group, wherein said d distance measuring means ends distance measurement without executing distance measurement in the plurality of distance measuring areas included in said second group, when the distance measuring area included in said first group satisfies a predetermined condition.

15. An apparatus according to claim 14, wherein said distance measuring means executes distance measurement in the plurality of distance measuring areas included in said second group when none of the plurality of distance measuring areas included in said first group satisfy the predetermined condition.

16. A focus detecting device capable of focus detection in a plurality of focus detecting areas, comprising:
   a) focus detecting means for repeating focus detection in a plurality of focus detecting areas; and
   b) setting means for setting a specific range with reference to a focus detecting area corresponding to a previous in-focus point of said plurality of focus detecting areas, wherein when said focus detecting means executes focus detection for the second and subsequent times, said focus detecting means executes focus detection in only the focus detecting areas included in said specific range set by said setting means.

17. A device according to claim 16, wherein said specific range includes a focus detecting area array including the focus detecting area corresponding to the previous in-focus point.

18. A device according to claim 16, wherein said specific range includes two focus detecting area arrays which cross at the focus detecting area corresponding to the previous in-focus point.

19. A device according to claim 16, wherein said specific range includes a plurality of focus detecting areas which neighbor the focus detecting area corresponding to the previous in-focus point.

20. A device according to claim 16, wherein said specific range includes two focus detecting area arrays which cross at the focus detecting area corresponding to the previous in-focus point, and a plurality of focus detecting areas which neighbor the focus detecting area corresponding to the previous in-focus point.

21. A distance measuring device capable of distance measurement in a plurality of distance measuring areas, comprising:
   a) distance measuring means for repeating distance measurement in a plurality of distance measuring areas; and
   b) setting means for setting a specific range with reference to a distance measuring area corresponding to a previous in-focus point of said plurality of distance measuring areas, wherein when said distance measuring means executes distance measurement for the second and subsequent times, said distance measuring means executes distance measurement in only the distance measuring areas included in said specific range set by said setting means.

22. A device according to claim 21, wherein said specific range includes a distance measuring area array including the distance measuring area corresponding to the previous in-focus point.

23. A device according to claim 21, wherein said specific range includes two distance measuring area arrays which cross at the distance measuring area corresponding to the previous in-focus point.

24. A device according to claim 21, wherein said specific range includes a plurality of distance measuring areas which neighbor the distance measuring area corresponding to the previous in-focus point.

25. A device according to claim 21, wherein said specific range includes two distance measuring area array s which cross at the distance measuring area corresponding to the previous in-focus point, and a plurality of distance measuring areas which neighbor the distance measuring area corresponding to the previous in-focus point.

26. A focus detecting device capable of focus detection in a plurality of focus detecting areas, comprising:
   a) focus detecting means for repeating focus detection in a plurality of focus detecting areas;

b) selecting means for selecting at least a focus detecting area from the plurality of focus detecting areas; and c) setting means for setting a specific range with reference to a focus detecting area corresponding to a previous selected point of said plurality of focus detecting areas, wherein when said focus detecting means executes focus detection for the second and subsequent times, said focus detecting means executes focus detection in only the focus detecting areas included in said specific range set by said setting means.

27. A device according to claim 26, wherein said specific range includes a focus detecting area array including the focus detecting area corresponding to the previous selected point.

28. A device according to claim 26, wherein said specific range includes two focus detecting area arrays which cross at the focus detecting area corresponding to the previous selected point.

29. A device according to claim 26, wherein said specific range includes a plurality of focus detecting areas which neighbor the focus detecting area corresponding to the previous selected point.

30. A device according to claim 26, wherein said specific range includes two o focus detecting area arrays which cross at the focus detecting area corresponding to the previous selected point, and a plurality of focus detecting areas which neighbor the focus detecting area corresponding to the previous in-focus point.

31. A distance measuring device capable of distance measurement in a plurality of distance measuring areas, comprising:

a) distance measuring means for repeating distance measurement in a plurality of distance measuring areas;

b) selecting means for selecting at least a distance measuring area from the plurality of distance measuring areas; and c) setting means for setting a specific range with reference to a distance measuring area corresponding to a previous selected point of said plurality of distance measuring areas, wherein when said distance measuring means executes distance measurement for the second and subsequent times, said distance measuring means executes distance measurement in only the distance measuring areas included in said specific range set by said setting means.

32. A device according to claim 31, wherein said specific range includes a distance measuring area array including the distance measuring area corresponding to the previous selected point.

33. A device according to claim 31, wherein said specific range includes two distance measuring area arrays which cross at the distance measuring area corresponding to the previous selected point.

34. A device according to claim 31, wherein said specific range includes a plurality of distance measuring areas which neighbor the distance measuring area corresponding to the previous selected point.

35. A device according to claim 31, wherein said specific range includes two distance measuring area arrays which cross at the distance measuring area corresponding to the previous selected point, and a plurality of distance measuring areas which neighbor the distance measuring area corresponding to the previous in-focus point.

* * * * *

UNITED STATES PATENT AND TRADEMARK OFFICE
CERTIFICATE OF CORRECTION

PATENT NO.     : 6,175,692 B1
DATED          : January 16, 2001
INVENTOR(S)    : Hitoshi Onoda et al.

It is certified that error appears in the above-identified patent and that said Letters Patent is hereby corrected as shown below:

Delete the Title page, and substitute therefore the Title page as shown on the attached page.

Delete the Specification, Columns 1-26 and substitute therefore the Specification, consisting of Columns 1-26 as shown on the attached pages.

Signed and Sealed this

Sixth Day of May, 2003

JAMES E. ROGAN
*Director of the United States Patent and Trademark Office*

United States Patent
Onoda et al.

(10) Patent No.: US 6,175,692 B1
(45) Date of Patent: Jan. 16, 2001

(54) FOCUS DETECTING DEVICE, DISTANCE MEASURING DEVICE, AND OPTICAL APPARATUS FOR ADJUSTING FOCUS

(75) Inventors: Hitoshi Onoda; Terutake Kadohara, both of Yokohama; Tomokazu Yoshida, Ebina all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/317,944

(22) Filed: May 25, 1999

(30) Foreign Application Priority Data

May 26, 1998 (JP) .............................. 10-159981
Sep. 14, 1998 (JP) .............................. 11-276422

(51) Int. Cl.$^7$ .................................................. G03B 13/36
(52) U.S. Cl. ........................................ 396/104; 396/123
(58) Field of Search ................................ 396/104, 121, 396/122, 123, 124

(56) References Cited

U.S. PATENT DOCUMENTS

| | | | |
|---|---|---|---|
| 4,855,777 | 8/1989 | Suda et al. | 354/402 |
| 4,908,645 | 3/1990 | Higashihara et al. | 354/402 |
| 4,969,003 | 11/1990 | Ohnuki et al. | 354/402 |
| 4,972,221 | 11/1990 | Ohnuki et al. | 354/402 |
| 4,974,002 | 11/1990 | Ohnuki et al. | 354/400 |
| 4,974,003 | 11/1990 | Ohnuki et al. | 354/400 |
| 4,980,716 | 12/1990 | Suzuki et al. | 354/403 |
| 5,005,037 | 4/1991 | Akashi et al. | 354/400 |
| 5,060,002 | 10/1991 | Ohnuki et al. | 354/402 |
| 5,061,951 | 10/1991 | Higashihara et al. | 354/400 |
| 5,061,953 | 10/1991 | Higashihara et al. | 354/402 |
| 5,079,581 | 1/1992 | Kadohara et al. | 354/400 |
| 5,081,479 | 1/1992 | Kadohara et al. | 354/402 |
| 5,089,843 | 2/1992 | Higashihara et al. | 354/402 |
| 5,126,777 | 6/1992 | Akashi et al. | 354/402 |
| 5,151,732 | 9/1992 | Akashi et al. | 354/402 |
| 5,216,460 * | 6/1993 | Yoshimura et al. | 396/123 |
| 5,333,028 | 7/1994 | Akashi et al. | 354/402 |
| 5,382,996 | 1/1995 | Kadohara | 354/403 |
| 5,585,882 * | 12/1996 | Akashi | 396/123 |
| 5,721,967 * | 2/1998 | Akashi | 396/123 X |
| 5,771,413 | 6/1998 | Suda et al. | 396/114 |
| 5,839,001 | 11/1998 | Ohtaka et al. | 396/114 |
| 5,864,721 | 1/1999 | Suda et al. | 396/114 |

FOREIGN PATENT DOCUMENTS

| | | |
|---|---|---|
| 2-207229 | 8/1993 | (JP) . |
| 7-134238 | 5/1995 | (JP) . |
| 10-161013 | 6/1998 | (JP) . |

* cited by examiner

*Primary Examiner*—W. B. Perkey
(74) *Attorney, Agent, or Firm*—Fitzpatrick, Cella, Harper & Scinto

(57) ABSTRACT

A focus detecting device capable of focus detection in a plurality of focus-detecting areas, includes a setter for setting a first group including at least two focus-detecting areas, and a second group including a plurality of focus-detecting areas, which are not included in the first group, and a focus detector for executing focus detection in the order from the focus-detecting areas included in the first group. The focus detector ends focus detection without executing focus detection in the focus-detecting areas included in the second group, when the focus-detecting area included in the first group satisfies a predetermined condition.

35 Claims, 31 Drawing Sheets

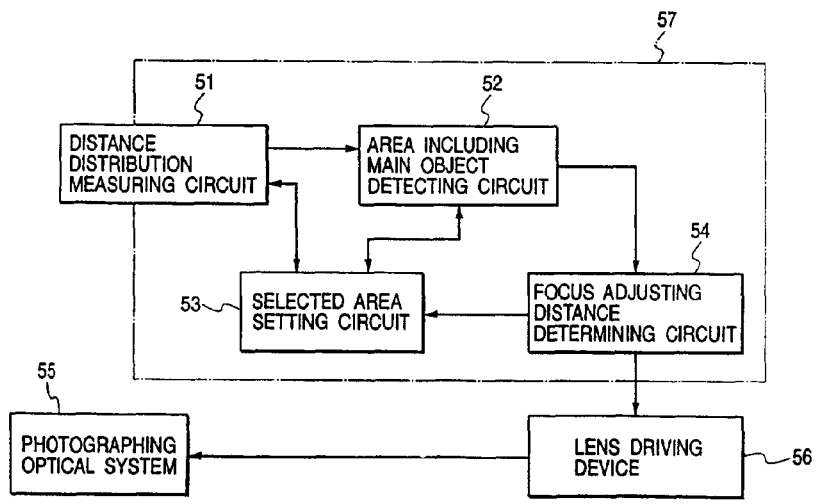

FOCUS DETECTING DEVICE, DISTANCE MEASURING DEVICE, AND OPTICAL APPARATUS FOR ADJUSTING FOCUS

BACKGROUND OF THE INVENTION

1. Field of the Invention

The present invention relates to an optical apparatus, such as an auto-focus camera, a monitor camera, or the like, which has an automatic focus-adjusting function.

2. Related Background Art

The focus-detecting function of a camera or the like has advanced from a single, central detecting area to a three- or five-point area, and its detecting range has broadened with respect to the photographing area. Such a broad detecting range is achieved not only by an advanced detecting optical system but also by advanced microcomputers that control the function.

Multi-point detecting areas can effectively prevent a so-called "central out-of-focus" state, i.e., a state wherein the focus is adjusted not on the object but on the background. Furthermore, when an object in motion is to be photographed, the object can be prevented from falling outside the focus-detecting area.

Figure 14A:
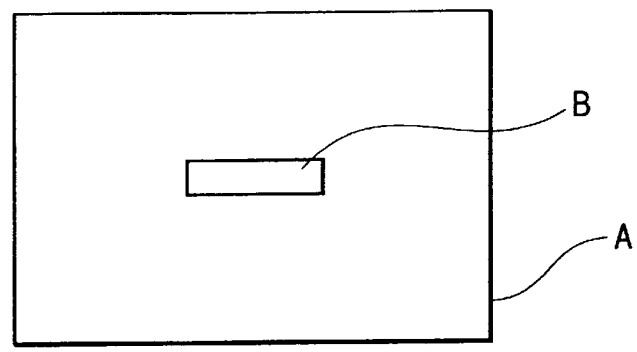
FIGS. 14A, 14B, and 14C are views for explaining conventional focus detection executed areas.
Figure 14B:
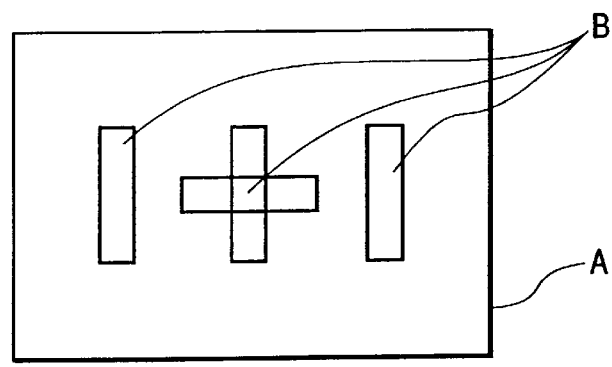

FIG. 14A shows a narrow, linear, single range used as a focus-detecting area B with respect to a photographing frame A. On the other hand, FIG. 14B shows broadened focus-detecting areas, i.e., three focus detecting areas B set for the photographing frame A. In FIG. 14B, three detecting areas are added in a direction perpendicular to the detecting area shown in FIG. 14A.

Since the number of focus-detecting areas has increased from one central point to three points, the focus need not always be adjusted on the object at the center of the photographing frame, and the degree of freedom in photographing is increased.

Upon further developing such multi-focus detecting areas, an area AF function in which the detecting area has a given two-dimensional area with respect to the photographing frame A (in fact, a large number of focus detecting areas are formed densely) is realized.

SUMMARY OF THE INVENTION

One aspect of the invention is to provide a focus-detecting device comprising setting means for setting a first group including at least two focus-detecting areas, and a second group including a plurality of focus-detecting areas, which are not included in the first group, and focus detecting means for executing focus detection in the order from the focus-detecting areas included in the first group, wherein the focus-detecting means ends focus detection without executing focus detection in the plurality of focus-detecting areas included in the second group, when the focus-detecting area included in the first group satisfies a predetermined condition.

BRIEF DESCRIPTION OF THE DRAWINGS

Figure 8:
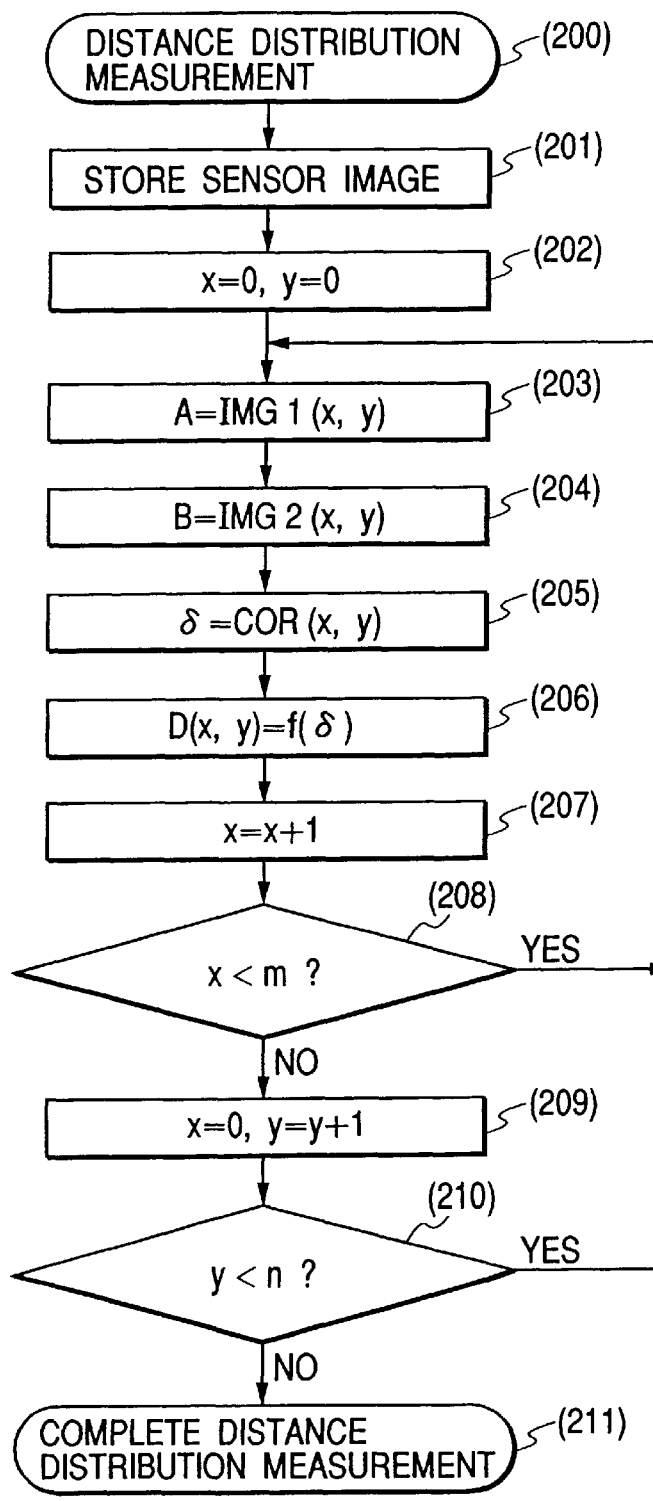
FIG. 8 is a flow chart showing distance distribution measurement according to the first embodiment.
Figure 12:
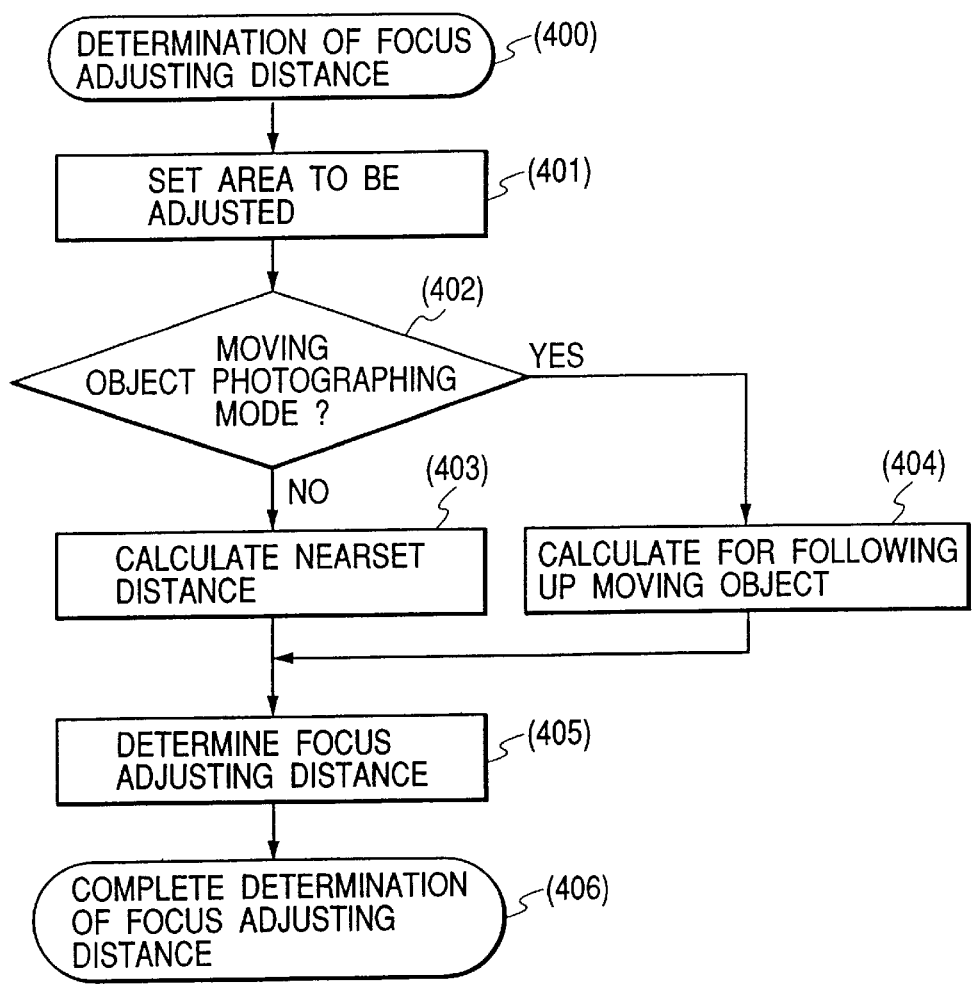
FIG. 12 is a flow chart showing determination of focus adjusting distance according to the first embodiment.
Figure 14C:
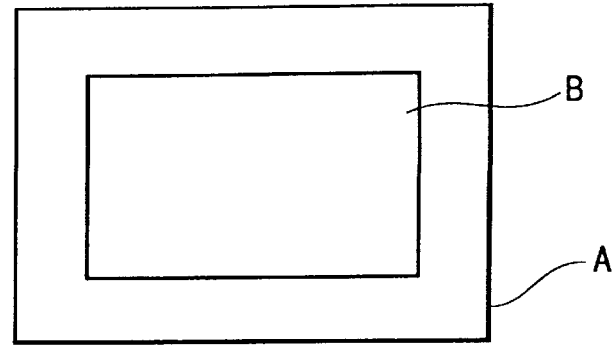
Figure 16:
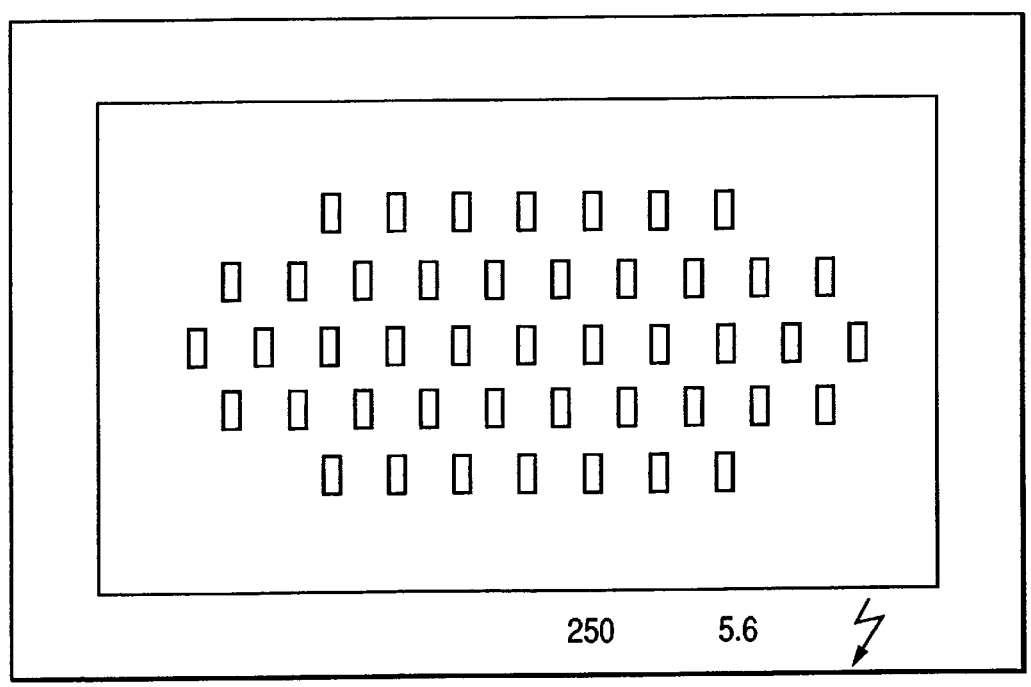
FIG. 16 is a view showing focus detecting areas set within the viewfinder of the camera according to the third embodiment.
Figure 17:
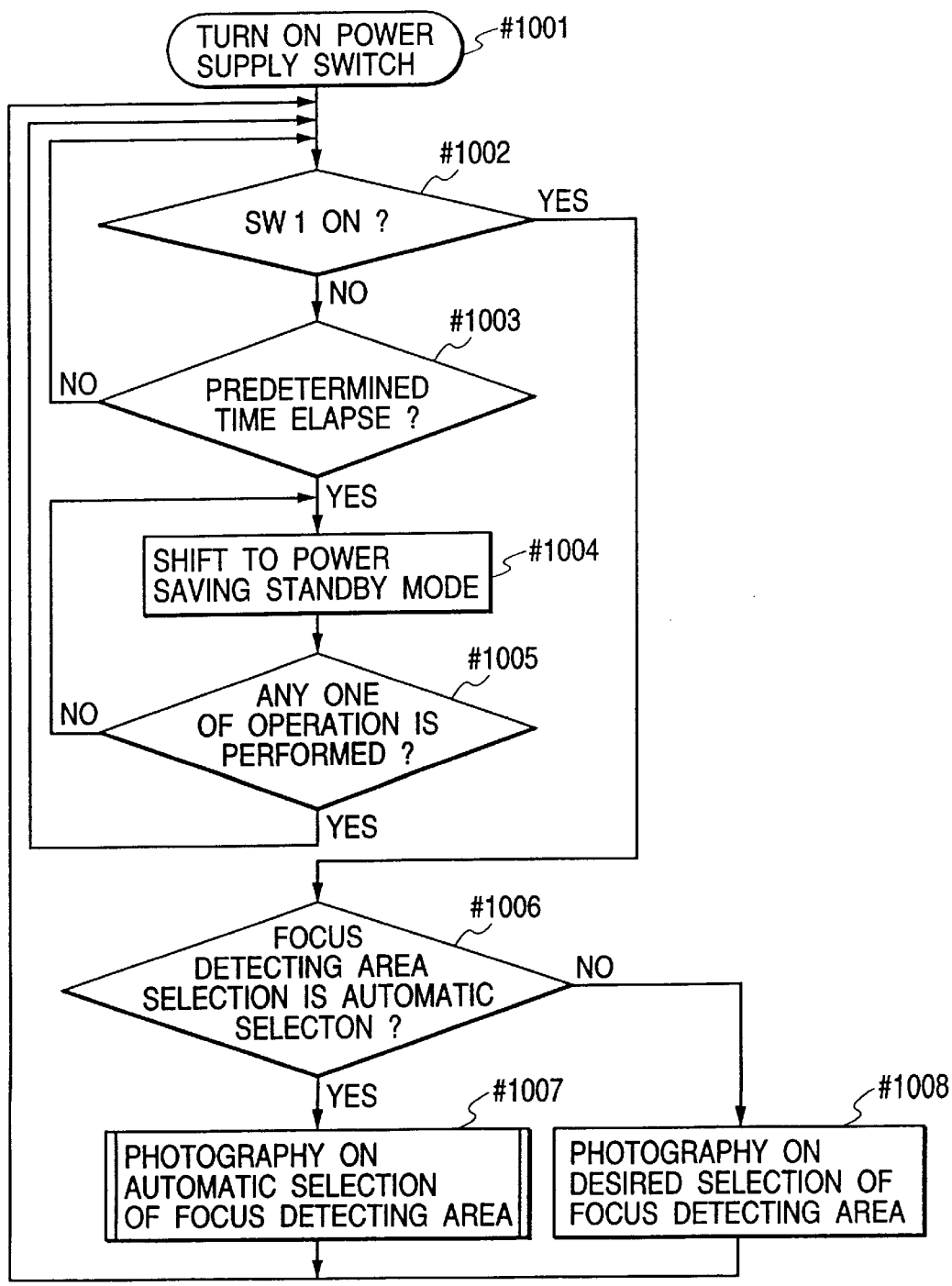
FIG. 17 is a flow chart showing the main routine of the camera according to the third embodiment.
Figure 18:
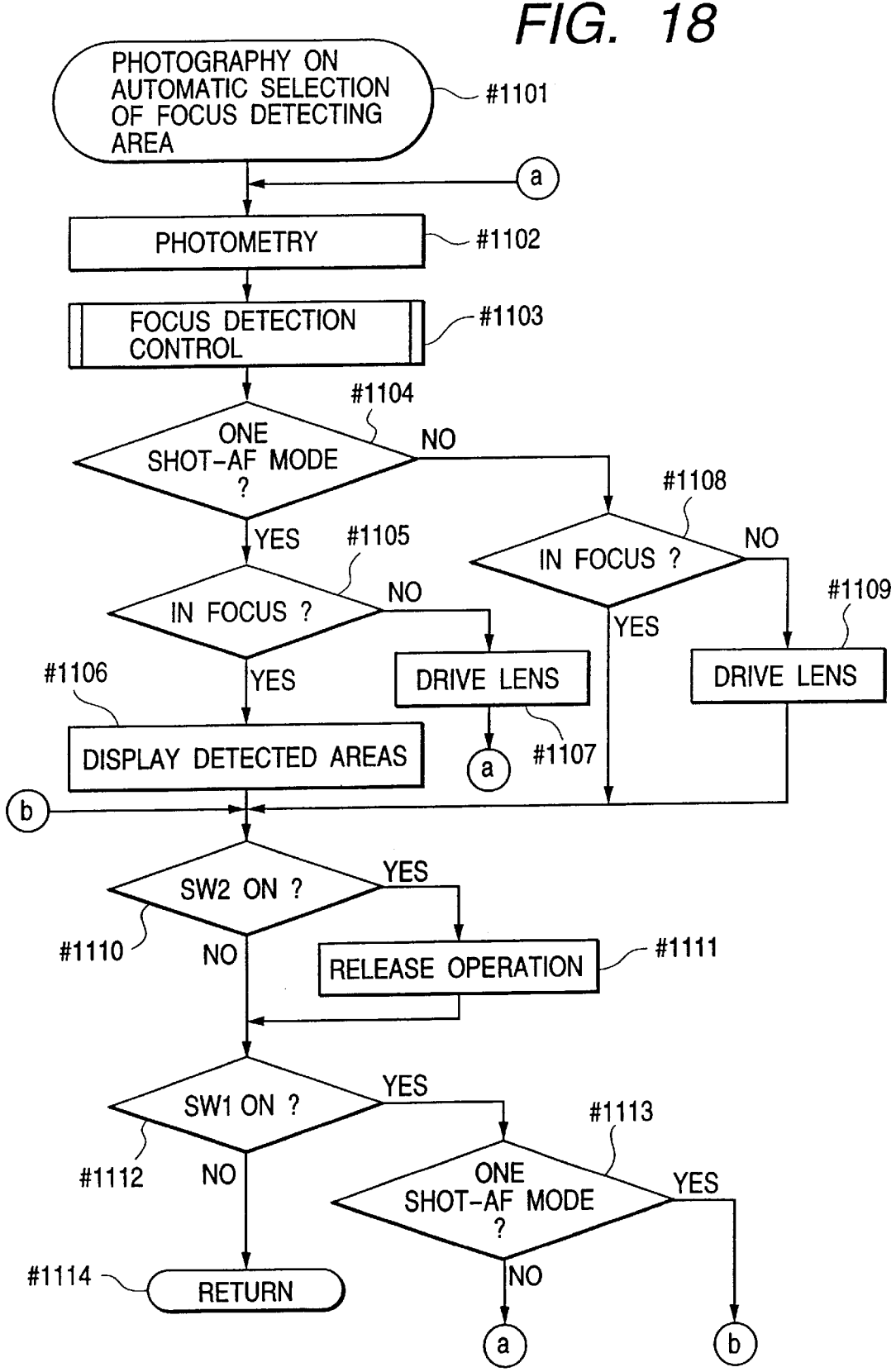
FIG. 18 is a flow chart showing photography on automatic selection of a focus detecting area executed in step #1007 in FIG. 17.
Figure 20:
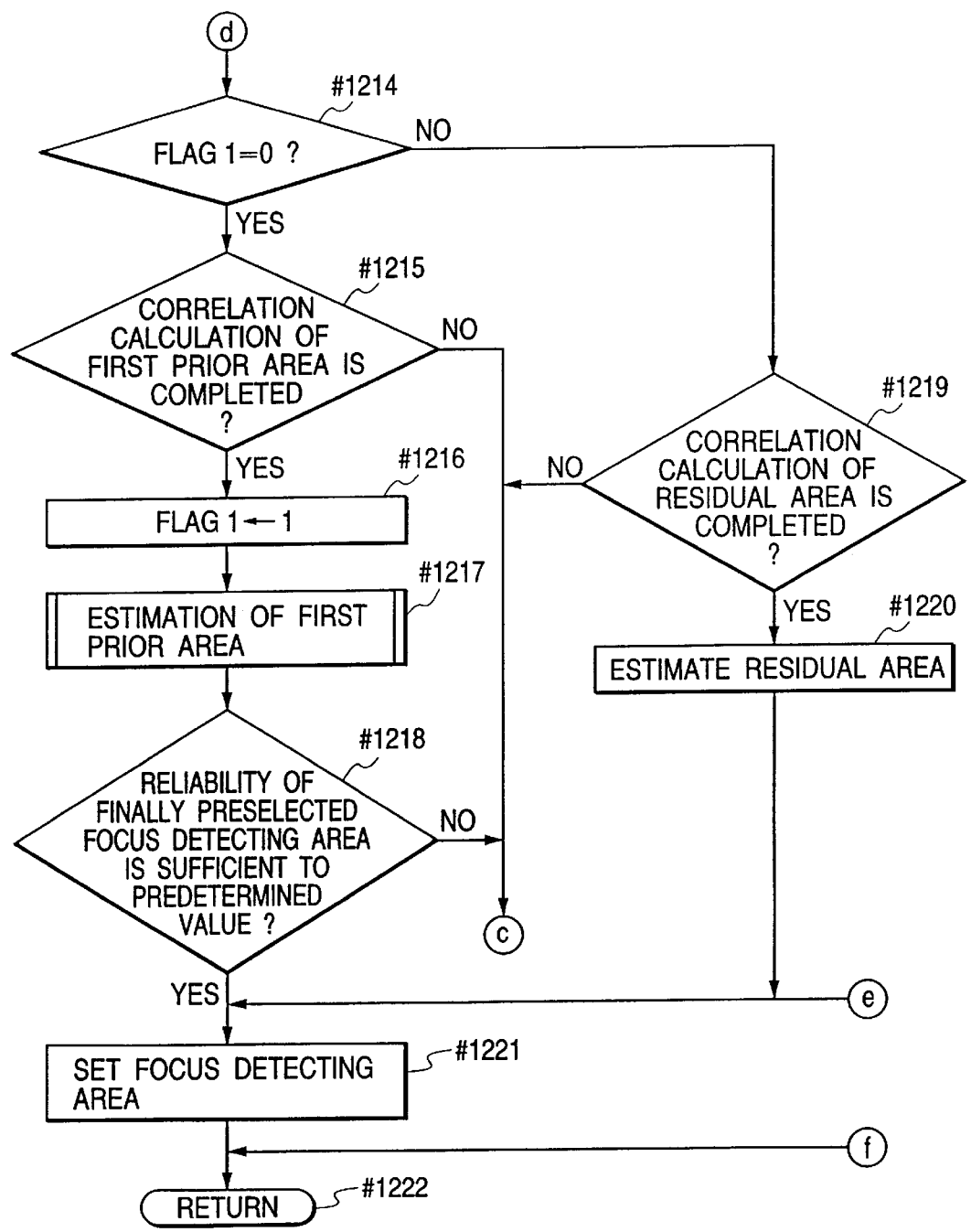
FIG. 20 is a flow chart showing the remaining steps of the control shown in FIG. 19.
Figure 28C:
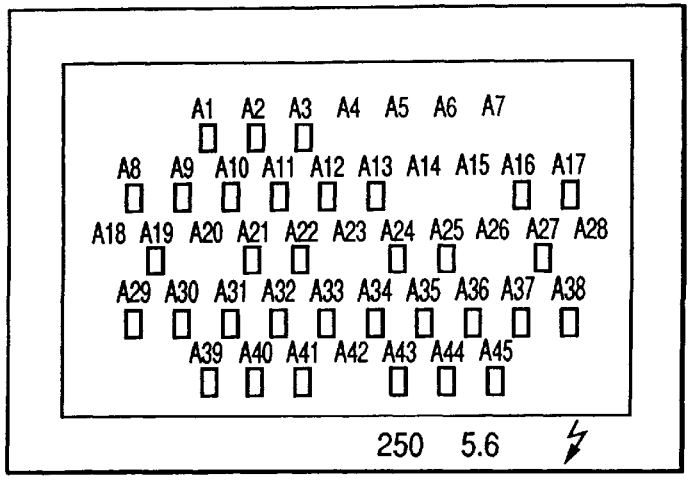
Figure 30:
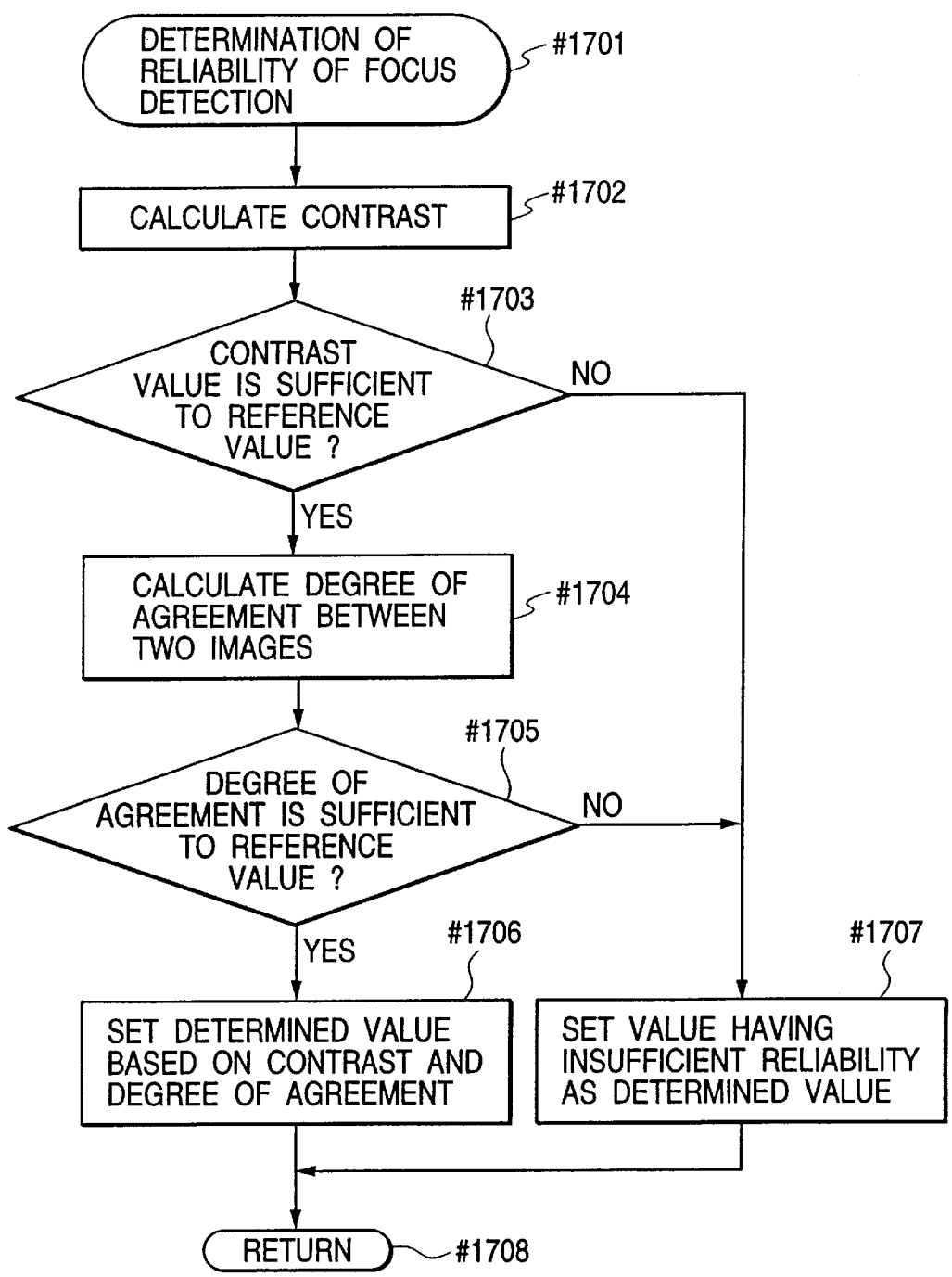
FIG. 30 is a flow chart showing determination of reliability of focus detection executed in step #1604 in FIG. 29.

FIG. 1 is a block diagram showing the basic arrangement of a camera according to the first embodiment;

FIG. 2 is a perspective view showing the layout of an optical system of the camera according to the first embodiment;

FIG. 3 is a perspective view showing the layout of the optical system of the camera according to the first embodiment;

FIG. 4 is a top view of the optical system shown in FIG. 3;

FIG. 5 is a block diagram showing the internal arrangement of the camera according to the first embodiment;

FIG. 6 is a flow chart showing a series of operations of the camera according to the first embodiment;

FIGS. 7A, 7B, 7C and 7D are views for explaining focus-detection executed areas according to the first embodiment;

FIG. 8 is a flow chart showing the distance-distribution measurement according to the first embodiment;

FIG. 9 is a flow chart showing detection of an area including a main object according to the first embodiment;

FIG. 10 is an explanatory view of an area segmentation method according to the first embodiment;

FIGS. 11A and 11B show an example of a labeling result in the first embodiment;

FIG. 12 is a flow chart showing the determination of the focus-adjusting distance according to the first embodiment;

FIGS. 13A, 13B, 13C, 13D, 13E, and 13F are views for explaining focus-detection executed areas according to the second embodiment;

FIGS. 14A, 14B, and 14C are views for explaining conventional focus-detection executed areas;

FIG. 15 is a block diagram showing the electrical arrangement of a single-lens reflex camera with an automatic focus-detecting function according to the third embodiment;

FIG. 16 is a view showing focus-detecting areas set within the viewfinder of the camera according to the third embodiment;

FIG. 17 is a flow chart showing the main routine of the camera according to third embodiment;

FIG. 18 is a flow chart showing photography on automatic selection of a focus-detecting area executed in step #1007 in FIG. 17;

FIG. 19 is a flow chart showing some steps of focus-detection control executed in step #1003 in FIG. 18;

FIG. 20 is a flow chart showing the remaining steps of the control shown in FIG. 19;

FIG. 21 is a flow chart showing some steps of focus-detection control executed in step #1206 in FIG. 19;

FIG. 22 is a flow chart showing the remaining steps of the control shown in FIG. 21;

FIG. 23 is a flow chart showing setups of a first prior area executed in step #1204 in FIG. 19 and step #1302 in FIG. 21;

FIG. 24 is a flow chart showing setups of a second prior area executed in step #1321 in FIG. 22;

FIGS. 25A and 25B show a plurality of groups of focus-detecting areas, which are obtained by grouping 45 focus-detecting areas in the camera according to the third embodiment;

FIGS. 26A, 26B and 26C show a plurality of groups of focus-detecting areas, which are obtained by grouping 45 focus-detecting areas in case of ONE SHOT-AF and CF switch ON in the camera according to the third embodiment;

FIGS. 27A, 27B and 27C show a plurality of groups of focus-detecting areas, which are obtained by grouping 45 focus-detecting areas in case of AI SERVO-AF in the camera according to the third embodiment;

FIGS. 28A, 28B and 28C show a plurality of groups of focus-detecting areas, which are obtained by grouping 45 focus-detecting areas in case of AI SERVO-AF and CF switch ON in the camera according to the third embodiment;

FIG. 29 is a flow chart showing estimation of a first prior area executed in step #1216 in FIG. 20 and step #1314 in FIG. 22;

FIG. 30 is a flow chart showing determination of reliability of focus-detection executed in step #1604 in FIG. 29;

FIG. 31 is a flow chart showing some steps of focus-detection control executed in step #1207 in FIG. 19; and FIG. 32 is a flow chart showing the remaining steps of the control shown in FIG. 31.

DESCRIPTION OF THE PREFERRED EMBODIMENTS

The present invention will be described in detail hereinafter on the basis of illustrated embodiments.

A method of limiting and selecting focus-detecting areas in moving object photography will be explained below taking as an example an automatic focus-adjusting camera capable of focus detection on a two-dimensional area.

FIG. 1 is a block diagram showing basic building components of a camera according to one embodiment of the present invention. Referring to FIG. 1, a distance-distribution measuring circuit 51 measures the distance to an arbitrary location in the object field. An area including a main object-detecting circuit 52 detects an area where a main object is present from the photographing frame. A selected area-setting circuit 53 sets the current focus-detecting area in accordance with the previous area including a main object, which was automatically determined by the area including the object-detecting circuit 52. A focus-adjusting distance-determining circuit 54 determines the focus-adjusting distance with respect to a photographing optical system 55 in accordance with the information of the determined area including the main object. A lens driving device 56 drives a lens to adjust the focus. A controller 57 is implemented by a CPU, a RAM, a ROM, and the like of a microcomputer in practice. Of these circuits, the distance-distribution-measuring circuit 51 is depicted to extend across the dotted line indicating the microcomputer, since it is implemented by both the microcomputer and a measuring-optical system.

FIGS. 2 to 5 show the detailed arrangement of the camera shown in FIG. 1.

FIG. 2 shows the layout of optical building components of the camera for detecting a distance to an object field. Referring to FIG. 2, the optical system includes a photographing lens 1, a field lens 8, a secondary imaging lens 9, and an area sensor 10.

Light beams coming from different pupil positions of the photographing lens 1 are guided onto two photographing frames 10a and 10b on the area sensor 10, and are re-imaged at an imaging magnification determined by the field lens 8 and secondary imaging lens 9. This area sensor 10 is located at a position optically equivalent to the photographing-film surface with respect to the photographing lens 1, and the photographing frames 10a and 10b have fields equal to a partial or whole photographing frame.

FIG. 3 shows the layout of the detecting-optical system shown in FIG. 2, which is applied to the camera. Referring to FIG. 3, the optical system includes a quick return mirror 6, a pentagonal prism 18, a beam-splitting prism 19, and a reflection mirror 20, in addition to the same components as those shown in FIG. 2. FIG. 4 is a view of the layout shown in FIG. 3 when viewed from the top of the camera.

With this arrangement, the photographing images 10a and 10b having a predetermined parallax are obtained.

Note that the camera with the aforementioned arrangement is disclosed in detail in Japanese Patent Application Laid-Open No. 7-134238 and the like.

FIG. 5 is a block diagram showing the arrangement of the camera with the elements shown in FIG. 2. The arrangement of the camera will be explained first.

Referring to FIG. 5, a camera controller PRS corresponds to the controller 57 shown in FIG. 1, and is a one-chip microcomputer including a CPU (central processing unit), a ROM, a RAM, and an A/D conversion function. The camera controller (to be referred to as a microcomputer hereinafter) PRS executes a series of operations of the camera including an automatic exposure-control function, an automatic focus-adjusting function, a film winding/rewinding operation, and the like, in accordance with a camera-sequence program stored in the ROM. For this purpose, the microcomputer PRS communicates with peripheral circuits in the camera body and a controller in a lens using communication signals SO, SI, and SCLK, and communication-selection signals CLCM, CDDR, and CICC so as to control those circuits and lens.

Note that the signal SO is a data signal output from the microcomputer PRS, the signal SI is a data signal input to the microcomputer PRS, and the signal SCLK is a sync-clock signal for the signals SO and SI.

A lens-communication buffer LCM supplies electric power to a lens-power-supply terminal VL when the camera is active, and serves as a communication buffer between the camera and lens when the selection signal CLCM from the microcomputer PRS is at high potential level (to be abbreviated as "H" hereinafter; a low potential level will be abbreviated as "L" hereinafter).

When the microcomputer PRS sets the signal CLCM at "H" and outputs a predetermined data signal SO in synchronism with the signal SCLK, the lens-communication buffer circuit LCM outputs buffer signals LCK and DCL of the signals SCLK and SO to the lens via camera-lens communication contact. At the same time, the circuit LCM outputs a buffer signal SI of a signal DLC from the lens, and the microcomputer PRS receives the lens data SI synchronously.

A detection and display circuit DDR for various switches SWS is selected when the signal CDDR is at "H", and is controlled by the microcomputer PRS using the signals, SO, SI, and SCLK. More specifically, the circuit DDR switches a display on a camera-display member DSP on the basis of data sent from the microcomputer PRS, and informs the microcomputer PRS of ON/OFF states of various operation members of the camera via communications. An external liquid crystal display device OLC is located on top of the camera, and a liquid-crystal-display device ILC is included in the viewfinder.

Switches SW1 and SW2 are interlocked with a release button (not shown). The switch SW1 is turned on at the first stroke position of the release button, and the switch SW2 is then turned on at the second stroke position of the release button. The microcomputer PRS executes photometry and automatic focus adjustment in response to ON of the switch SW1, and executes exposure control and then winds up film in response to ON of the switch SW2 as a trigger.

Note that the switch SW2 is connected to an "interrupt input terminal" of the microcomputer PRS, and even while a program is being executed upon turning ON of the SW1, that program is interrupted upon turning ON of the switch SW2 and the control can immediately enter a predetermined interrupt program.

Motor MTR1 is used for film feeding and motor MTR2 is used for moving a mirror upward/downward and charging a shutter spring, and their forward/reverse rotations are controlled by driving circuits MDR1 and MDR2. Signals M1F, M1R, M2F, and M2R input from the microcomputer PRS to the driving circuits MDR1 and MDR2 are motor control signals.

Magnets MG1 and MG2 are respectively used for initiating travel of the leading and trailing curtains of the shutter, and are energized by amplification transistors TR1 and TR2 in response to signals SMG1 and SMG2, thus executing shutter control by the microcomputer PRS.

Note that the motor driving circuits MDR1 and MDR2 and shutter control are not directly related to the present invention, and a detailed description thereof will be omitted.

A signal DCL input to a control circuit LPRS in the lens in synchronism with the signal LCK is command data from the camera to a lens LNS, and lens operation corresponding to each command is determined in advance. The control circuit LPRS in the lens interprets that command in accordance with a predetermined procedure, and performs focus adjustment and aperture control and outputs operation states (driving states of the focus adjusting optical system, aperture, and the like) of the respective units in the lens and various parameters (distance information such as full-open f-number, focal length, a coefficient for the defocus amount vs. the moving amount of the focus adjusting optical system, various focus correction amounts, and the like) from an output DLC.

In this embodiment, a zoom lens is exemplified. Upon receiving a focus-adjusting command from the camera, a focus-adjusting motor LMTR is driven by signals LMF and LMR in accordance with the driving amount and direction received at the same time so as to move the optical system in the optical-axis direction, thus adjusting the focus. The moving amount of the optical system is monitored by counting the number of pulses of a pulse signal SENCF output from an encoder circuit ENCF that executes a detection of the pattern of a pulse plate that pivots in synchronism with the optical system, and outputs pulses corresponding to the moving amount. The pulses are counted by a counter in the control circuit LPRS in the lens. Upon completion of a predetermined movement, the control circuits LPRS itself sets the signals LMF and LMR at "L" to brake the motor LMTR.

For this reason, once the focus-adjusting command has been received from the camera, the microcomputer PRS of the camera need not perform any process for lens driving until completion of lens driving. Upon reception of a request from the camera, the control circuit LPRS can output the contents of the counter to the camera.

Upon receiving an aperture-control command from the camera, the control circuit LPRS drives a stepping motor DMTR, known as an aperture-driving motor, in accordance with the number of aperture steps received at the same time. Note that the stepping motor allows open control, and does not require any encoder for monitoring its operation.

An encoder circuit ENCZ is attached to a zoom optical system, and the control circuit LPRS in the lens receives a signal SENCZ output from the encoder circuit ENCZ to detect the zoom position. The control circuit LPRS in the lens stores lens parameters at the respective lens positions, and outputs a parameter corresponding to the current zoom position to the camera upon receiving a request from the microcomputer PRS in the camera.

A photometry-area sensor and its driving circuit ICC for focus detection and exposure control comprises a CCD and the like. The circuit ICC is selected when a signal CICC is at "H", and is controlled by the microcomputer PRS using the signals SO, SI, and SCLK.

Signals $\phi V$, $\phi H$ and $\phi R$ are used for reading out the area-sensor output, and are used for resetting the area sensor. A sensor-control signal is generated by a driving circuit in the circuit ICC on the basis of signals from the microcomputer PRS. The sensor outputs are amplified after they area read out from a sensor unit, and are input as output signals IMAGE to an analog input terminal of the microcomputer PRS. The microcomputer PRS A/D-converts the signals IMAGE, and sequentially stores the converted digital values at predetermined addresses on the RAM. Using the digital signals, measurement of the distance distribution of the object field, and focus adjustment or photometry are done.

In FIG. 5, the camera and lens are independent from each other (i.e., an exchangeable lens camera). However, the present invention is not limited to such a specific camera and may be applied to, e.g., a camera integrated with a lens.

A series of operations of the microcomputer PRS will be described below.

FIG. 6 is a flow chart showing the flow of the overall processing. The processing will be explained below with reference to FIG. 6.

When the photographer has pressed, e.g., a shutter button (not shown), photographing is started via step (100).

It is checked in step (101) if a moving-object photographing mode is set as the current automatic focus-adjusting mode. If the moving-object photographing mode is not set, the flow directly advances to step (102) to set the whole focus detecting area as the current focus-detection calculated area. On the other hand, if the moving-object photographing mode is set, the flow advances to step (103) to check if the current focus detection is to be done for the first time in the moving-object photographing mode. If focus detection is done for the first time, since the position of a main object is not detected yet, detection on the whole focus-detecting area is required. Hence, if it is determined in step (103) that the current focus detection is to be done for the first time, the flow advances to step (102) to set the whole focus-detecting area as the current focus-detection calculated area as in a non-moving object-photographing mode.

If focus detection has already been done, the flow advances from step (103) to step (104) to call a selected-area setting subroutine for setting a detection-calculated area. The outline of this selected-area setting subroutine will be explained below using FIGS. 7A to 7D. Note that the selected-area setting subroutine is implemented by a logic corresponding to the selected-area setting circuit 53 shown in FIG. I in the microcomputer PRS.

Referring to FIG. 7A, A indicates a whole-focus detecting area defined by 5 (vertical)×7 (horizontal) segmented areas, i.e., a total of 35 areas. On the other hand, B indicates an area which is determined to be an area including a main object by the previous focus detection. that is, the previous focus adjustment was done based on the focus-detection result of the area B.

FIG. 7B shows the setup state of the current focus-detection calculated areas, and a vertical area C and horizontal area D are set. Cross-pattern areas are selected to have the area B in FIG. 7A as the previous area including the main object, and the number of areas is limited to "11", i.e., a value ⅓ or less the total of areas. Since the photographer follows up an identical object upon framing, cross-pattern areas having the previous area including the main object suffice as the next area including the main object.

For example, when the current area including the main object is an area E shown in FIG. 7C, areas F and G shown in FIG. 7D are similarly set as the next focus-detection calculated areas.

The contents of the selected area-setting subroutine for setting the detection-calculated area in step (104) have been explained.

In step (105), a subroutine for measuring the distance distribution of the object field with respect to the focus-detecting areas set in step (104) is called. The distance-distribution measurement will be described below with reference to the flow chart in FIG. 8. Note that the distance-distribution measurement is implemented by a logic corresponding to the distance-distribution measuring circuit 51 shown in FIG. 1 in the microcomputer PRS.

In step (201), sensor images are stored. Storage of the sensor images is done as follows.

Initially, the sensor is reset. More specifically, the microcomputer PRS simultaneously sets control signals $\phi V$, $\phi H$, and $\phi R$ at "H" for a predetermined period of time, thus resetting the circuit ICC. The microcomputer PRS then sends an accumulation-start command to start accumulation, and then detects the end of accumulation. The microcomputer PRS drives the control signals $\phi V$, and $\phi H$ to sequentially read out the sensor outputs IMAGE, A/D-converts the output IMAGE, and stores the digital values in the RAM, thus completing storage of the sensor output signal in step (201).

Two sensor-output signal data are stored in predetermined areas IMG1 and IMG2 on the RAM.

In step (202) and the subsequent steps, distance-distribution information (distance map) formed by "m×n" blocks (m and n are integers equal to or larger than 1) are generated.

In step (202), variables x and y that indicate the coordinate position of each block are initialized. In step (203), a signal required for distance calculation of a block (x, y) is extracted from image data IMG1 on the RAM, and is copied to predetermined address A on the RAM. In step (204), the other signal required for distance calculation of the block (x, y) is extracted from image data IMG2 on the RAM, and is copied to a predetermined address B on the RAM.

In step (205), luminance-distribution signals stored at addresses A and B undergo a known correlation calculation COR(A, B) to calculate a displacement $\delta$ between the two signals. In step (206), the distance value is calculated from the image displacement $\delta$ using a known function $f(\delta)$, and is stored at a predetermined address D(x, y) assured on the RAM to record a distance distribution. In step (207), the value x is incremented by one to select the neighboring block as the block to be processed.

In step (208), x is compared with resolution m in the X direction of the distance map. If it is determined in step (208) that "x<m" is true, the flow returns to step (203) to repeat the calculation and storage of the distance value of the neighboring block in the x-direction. On the other hand, if it is determined that "x<m" does not hold, the flow advances to step (209) to reset x and increment y by one.

In step (210), the value y is estimated, and if its determined that "y<n" holds true, the flow returns to step (203) to start calculations for the next block column. On the other hand, if it is determined that "y<n" does not hold, distance calculations for all the blocks are finished, thus ending the distance-distribution measurement subroutine (operations in step (101) in FIG. 6).

When the cross-pattern, detection-calculated areas are set, the default values of x and y and resolutions m and n change for every position. These parameters are stored as functions or numeric-values tables that pertain to the location of the previous area including the main object, and they are individually looked up.

In step (106) in FIG. 6, an area including a main-object detection subroutine is called. The contents of the area including the main-object detection subroutine when the whole area is set as the detection-calculated area will be explained below with reference to the flow chart in FIG. 9. Note that the area including the main-object detection is implemented by a logic corresponding to the area including main-object detecting circuit 52 shown in FIG. 1 in the microcomputer PRS.

In step (301) in FIG. 9, each object (group) that forms the object field is numbered. For example, as shown in FIG. 10, upon executing segmentation by raster-scanning blocks in the order from the upper left one on the frame, as indicated by the arrow in FIG. 10, if it is checked whether or not upper neighboring block G(x, y−1) and left neighboring block G(x−1, y) of block G(x, y) of interest belong to an identical group, such checking can be consequently done between all neighboring blocks. At this time, since blocks on the upper side (y=0) and left side (x=0) respectively have no upper and left neighboring blocks, those blocks are not processed. The checking results are stored in memories G(0, 0) to G(m−1, n−1) on the RAM.

Initially, a block (x, y)=(0, 0) is registered with a group number "g=1", and if a group corresponding to another area is detected, g is incremented by one to set the group number of that block. With this process, a photographing scene shown in, e.g., FIG. 11A, is numbered in units of groups, as shown in FIG. 11B. Such numbering is a known technique called "labeling", and a flow chart of area segmentation will be omitted herein.

Also, the method of checking if neighboring blocks belong to an identical group is described in detail in Japanese Patent Application Laid-Open No. 10-161013 disclosed by the present Applicant, and a description thereof will be omitted.

In step (302), the number objects detected in step (301) is set in a variable Gnum. In step (303) and the subsequent steps, the characteristics of the groups that form the photographing space are estimated, and a group that represents a main object is determined from all the groups on the basis of the characteristics.

In Step (303), 1 is set in a variable Gcur indicating the group to be calculated. It is then checked in step (304) if the moving-object photographing mode is set as the current automatic-focus-adjusting mode. If the moving-object photographing mode is set, the flow advances to step (305) to calculate characteristics required for follow-up estimation for the moving object, such as the amount and rate of change in the object-image-plane velocity. Since the amount and rate of change in object-image-plane velocity are disclosed in Japanese Patent Application Laid-Open No. 1-16781 or 2-207229, a detailed description thereof will be omitted. The flow then advances to step (306).

On the other hand, if the moving-object photographing mode is not set, the flow directly advances to step (306) to calculate a main-object level S(Gcur) of the object area with the group number=Gcur. The main-object level is used for determining an area which is likely to be a main object by calculating characteristics, such as the average distance, the width, and height of the area, the position on the frame, and the like, and totally estimating these characteristics. For example, a main object level estimation function S(Gcur) may be given by:

$$S(Gcur) = W_1 \times (\text{width}) \times (\text{height}) + W_2 / (\text{distance from frame center}) + W_3 / (\text{average distance})$$

where $W_1$, $W_2$, and $W_3$ are weighting constants, the distance from the frame center is the distance between the frame center and the barycentric position of the area, and the average distance is that of all blocks in the area. The main-object level is calculated for all the areas, and an object with the highest main-object level is determined as a main object.

On the other hand, in the case of moving-image photographing, an estimation function that also considers the amount and rate of change in object-image plane velocity mentioned above is used.

In step (307), Gcur is incremented by one to select the next group to be calculated. In step (308), Gcur is compared with Gnum to check if calculations have been finished for all the groups. As a result, if "Gcur≦Gnum", since calculations have not been finished yet for all the groups, the flow returns to step (304) to repeat the aforementioned processes.

On the other hand, if "Gcur>Gnum", the flow advances to step (309), and the group number with the highest main-object level is substituted in a variable Gmain using a function MAX that obtains the group number with the highest one among all the calculated main-object levels S(1) to S(Gnum). The area that matches the number represented by Gmain indicates the area including the main object. In step (310), the area including main-object detection subroutine (operations in step (106) in FIG. 6) ends.

In step (107) in FIG. 6, a focus-adjusting-distance-determining subroutine is called. In this case, a subroutine for determining the focus-adjusting distance based on the current area including the main object is executed. This subroutine will be explained below with reference to the flow chart shown in FIG. 12. Note that detection of the focus-adjusting distance is implemented by a logic corresponding to the focus-adjusting-distance-detecting circuit 54 shown in FIG. 1 in the microcomputer PRS.

In step (401), an area to be adjusted in the photographing field is set in accordance with the group number which is currently set as the area-including main object. Area setups are done first in accordance with the result of the area including the main-object detection subroutine described above. It is checked in step (402) if the moving-object photographing mode is set as the current automatic-focus adjusting mode. If the moving-object photographing mode is not set, the flow advances to step (403), distance information for focus adjustment is calculated from information in the area set in the previous step. Since this embodiment uses an algorithm that gives priority to the nearest object in a single object area, the nearest distance in that area is calculated.

On the other hand, if the moving-object photographing mode is set, the flow advances to step (404) to calculate for following up the moving object required for the moving-object photographing mode. This calculation yields an adjustment amount obtained by adding a driving amount that corrects a delay in photographing, such as a release-time lag to the focus-adjusting amount with respect to the area including the main object. Since such a calculation is also disclosed in Japanese Patent Application Laid Open-No. 1-16781 or 2-207229, a detailed description thereof will be omitted.

In step (405), the nearest distance or adjusting distance for following up the moving object is determined as a final focus-adjusting distance, thus ending the focus-adjusting-distance-determining subroutine.

In step (108) in FIG. 6, the microcomputer PRS sends a focus-adjusting command to the lens LNS with the lens-driving device 56n shown in FIG. 1. In response to this command, the control circuit LPRS in the lens controls the motor LMTR to complete the current focus adjustment (operations in step (107) in FIG. 6).

After that, focus adjustment on a still or moving object is done by repeating the aforementioned processes.

In the above example, cross-pattern areas having the previous area including the main object as the center are set as the current detection-calculated areas, as has been described earlier with reference to FIGS. 7A to 7D. The areas to be set may have some other patterns. These patterns will be explained below with reference to FIGS. 13A to 13F.

FIG. 13A shows an example of areas extending in one direction (gray areas H which are limited to only the horizontal direction, since photographing is to be done at the landscape position), which are set by further limiting the number of areas upon holding the normal camera at the landscape position, i.e., which are determined in advance to have an in-focus area in the previous follow-up process (area B painted in black which was determined as the area including the main object in the previous focus detection) as the center. In FIG. 13A, A indicates a whole focus-detecting area defined by 5 (vertical)×7 (horizontal) segmented areas, i.e., a total of 35 areas, as in FIG. 7A. such areas suffice for, e.g., photographing by panning the camera.

FIG. 13B shows areas set based on the same concept as in FIG. 13A upon photographing at the portrait position. FIG. 13C shows small cross-pattern areas using a relatively smaller number of detection-calculated areas. Such areas may suffice if the object can be satisfactorily followed up. Conversely, FIG. 13D shows another set of cross-pattern areas which use a larger number of areas at the central portion. More specifically, all neighboring areas of the area painted in black, which was determined to be the area including the main object in the previous focus detection, are added to the areas shown in FIG. 7B. Such a pattern is effective for an object that is relatively hard to follow up.

In addition, areas may be set to assure a sufficiently broad range of detection-calculated areas while decimating every other area, as shown in FIGS. 13E and 13F.

According to the embodiment described above, upon following up the moving object while keeping the focus adjusted on the object, cross-shaped, focus-detection calculated areas are selected from a plurality of object areas to have the in-focus area in the previous follow-up process as the center, and focus-detection calculations are made for these areas, thus following up the object. In this way, the calculation volume or the like required for following up the object can be sufficiently reduced, and effectiveness of a broad focus-detecting area can be exploited.

Not only a simple cross-pattern area, but also various other area patterns may be effectively set on the basis of the cross-pattern area depending on the photographer, the object, photographing conditions, and the like.

(Modifications)

In the above embodiment, the present invention is applied to a single-lens reflex camera as an optical apparatus. However, the present invention is not limited to such specific optical apparatus. For example, the present invention may be applied to a lens-shutter camera having a large number of distance-measuring areas, and an optical apparatus which has distance-measuring or focus-detecting areas, and adjusts the focus based on information obtained from such areas.

FIG. 15 is a block diagram showing the electrical arrangement of a single-lens reflex camera having an automatic focus-detecting device according to the third embodiment.

Referring to FIG. 15, the camera includes an MPU (microprocessing unit) 501, a memory 502, and a focus detecting unit 503 for AF (auto-focusing). Note that the MPU 501, the memory 502, and the focus detecting unit 503 construct a focus-detecting device.

The camera also includes a lens-driving unit 504 for driving a photographing optical system on the basis of the detection result of the focus-detecting unit 503, an aperture-driving unit 505, a shutter-driving unit 506, and a film-feeding unit 507. The camera further includes a display unit 508 for displaying various setup values (aperture value, shutter speed, and the like) of the camera on a liquid crystal display (not shown), and highlighting a specific focus-detecting area using a red LED in the frame, which is selected by focus-detection control in a ONE SHOT-AF mode.

Also, the camera includes an AF switchover switch 509 for switching an AF mode to one of ONE SHOT-AF and AI SERVO-AF modes, a CF switch 510 for setting a CF (custom function; to be described later), a main dial 511 for setting the shutter speed, the aperture value, and the like, a switch SW1 which is turned on by a first stroke operation (half depression) of a release button, and a switch SW2 which is turned on by a second stroke operation (full depression) of the release button.

The main routine of the camera of the third embodiment will be described below with reference to the flow chart shown in FIG. 17.

Normally, the camera shifts to a power-saving standby mode when the operator does not perform any operation (to turn on the switch SW1 or set the shutter speed, the aperture value, or the like) for a predetermined time after a power-supply switch is turned on (#1001→#1002→#1003→#1004), and the MPU 501 halts. If the operator performs some operation (YES in step #1005), the MPU 501 is interrupted to execute various operations or setups corresponding to that operation. Of various operations or setups, the AF operation that relates to the present invention will be explained in detail below.

If it is determined in step #1002 that the switch SW1 is ON, the flow jumps to step #1006, and the MPU 501 checks if focus-detecting-area selection is an automatic selection (the MPU 501 automatically selects a focus detecting area) or a desired selection (the photographer selects one of 45 focus detecting areas as a desired focus detecting area). As a result, if the focus-detecting area is to be automatically selected, the flow advances to step #1007 to execute a "photography on automatic selection of focus-detecting area" routine. On the other hand, if the focus-detecting area is to be desirably selected, the flow advances to step #1008 to execute a "photography on desired selection of focus-detecting area" routine. Since this "photography on desired selection of focus detecting area" is not related to the present invention, a description thereof will be omitted.

The "photography on automatic selection of focus detecting area" executes a series of operations for photographing, and will be explained below with reference to the flow chart shown in FIG. 18.

Photometry is done in step #1102, and a routine for executing "focus-detection control" is executed in step #1103. This routine will be described in detail later with reference to the flow charts in FIGS. 19 and 20. Upon completion of the focus-detection control routine, i.e., after focus detection has been done, the flow advances to step #1104 to check if the current AF mode is the ONE SHOT-AF mode or AI SERVO-AF mode.

In the ONE SHOT-AF mode, once lens driving is complete after focus detection, the lens position is held until the switch SW1 is turned off. This mode is suitable for photo-graphing a still object, such as a landscape, a portrait, or the like. In the AI SERVO-AF mode, focus-detection control and lens driving are repeated immediately before the beginning of a release operation upon turning ON of the switch SW2, while the switch SW1 is kept ON. Furthermore, upon detecting movement of an object, lens driving (predicted AF) that takes an AF time lag and a release time lag into consideration is made. This mode is suitable for photographing a moving object in motor sports, soccer games, or the like.

If it is determined that the current AF mode is the ONE SHOT-AF mode, the flow advances to step #1105 to check if an in-focus state is attained. If in-focus is not attained yet, the flow advances to step #1107 to drive the lens. After that, photometry, focus-detection control, and lens driving are repeated (#1107→#1102→#1103→#1104→#1105→#1107...) until an in-focus is attained.

On the other hand, if an in-focus state is attained, the flow advances to step #1106, and the focus-detecting area that underwent focus detection is displayed on a focusing screen. In step #1110, the state of the switch SW2 is checked. Only when the switch SW2 is ON, the flow advances to step #1111 to take a picture. After that, the state of the switch SW1 is checked in step #1112, and if the switch SW1 is ON, the flow advances to step #1113. Since the current AF mode is the ONE SHOT-AF mode, the flow returns from step #1113 to step #1110, and the states of the switches SW2 and SW1 are checked until the switch SW1 is turned off. After that, if the switch SW1 is turned off, the flow advances to step #1114 to end this routine, and the control returns to the main routine shown in FIG. 17.

On the other hand, if the current AF mode is the AI SERVO-AF mode, the flow advances from step #1104 to #1108 to check if an in-focus state is attained. Only when an in-focus state is not attained yet, the flow advances to step #1109 to drive the lens.

Subsequently, the state of the switch SW2 is checked in step #1110 as the ONE SHOT-AF mode. Only when the switch SW2 is ON, the flow advances to step #1111 to take a picture. After that, the state of the switch SW1 is checked in step #1112, and if the switch SW1 is ON, the flow advances to step #1113. Since the current AF mode is the AI SERVO-AF mode, the flow returns from step #1113 to step #1102 to repeat photometry, focus-detection control, and lens driving until the switch SW1 is turned off. Then, if the switch SW1 is turned off, the flow advances to step #1114 to end this routine, and the control returns to the main routine shown in FIG. 17.

The "focus-detection control" executed in step #1103 in FIG. 18 will be described below with reference to the flow charts in FIGS. 19 and 20.

It is checked in step #1202 if the CF switch (a custom-function switch that is used by the operator to change focus-detection control in correspondence with an object to be photographed) 510 is ON. If the CF switch is ON, the flow advances to step #1207 to call a "focus-detection control in case of CF switch ON" routine, and the control returns to the routine shown in FIG. 18. This routine will be explained in detail later with reference to the flow charts shown in FIGS. 31 and 32. it is then checked in step #1203 if the current AF mode is the ONE SHOT-AF or AI SERVO-AF mode. If the current AF mode is the AI SERVO-AF mode, the flow advances to step #1206 to call a "focus detection control in case of AI SERVO-AF" routine, and the control returns to the routine shown in FIG. 18. This routine will be explained in detail later with reference to the flow charts shown in FIGS. 21 and 22. On the other hand, if the CF switch is OFF and the current AF mode is the ONE SHOT-AF mode, the flow advances to step #1204 to call a "first prior area set" routine. Since this routine is commonly called from the "focus detection control in case of AI SERVO-AF" routine in FIGS. 21 and 22 and "focus detection control in case of CF switch ON" routine in FIGS. 31 and 32, this routine will be described first with reference to the flow chart shown in FIG. 23.

It is checked in step #1402 if the current AF mode is the ONE SHOT-AF or AI SERVO-AF mode. If the current AF mode is the ONE SHOT-AF mode, the flow advances to step #1403; if the current AF mode is the AI SERVO-AF mode, the flow advances to step #1404. In either case, it is checked if the CF switch is ON. As a result, if the current AF mode is the ONE SHOT-AF mode and the CF switch is OFF, the flow advances from step #1403 to step #1405 to set a first prior area in case of ONE SHOT-AF; if the CF switch is ON, the flow advances from step #1403 to step #1406 to set a first prior area in case of ONE SHOT-AF and CF switch ON. On the other hand, if the current AF mode is the AI SERVO-AF mode and the CF switch is OFF, the flow advances from step #1404 to step #1407 to set a first prior area in case of AI SERVO-AF; if the CF switch is ON, the flow advances from step #1404 to step #1408 to set a first prior area in case of AI SERVO-AF and CF switch ON.

If this "first prior area set" routine shown in FIG. 23 is called from step #1204 in FIG. 19, the first prior area in case of ONE SHOT-AF is set in step #1405 shown in FIG. 23. More specifically, in this setup, as shown in FIG. 25A, a total of 11 focus detecting areas A1, A4, A7, A18, A20, A23, A26, A28, A39, A42, and A45 bounded by black frames of the 45 focus-detecting areas are set as the first prior area.

Referring back to FIG. 19, after the first prior area is set, the flow advances to step #1205, and "0" is substituted in a variable FLAG1 to start accumulation of a focus-detecting sensor. In step #1208, the maximum accumulation time is checked. If the sensor accumulation is not complete after an elapse of a pre-set time (maximum accumulation time), the flow advances to step #1210 to forcibly complete the sensor accumulation and to read out all image signals. In step #1211, the focus-detecting areas are estimated, i.e., a final focus-detecting area (an area from which the defocus amount used in focus adjustment is obtained) is selected as a focus-detecting area most suitably corresponding to the main-object position (to be also referred to as an effective focus-detecting area hereinafter) from the 45 focus-detecting areas. An example of the method of determining the final focus-detecting area will be explained later in a description of the estimation of the first prior area (to be described later). The flow advances to step #1221, and the selected focus-detecting area is set as the final focus-detecting area from which the defocus amount used in lens driving is obtained.

On the other hand, if it is determined in step #1208 that the maximum accumulation time has not elapsed yet, the flow advances to step #1209 to check completion of image signal read-out and to read out an incomplete image signal. In this step, it is checked if the accumulation of each sensor is complete. If an accumulation-completed sensor is found and an image signal is not read out from that sensor yet, the image signal is read out from the sensor. It is checked in step #1212 if a new image signal has been read out. If no new image signal is read out, the step of checking completion of image signal read-out and reading out an incomplete image signal is repeated (#1212→#1208 . . . ) until the maximum accumulation time is reached.

If it is determined that a new image signal has been read out, the flow advances to step #1213 to make a correlation calculation of that image signal. Upon completion of the correlation calculation, the flow advances to step #1214 shown in FIG. 20 to check if FLAG1=0. Note that FLAG1 is a flag variable, which is set at 1 when correlation calculations are complete for all the focus-detecting areas in the first prior area; otherwise it is set to 0. If it is determined that FLAG1=0, the flow advances to step #1215 to check if correlation calculations are complete for all the focus-detecting areas in the first prior area as a result of read-out of a new image signal in step #1209. If it is determined that the correlation calculations are not complete yet, the step of checking completion of image signal read-out and reading out an incomplete image signal, and the step of making a correlation calculation are repeated (#1215→#1208→#1209 . . . ) until the maximum accumulation time is reached.

On the other hand, if it is determined that the correlation calculations are complete, the flow advances to step #1216 to set FLAG1 at "1", and the first prior area is estimated in step #1217 to determine an effective focus-detecting area of the first prior area as a final preselected focus-detecting area.

More specifically, as shown in the flow chart in FIG. 29 all the focus-detecting areas of the first prior area are set as preselected focus-detecting areas in step #1602. In step #1604, the reliability of focus detection of each focus-detecting area in the first prior area is checked. The reliability of focus detection is obtained in consideration of two factors, i.e., contrast and the degree of agreement between two image signals paired upon calculating a relative positional displacement, as shown in steps #1702 to #1707 in FIG. 30. Since this operation is known to those who are skilled in the art, a detailed description thereof will be omitted.

Upon completion of checking of the reliability of all the areas, the flow advances to step #1606 to determine the most effective preselected focus-detecting area from those whose reliability meets a given reference value. The preselected focus-detecting area is totally determined on the basis of the weights set in advance in the individual focus-detecting areas in the frame, defocus amounts calculated by the correlation calculations, and the like. Various methods of determining the preselected focus-detecting area have been proposed, are known to those who are skilled in the art, and do not directly relate to the present invention. Hence, a detailed description thereof will be omitted.

Referring back to FIG. 20, it is checked in step #1218 if the reliability of the preselected focus-detecting area is larger than a predetermined reference value. If it is determined that the reliability is larger than the reference value, the flow advances to step #1221, and this area is set as a final focus-detecting area from which the focus amount used in lens driving is obtained.

On the other hand, if the reliability is equal to or smaller than the reference value, since focus-detecting areas other than the first prior area shown in FIG. 25B may include a more effective focus-detecting area, the flow returns to step #1208 in FIG. 19 to check the remaining focus-detecting areas.

More specifically, since FLAG1 has already been set at "1" in step #1216, the flow advances from step #1214 to step #1219, thus repeating the step of checking completion of image signal read-out and reading out an incomplete image signal, and the step of making a correlation calculation are repeated until the maximum accumulation time is reached. If it is determined in step #1219 that correlation calculations of all the remaining focus-detecting areas are complete, the flow advances to step #1220 to estimate the remaining focus-detecting areas. In this case, a focus-detecting area with the largest estimation value is selected from those of the areas in the first prior area and other focus-detecting areas. Upon completion of selection, the flow advances to step #1221 to set the selected area as the final focus-detecting area from which the defocus amount used in lens driving is obtained.

In the ONE SHOT-AF mode, the 45 focus-detecting areas in the frame are divided into two groups, as shown in FIGS. 25A and 25B, and one (including 11 areas shown in FIG. 25A) of the two groups is set as a first prior area. Calculations and reliability estimation are done in this group, and if the estimation result meets a predetermined reference value, the calculations are completed in that group. That is, neither calculations nor estimation are done in the other group (shown in FIG. 25B).

In the above arrangement, in the ONE SHOT-AF mode that does not consider any movement of an object, since focus detection is not always made on all focus-detecting areas, quick, accurate focus detection can be attained especially for a landscape object or the like.

The "focus detection control in case of AI SERVO-AF" routine executed in step #1206 in FIG. 19 will be described below with reference to the flow charts in FIGS. 21 and 22. The basic flow of the processing is substantially the same as that of the focus-detection control shown in FIGS. 19 and 20, and the "focus-detection control in case of CF switch ON" routine shown in FIGS. 31 and 32 (to be described later).

In step #1302, the "first prior area set" routine shown in FIG. 23 is called. This routine is commonly called from the "focus-detection control" shown in FIG. 19, and the "focus-detection control in case of CF switch ON" routine shown in FIGS. 31 and 32 (to be described later), as described above. When this routine is called from step #1302, a first prior area in case of AI SERVO-AF is set in step #1407 in FIG. 23.

More specifically, in this setup, as shown in FIG. 27A, only a central focus-detecting area A23 bounded by a black frame of the 45 focus-detecting areas is set as the first prior area. However, this state is a default state. As described above, since the AI SERVO-AF mode is a photographing mode that makes lens driving follow up object movement, when the object has moved and the focus-detecting area has also moved while focus detection is repeated, that focus-detecting area is set as the first prior area.

Referring back to FIG. 21, after the first prior area is set, the flow advances to step #1303 to substitute "0" in variables FLAG1 and FLAG2, thus starting accumulation of the focus-detecting sensor.

When the flow advances to step #1304 upon starting accumulation, the maximum accumulation time is checked. If the sensor accumulation is not complete after an elapse of a pre-set time (maximum accumulation time), the flow advances to step #1308 to forcibly complete the sensor accumulation and to read out all image signals. In step #1309, the focus-detecting areas are estimated, i.e., the most effective focus-detecting area is selected from the focus-detecting areas from which image signals have been read out. The flow then advances to step #1324 to set the selected area as the final focus-detecting area from which the defocus amount used in lens driving is obtained.

If it is determined in step #1304 that the maximum accumulation time has not elapsed yet, the flow advances to step #1305 to check completion of image signal read-out and to read out an incomplete image signal. In this step, it is checked if accumulation of each sensor is complete. If an accumulation-completed sensor is found and an image signal is not read out from that sensor yet, the image signal is read out from the sensor. It is checked in step #1306 if a new image signal has been read out. If no new image signal is read out, the step of checking completion of image signal read-out and reading out an incomplete image signal is repeated (#1306→#1304→#1035→#1306 . . . ) until the maximum accumulation time is reached.

If it is determined that a new image signal has been read out, the flow advances to step #1307 to make a correlation calculation of that image signal. Upon completion of the correlation calculation, the flow advances to step #1310 to check if FLAG2=0. Note that FLAG2 is a flag variable which is set at 1 when correlation calculations are complete for all the focus detecting areas in a second prior area (to be described later); otherwise, 0. If it is determined that FLAG2=0, the flow advances to step #1311 in FIG. 22; otherwise, the flow advances to step #1317.

When the flow advances to step #1311 in FIG. 22, it is checked in turn if FLAG1=0. As described above, FLAG1 in a flag variable which is set at 1 when correlation calculations are complete for all the focus detecting areas in the first prior area; otherwise, 0. If it is determined that FLAG1=0, the flow advances to step #1312 to check if correlation calculations are complete for all the focus-detecting areas in the first prior area as a result of read-out of a new image signal in step #1305. If it is determined that the correlation calculations are not complete yet, the step of checking completion of image signal read-out and reading out an incomplete image signal, and the step of making a correlation calculation are repeated (#1312→#1304→#1305 . . . ) until the maximum accumulation time is reached.

On the other hand, if it is determined that the correlation calculations are complete, the flow advances to step #1313 to set FLAG1 at "1", and the first prior area is estimated in step #1314 to determine an effective focus-detecting area of the first prior area as a final preselected focus-detecting area, as described earlier.

It is then checked in step #1319 if the reliability of the determined preselected focus detecting area is larger than a predetermined reference value. If it is determined that the reliability is larger than the reference value, the flow advances to step #1324 in FIG. 21, and this area is set as a final focus-detecting area from which the defocus amount used in lens driving is obtained.

On the other hand, if the reliability is equal to or smaller than the reference value, since the second prior area shown in FIG. 27B other than the first prior area may including a more effective focus-detecting area, the flow advances to step #1320 to set FLAG2 at "1". In step #1321, a "second prior area set" routine is executed. Since this routine is commonly called from the "focus-detection control in case of CF switch ON" routine shown in FIGS. 31 and 32, this routine will be explained below using the flow chart shown in FIG. 24.

It is checked in step #1502 if the current AF mode is the ONE SHOT-AF or AI SERVO-AF mode. If the current AF mode is the ONE SHOT-AF mode, the flow advances to step #1503 to set a second prior area in case of ONE SHOT-AF and CF switch ON. If the current AF mode is the AI SERVO-AF mode, the flow advances to step #1504 to check if the CF switch is ON. If the current AF mode is the AI SERVO-AF mode and the CF switch is OFF, the flow advances to step #1505 to set a second prior area in case of AI SERVO-AF; if the current AF mode is the AI SERVO-AF mode and the CF switch is ON, the flow advances to step #1506 to set a second prior area in case of AI SERVO-AF and CF switch ON.

Referring back to FIG. 22, when the "second prior area set" routine is called from step #1321, the second prior area in case of AI SERVO-AF is set in step #1505 in FIG. 24 above. More specifically, when the focus-detecting area A23 shown in FIG. 27A is set as the first prior area, a total six focus-detecting areas A1, A13, A22, A24, A33, and A34 around the focus-detecting area A23 are set as the second prior area, as shown in FIG. 27B.

As described previously, after FLAG2 is set at "1" in step #1320 and the second prior area is set in step #1321, the flow advances from step #1310 in FIG. 21 to step #1317 so as to repeat the step of checking completion of image signal read-out reading out an incomplete image signal, and the step of making a correlation calculation (#1321→#1304→#1305→#1306→#1307→#1310→ #1317 . . . . ) until the maximum accumulation time is reached. If it is determined in step #1317 that correlation calculations are complete for all the focus detecting areas in the second prior area, the flow advances to step #1318. In step #1318, the areas included in the second prior area are estimated to select the most effective preselected focus-detecting area therefrom. It is then checked in step #1322 if the reliability of the determined preselected focus-detecting area exceeds a predetermined reference value. If it is determined that the reliability exceeds the reference value, the flow advances to step #1324 to set the selected area as a final focus-detecting area from which the defocus amount used in lens driving is obtained.

On the other hand, if the reliability is equal to or smaller than the reference value, the flow advances to step #1323 to reset FLAG2 to zero (FLAG1=1 at that time). Since focus-detecting areas (FIG. 27C) other than the first and second prior areas may include a more effective focus-detecting area, the flow returns to step #1304 in FIG. 21 so as to check the remaining focus-detecting areas.

More specifically, if FLAG2=0 and FLAG1=1, the flow advances from step #1310 to step #1311 and from step #1311 to step #1315, thus repeating the step of checking completion of image signal read-out and reading out an incomplete image signal, and the step of making a correlation calculations (#1323→#1304→#1305→#1306→#1307→#1310→#1311→#1315 . . . . ) until the maximum accumulation time is reached. If it is determined in step #1315 that correlation calculations are complete for the remaining focus-detecting areas, the flow advances to step #1316 to estimate the remaining focus-detecting areas. In this case, a focus-detecting area with the highest estimation result is selected from those in the first and second prior areas and other focus-detecting areas. After selection, the flow advances to step #1324 in FIG. 21 to set the selected area as a final focus-detecting area from which the defocus amount used in lens driving is obtained.

In the above-mentioned AI SERVO-AF mode, the 45 focus-detecting areas in the frame are divided into the first and second prior area groups shown in FIGS. 27A and 27B in accordance with the previously selected final focus-detecting area (normally, the final focus-detecting area from which the defocus amount used in the previous lens driving was obtained) (in this case, since the AI SERVO-AF mode is selected, these groups dynamically change in correspondence with the previously selected final focus-detecting area), the calculations and estimations of these groups are executed in a given priority order, and are ended when the estimation result of each group meets a predetermined reference value.

In the aforementioned arrangement, by exploiting the fact that a focus-detecting area selected once tends to be selected again when the photographer follows up a moving object within the frame in the AI SERVO-AF mode that considers object movement, estimations are made by dividing the focus-detecting areas into a plurality of groups to have the focus-detecting area selected once as the center, and a focus-detection result that satisfies the photographer is obtained using an intermediate estimation result by ending calculations before executing focus detection on all the focus-detecting areas. Hence, even when fast focus detection is required for a moving object like in motor sports depending on photographing conditions, accurate focus detection can be attained.

The "focus-detection control in case of CF switch ON" routine executed in step #1207 shown in FIG. 19 will be described below with reference to the flow chart in FIGS. 31 and 32.

In step #1802, the "first prior area set" routine shown in FIG. 23 is called. This routine is also commonly called from the focus-detection control routine shown in FIG. 19. When this routine is called from step #1802, if the CF switch ON and the current AF mode is the ONE SHOT-AF mode, a first prior area in case of ONE SHOT-AF and CF switch ON is set in step #1406; if the CF switch is ON and the current AF mode is the AI SERVO-AF mode, a first prior area in case of AI SERVO-AF and CF switch ON is set in step #1408, as shown in FIG. 23.

More specifically, upon setting the first prior area in case of ONE SHOT-AF and CF switch ON in step #1406, a total of seven focus detecting areas A4, A18, A20, A23, A26, A28, and A42 of the 45 focus-detecting areas are set as the first prior area, as shown in FIG. 26A.

On the other hand, upon setting the first prior area in case of AI SERVO-AF and CF switch ON in step #1408, the previously selected final focus-detecting area is combined in addition to the above first prior area setups. As described above, the AI SERVO-AF mode makes lens driving follow up movement of the object. For example, when the object has moved while focus detection is repeated, and the main focus detecting area has moved to A6 in FIG. 28A, focus-detecting areas A4, A18, A20, A23, A26, A28, and A42 are set as the first prior area in addition to that focus-detecting area A6.

Referring back to FIG. 31, after the first prior area is set in correspondence with the current photographing mode, the flow advances to step #1803 to substitute "0" in variables FLAG1 and FLAG2, thus starting accumulation of the focus-detecting sensor.

When the flow advances to step #1804 upon starting accumulation, the maximum accumulation time is checked. If the sensor accumulation is not complete after an elapse of a pre-set time (maximum accumulation time), the flow advances to step #1808 to forcibly complete the sensor accumulation and to read out all image signals. In step #1809, the focus-detecting areas are estimated, i.e., the most effective focus detecting area is selected from the focus-detecting areas from which image signals have been read out. The flow then advances to step #1824 to set the selected area as the final focus-detecting area from which the defocus amount used in lens driving is obtained.

If it is determined in step #1804 that the maximum accumulation time has not elapsed yet, the flow advances to step #1805 to check completion of image signal read-out and to read out an incomplete image signal. In this step, it is checked if accumulation of each sensor is complete. If an accumulation-completed sensor is found and an image signal is not read out from that sensor yet, the image signal is read out from the sensor. It is checked in step #1806 if a new image signal has been read out. If no new image signal is read out, the step of checking completion of image signal read-out and reading out an incomplete image signal is repeated (#1806→#1804→#1805→#1806 . . . ) until the maximum accumulation time is reached.

If it is determined that a new image signal has been read out, the flow advances to step #1807 to make a correlation calculation of that image signal. Upon completion of the correlation calculation, the flow advances to step #1810 to check if FLAG2 =0. Note that FLAG2 is a flag variable which is set at 1 when correlation calculations are complete for all the focus-detecting areas in a second prior area (to be described later); otherwise, 0. If it is determined that FLAG2=0, the flow advances to step #1811 in FIG. 32; otherwise, the flow advances to step #1817.

When the flow advances to step #1811 in FIG. 32, it is checked in turn if FLAG1=0. As described above, FLAG1 is a flag variable which is set at 1 when correlation calculations are complete for all the focus detecting areas ion the first prior area; otherwise, 0. If it is determined that FLAG1=0, the flow advances to step #1812 to check if correlation calculations are complete for all the focus-detecting areas in the first prior area as a result of read-out of a new image signal in step #1805. If it is determined that the correlation calculations are not complete yet, the step of checking completion of image signal read-out and reading out an incomplete image signal, and the step of making a correlation calculation are repeated (#1812→#1804→#1805 . . . ) until the maximum accumulation time is reached.

On the other hand, if it is determined that the correlation calculations are complete, the flow advances to step #1813 to set FLAG1 at "1", and the first prior area is estimated in step #1814. Then, a most effective preselected focus-detecting area is determined from those in the first prior area. It is then checked in step #1819 if the reliability of the determined preselected focus-detecting area is larger than a predetermined reference value. If it is determined that the reliability is larger than the reference value, the flow advances to step #1820 to set FLAG2 at "1", and the "second prior area set" routine is executed in step #1821. This routine is also commonly called from the "focus-detection control in case of AI SERVO-AF" routine shown in FIG. 21, as described above. When this routine is called from step #1821, if the CF switch is ON and the current AF mode is the ONE SHOT-AF mode, a second prior area in case of ONE SHOT-AF and CF switch ON is set in step #1503; if the CF switch is ON and the current AF mode is the AI SERVO-AF mode, a second prior area in case of AI SERVO-AF and CF switch ON is set in step #1506, as shown in FIG. 24.

More specifically, upon setting the second prior area in case of ONE SHOT-AF and CF switch ON in step #1503, for example, when it is determined that a focus-detecting area A26 of the seven focus-detecting areas shown in FIG. 26A is effective, a total of eight focus detecting areas A7, A15, A16, A25, A27, A36, A37, and A45 around the focus-detecting area A26 are set as the second prior area, as shown in FIG. 26B.

On the other hand, upon setting the second prior area in case of AI SERVO-AF and CF switch ON in step #1506, when it is determined that a focus-detecting area A6 of the eight focus-detecting areas shown in FIG. 28A is effective, a total of four focus-detecting areas A5, A7, A14, and A15 around the focus-detecting areas A6 are set as the second prior area, as shown in FIG. 28B.

Referring back to FIG. 32, if it is determined in step #1819 that the reliability of the preselected focus-detecting area determined in step #1814 does not exceed the predetermined reference value, the first prior area does not include any effective focus-detecting area, but other focus-detecting areas may include a more effective focus-detecting area. Hence, the flow returns to step #1804 in FIG. 31 to check the remaining focus-detecting areas.

More specifically, since FLAG1 is set at "1" in step #1813 in FIG. 32, the flow advances from step #1811 to step #1815 to repeat the step of checking completion of image signal read-out and reading out an incomplete image signal, and the step of making a correlation calculation until the maximum accumulation time is reached. If it is determined in step #1815 that correlation calculations are complete for all the remaining focus-detecting areas, the flow advances to step #1816 to estimate the remaining focus-detecting areas. In this step, a focus-detecting area with the highest estimation result is selected from all the focus detecting areas. After selection, the flow advances to step #1824 in FIG. 31 to set the selected area as a final focus-detecting area from which the defocus amount used in lens driving is obtained.

On the other hand, after FLAG2 is set at "1" in step #1820 and the second prior area is set in step #1821 in FIG. 32, the flow advances from step #1810 in FIG. 31 to step #1817 to repeat the step of checking completion of image signal read-out and reading out an incomplete image signal, and the step of making a correlation calculation until the maximum accumulation time is reached. If it is determined in step #1817 that correlation calculations are complete for all the focus detecting areas in the second prior area, the flow advances to step #1818 to estimate the area in the second prior area, thus determining a most effective focus detecting area in the second prior area as a preselected focus-detecting area. It is then checked in step #1822 if the reliability of the determined preselected focus-detecting area exceeds a predetermined reference value. If it is determined that the reliability exceeds the reference value, the flow advances to step #1824 to set the selected area as a final focus-detecting area from which the defocus amount used in lens driving is obtained.

On the other hand, if the reliability does not exceed the reference value, the flow advances to step #1823 to reset FLAG2 to zero (FLAG1=1 at that time). Since focus-detecting areas (FIGS. 27C and 28C) other than the first and second prior areas may include a more effective focus-detecting area, the flow returns to step #1804 in FIG. 31 so as to check the remaining focus-detecting areas.

In case of ONE SHOT-AF and CF switch ON mentioned above, a group of areas shown in FIG. 26A of the 45 focus-detecting areas in the frame is set as the first prior area, and calculations and reliability estimation are done in that group. On the basis of the estimation result of the first prior area, another group of a plurality of focus-detecting areas, including those that belong to the first prior area is formed (see FIG. 26B). Then, calculations and reliability estimation are done in that group. When the estimation result meets a predetermined reference value, the calculations are ended with the group at that time.

In the above arrangement, in the ONE SHOT-AF that does not consider any movement of an object, if it is determined that a specific focus-detecting area is effective as a final focus-detecting area, its neighboring focus-detecting areas are also estimated, thus obtaining a focus-detection result that satisfies the photographer using an intermediate estimation result without executing focus detection on all the focus-detecting areas. Hence, when delicate focus detection is required for a still object in case of portrait photographing, quick and more accurate focus detection is attained.

In case of AI SERVO-AF and CF switch ON, a group of areas shown in FIG. 28A of the 45 focus detecting areas within the frame is dynamically set as the first prior area (since the AI SERVO-AF mode is selected) in accordance with the previously selected final focus detecting area (normally, the final focus-detecting area from which the defocus amount used in the previous lens driving was obtained), and calculations are done in that group as the first priority. However, depending on the estimation result of the first prior group, the second prior area as a group shown in FIG. 28B is dynamically set, and if a predetermined reference value is satisfied in this group, the calculations are ended at that time.

In the above arrangement, in the AI SERVO-AF mode that considers object movement, not only the focus-detecting area selected once but also a plurality of groups of focus-detecting areas in the frame are estimated at the same time. When it is determined that a specific focus-detecting area is effective as a final focus-detecting area, a focus-detection result that satisfies the photographer is obtained by using an intermediate estimation result and ending the calculations at that time without executing focus detection on all the focus detecting areas. hence, even upon photographing a moving object like in a soccer game in which the main object of the photographer changes frequently, quick and accurate focus detection can be attained.

In the above embodiment, in, e.g., FIGS. 26A to 26C, when an effective area is found from the first prior area, the second prior area including that area as the center is set as a new group. When an appropriate area is found in this group, the calculations are ended at that time. However, the present invention is not limited to such specific scheme. For example, a third prior area including an optical area in that group, and a fourth prior area may be set as new groups, and when an appropriate area is found in these groups, the calculations may be ended.

In the example shown in FIGS. 27A to 27C, if a satisfactory result is obtained from the first prior area, the calculations are ended at that time. Alternatively, when a satisfactory result is obtained from the first prior area, its neighboring areas may be calculated and estimated (the state shown in FIG. 27B), and if they include a satisfactory area, the calculations may be ended at that time, thus realizing a camera which is effective for an object which uses six areas shown in FIG. 27B as optimal focus-detection calculated areas.

In this embodiment, a single-lens reflex camera has been exemplified. However, the present invention can also be applied to other optical apparatuses such as a video camera, an electronic still camera, and the like.

A focus detecting device has been exemplified. However, the present invention can also be applied to a distance-measuring device having a plurality of distance-measuring areas used upon measuring distance to the object.

What is claimed is:

1. A focus detecting device capable of focus detection in a plurality of focus detecting areas, comprising:
   a) setting means for setting a first group including at least two focus detecting areas, and a second group including a plurality of focus detecting areas, which are not included in said first group; and
   b) focus detecting means for executing focus detection in the order from the focus detecting areas included in said first group, wherein said focus detecting means ends focus detection without executing focus detection in the plurality of focus detecting areas included in said second group, when the focus detecting area included in said first group satisfies a predetermined condition.

2. A device according to claim 1, wherein said focus detecting means executes focus detection in the plurality of focus detecting areas included in said second group when none of the plurality of focus detecting areas included in said first group satisfy the predetermined condition.

3. A focus detecting device capable of focus detection in a plurality of focus detecting areas, comprising:
   a) focus detection calculation means for making a focus detection calculation; and
   b) discrimination means for discriminating if a calculation result of said focus detection calculation means satisfies a predetermined estimation condition, wherein said focus detection calculation means makes focus detection calculations for N focus detecting areas (N is an integer not less than 2), a focus state is determined without making focus detection calculations for remaining focus detecting areas when calculation results of said N focus detecting areas satisfy said predetermined estimation condition, and a focus state is determined by making focus detection calculations for the remaining focus detecting areas when the calculation results of said N focus detecting areas do not satisfy said predetermined estimation condition.

4. A focus detecting device capable of focus detection in a plurality of focus detecting areas, comprising:
   a) first focus detection calculation means for making focus detection calculations for N focus detecting areas (N is an integer not less than 2) of said plurality of focus detecting areas;
   b) selection means for selecting a specific focus detecting area from said N focus detecting areas on the basis of calculation results of said first focus detection calculation means; and
   c) second focus detection calculation means for making focus detection calculations for a plurality of focus detecting areas which neighbor the focus detecting area selected by said selection means.

5. A device according to claim 4, wherein said plurality of neighboring focus detecting areas do not include said N focus detecting areas.

6. A device according to claim 4, wherein said selection means selects the focus detecting area, which has a calculation result of said first focus detection calculation means that satisfies a predetermined estimation condition.

7. An optical apparatus which selects at least one focus detecting area from a plurality of focus detecting areas, and adjusts a focus on the basis of information obtained from the selected focus detecting area, comprising:
   a) setting means for setting a first group including a previously selected focus detecting area, and a second group including a plurality of focus detecting areas which are not included in said first group; and
   b) focus detecting means for executing focus detection in the order from the focus detecting areas included in said first group, wherein said focus detecting means ends focus detection without executing focus detection in the plurality of focus detecting areas included in said second group, when the focus detecting area included in said first group satisfies a predetermined condition.

8. An apparatus according to claim 7, wherein said focus detecting means executes focus detection in the plurality of focus detecting areas included in said second group when none of the plurality of focus detecting areas included in said first group satisfy the predetermined condition.

9. An optical apparatus which selects at least one focus detecting area from a plurality of focus detecting areas, and adjusts a focus on the basis of information obtained from the selected focus detecting area, comprising:

a) first focus detection calculation means for making focus detection calculations for N focus detecting areas (N is an integer not less than 2) including a previously selected focus detecting area of said plurality of focus detecting areas;

b) selection means for selecting a specific focus detecting area from said N focus detecting areas on the basis of calculation results of said first focus detection calculation means; and c) second focus detection calculation means for making focus detection calculations for a plurality of focus detecting areas which neighbor the focus detecting area selected by said selection means.

10. An apparatus according to claim 10, wherein said plurality of neighboring focus detecting areas do not include said N focus detecting areas.

11. An apparatus according to claim 9, wherein said selection means selects the focus detecting area, which has a calculation result of said first focus detection calculation means that satisfies a predetermined estimation condition.

12. A distance measuring device capable of distance measurement in a plurality of distance measuring areas, comprising:

a) setting means for setting a first group including at least two distance measuring areas, and a second group including a plurality of distance measuring areas, which are not included in said first group; and b) distance measuring means for executing distance measurement in the order from the distance measuring areas included in said first group, wherein said distance measuring means ends distance measurement without executing distance measurement in the plurality of distance measuring areas included in said second group, when the distance measuring area included in said first group satisfies a predetermined condition.

13. A device according to claim 12, wherein said distance measuring means executes distance measurement in the plurality of distance measuring areas included in said second group when none of the plurality of distance measuring areas included in said first group satisfy the predetermined condition.

14. An optical apparatus which selects at least one distance measuring area from a plurality of distance measuring areas, and adjusts a focus on the basis of information obtained from the selected distance measuring area, comprising:

a) setting means for setting a first group including a previously selected distance measuring area, and a second group including a plurality of distance measuring areas which are not included in said first group; and b) distance measuring means for executing distance measurement in the order from the distance measuring areas included in said first group, wherein said distance measuring means ends distance measurement without executing distance measurement in the plurality of distance measuring areas included in said second group, when the distance measuring area included in said first group satisfies a predetermined condition.

15. An apparatus according to claim 14, wherein said distance measuring means executes distance measurement in the plurality of distance measuring areas included in said second group when none of the plurality of distance measuring areas included in said first group satisfy the predetermined condition.

16. A focus detecting device capable of focus detection in a plurality of focus detecting areas, comprising:

a) focus detecting means for repeating focus detection in a plurality of focus detecting areas; and b) setting means for setting a specific range with reference to a focus detecting area corresponding to a previous in-focus point of said plurality of focus detecting areas, wherein when said focus detecting means executes focus detection for the second and subsequent times, said focus detecting means executes focus detection in only the focus detecting areas included in said specific range set by said setting means.

17. A device according to claim 16, wherein said specific range includes a focus detecting area array including the focus detecting area corresponding to the previous in-focus point.

18. A device according to claim 16, wherein said specific range includes two focus detecting area arrays which cross at the focus detecting area corresponding to the previous in-focus point.

19. A device according to claim 16, wherein said specific range includes a plurality of focus detecting areas which neighbor the focus detecting area corresponding to the previous in-focus point.

20. A device according to claim 16, wherein said specific range includes two focus detecting area arrays which cross at the focus detecting area corresponding to the previous in-focus point, and a plurality of focus detecting areas which neighbor the focus detecting area corresponding to the previous in-focus point.

21. A distance measuring device capable of distance measurement in a plurality of distance measuring areas, comprising:

a) distance measuring means for repeating distance measurement in a plurality of distance measuring areas; and b) setting means for setting a specific range with reference to a distance measuring area corresponding to a previous in-focus point of said plurality of distance measuring areas, wherein when said distance measuring means executes distance measurement for the second and subsequent times, said distance measuring means executes distance measurement in only the distance measuring areas included in said specific range set by said setting means.

22. A device according to claim 21, wherein said specific range includes a distance measuring area array including the distance measuring area corresponding to the previous in-focus point.

23. A device according to claim 21, wherein said specific range includes two distance measuring area arrays which cross at the distance measuring area corresponding to the previous in-focus point.

24. A device according to claim 21, wherein said specific range includes a plurality of distance measuring areas which neighbor the distance measuring area corresponding to the previous in-focus point.

25. A device according to claim 21, wherein said specific range includes two distance measuring area arrays which cross at the distance measuring area corresponding to the previous in-focus point, and a plurality of distance measuring areas which neighbor the distance measuring area corresponding to the previous in-focus point.

26. A focus detecting device capable of focus detection in a plurality of focus detecting areas, comprising:

a) focus detecting means for repeating focus detection in a plurality of focus detecting areas;

b) selecting means for selecting at least a focus detecting area from the plurality of focus detecting areas; and c) setting means for setting a specific range with reference to a focus detecting area corresponding to a previous selected point of said plurality of focus detecting areas, wherein when said focus detecting means executes focus detection for the second and subsequent times, said focus detecting means executes focus detection in only the focus detecting areas included in said specific range set by said setting means.

27. A device according to claim 26, wherein said specific range includes a focus detecting area array including the focus detecting area corresponding to the previous selected point.

28. A device according to claim 26, wherein said specific range includes two focus detecting area arrays which cross at the focus detecting area corresponding to the previous selected point.

29. A device according to claim 26, wherein said specific range includes a plurality of focus detecting areas which neighbor the focus detecting area corresponding to the previous selected point.

30. A device according to claim 26, wherein said specific range includes two focus detecting area arrays which cross at the focus detecting area corresponding to the previous selected point, and a plurality of focus detecting areas which neighbor the focus detecting area corresponding to the previous in-focus point.

31. A distance measuring device capable of distance measurement in a plurality of distance measuring areas, comprising:

a) distance measuring means for repeating distance measurement in a plurality of distance measuring areas;

b) selecting means for selecting at least a distance measuring area from the plurality of distance measuring areas; and c) setting means for setting a specific range with reference to a distance measuring area corresponding to a previous selected point of said plurality of distance measuring areas, wherein when said distance measuring means executes distance measurement for the second and subsequent times, said distance measuring means executes distance measurement in only the distance measuring areas included in said specific range set by said setting means.

32. A device according to claim 31, wherein said specific range includes a distance measuring area array including the distance measuring area corresponding to the previous selected point.

33. A device according to claim 31, wherein said specific range includes two distance measuring area arrays which cross at the distance measuring area corresponding to the previous selected point.

34. A device according to claim 31, wherein said specific range includes a plurality of distance measuring areas which neighbor the distance measuring area corresponding to the previous selected point.

35. A device according to claim 31, wherein said specific range includes two distance measuring area arrays which cross at the distance measuring area corresponding to the previous selected point, and a plurality of distance measuring areas which neighbor the distance measuring area corresponding to the previous in-focus point.

* * * * *